United States Patent
Mizuno et al.

(10) Patent No.: US 10,566,618 B2
(45) Date of Patent: Feb. 18, 2020

(54) CELL

(71) Applicants: The University of Tokyo, Tokyo (JP);
Nippon Shokubai Co., Ltd., Osaka-shi, Osaka (JP)

(72) Inventors: Noritaka Mizuno, Tokyo (JP);
Tetsuichi Kudo, Tokyo (JP); Mitsuhiro Hibino, Tokyo (JP); Yoshiyuki Ogasawara, Tokyo (JP); Yosuke Suga, Tokyo (JP); Atsuo Yamada, Tokyo (JP); Yuki Yamada, Tokyo (JP); Shin-ichi Okuoka, Osaka (JP); Koji Yonehara, Osaka (JP); Hironobu Ono, Hyogo (JP); Yasutaka Sumida, Osaka (JP)

(73) Assignees: The University of Tokyo, Tokyo (JP);
Nippon Shokubai Co., Ltd., Osaka (JP)

( * ) Notice: Subject to any disclaimer, the term of this patent is extended or adjusted under 35 U.S.C. 154(b) by 488 days.

(21) Appl. No.: 14/437,409

(22) PCT Filed: Sep. 25, 2013

(86) PCT No.: PCT/JP2013/075864
§ 371 (c)(1),
(2) Date: Apr. 21, 2015

(87) PCT Pub. No.: WO2014/065067
PCT Pub. Date: May 1, 2014

(65) Prior Publication Data
US 2015/0280230 A1    Oct. 1, 2015

(30) Foreign Application Priority Data

Oct. 22, 2012 (JP) ................................ 2012-233060
Apr. 12, 2013 (JP) ................................ 2013-083900
(Continued)

(51) Int. Cl.
*H01M 12/08* (2006.01)
*H01M 4/38* (2006.01)
(Continued)

(52) U.S. Cl.
CPC .............. *H01M 4/48* (2013.01); *C04B 22/06* (2013.01); *C04B 22/068* (2013.01); *H01M 4/13* (2013.01);
(Continued)

(58) Field of Classification Search
CPC ...... H01M 4/382; H01M 4/381; H01M 12/08; C04B 22/068
(Continued)

(56) References Cited

U.S. PATENT DOCUMENTS 7,147,967 B1   12/2006  Read
7,696,126 B2    4/2010  Isogai et al.
(Continued)

FOREIGN PATENT DOCUMENTS

CN       1564355      1/2005
CN     101075691     11/2007
(Continued)

OTHER PUBLICATIONS

Machine Translation of JP 2012043568(A) by Mizuno Fuminori et al. "Air Electrode for Metal-Air Battery, and Metal-Air Battery Having Air Electrode" (Year: 2012).*
(Continued)

*Primary Examiner* — Robert S Jones
*Assistant Examiner* — Abibatu O Ojo-Amoo
(74) *Attorney, Agent, or Firm* — Hamre, Schumann, Mueller & Larson, P.C.

(57) ABSTRACT

The present invention provides a cell that has a high theoretical voltage and theoretical capacity, and can be discharged and recharged multiple times. The cell includes a
(Continued)

cathode, an anode, and an electrolyte, wherein the cathode contains a cathode active material containing an alkali metal compound represented by the formula (1):

$$A_xO_y \tag{1}$$

(wherein A is an alkali metal atom, x is 0.5 to 2.5, and y is 0.5 to 2.5), the anode contains an anode active material containing at least one selected from the group consisting of an alkali metal, tin, titanium, boron, nitrogen, silicon, and carbon, and the cathode, the anode, and the electrolyte are hermetically sealed in the cell.

14 Claims, 28 Drawing Sheets

(30) Foreign Application Priority Data

| Aug. 5, 2013 | (JP) | 2013-162661 |
| Sep. 19, 2013 | (JP) | 2013-194505 |

(51) Int. Cl.

| C04B 22/06 | (2006.01) |
| H01M 4/48 | (2010.01) |
| H01M 10/052 | (2010.01) |
| H01M 4/13 | (2010.01) |
| H01M 4/86 | (2006.01) |
| H01M 10/054 | (2010.01) |

(52) U.S. Cl.
CPC ............ *H01M 4/38* (2013.01); *H01M 4/381* (2013.01); *H01M 4/382* (2013.01); *H01M 4/483* (2013.01); *H01M 4/8663* (2013.01); *H01M 10/052* (2013.01); *H01M 12/08* (2013.01); *H01M 10/054* (2013.01)

(58) Field of Classification Search
USPC ........................................................ 429/405
See application file for complete search history.

(56) References Cited

U.S. PATENT DOCUMENTS

| 2004/0091774 A1 | 5/2004 | Narang et al. |
| 2006/0257719 A1 | 11/2006 | Merzougui et al. |
| 2008/0160415 A1 | 7/2008 | Wakita et al. |
| 2010/0035148 A1 | 2/2010 | Wakita et al. |
| 2011/0195320 A1 | 8/2011 | Nishikoori et al. |
| 2011/0200891 A1* | 8/2011 | Kotani ................ H01M 4/382 429/403 |
| 2012/0058378 A1* | 3/2012 | Lee ..................... B32B 27/08 429/127 |
| 2012/0225356 A1 | 9/2012 | Wietelmann |
| 2014/0072885 A1 | 3/2014 | Tanaami et al. |

FOREIGN PATENT DOCUMENTS

| CN | 101278422 | 10/2008 | |
| CN | 101499538 | 8/2009 | |
| CN | 102299308 | 12/2011 | |
| JP | 2005-166685 | 6/2005 | |
| JP | 2005-516347 | 6/2005 | |
| JP | 2011-108505 | 6/2011 | |
| JP | 2012043568 | * 3/2012 | ............ H01M 12/06 |
| WO | 03/063272 | 7/2003 | |
| WO | 2010/082338 | 7/2010 | |
| WO | 2011/061256 | 5/2011 | |
| WO | 2012/153774 | 11/2012 | |

OTHER PUBLICATIONS

Debart, et al., "Effect of catalyst on the performance of rechargeable lithium/air batteries", ECS Transactions, vol. 3, No. 27, 2007, pp. 225-232.

"All about novel models of accumulator batteries" (Kakushingata Chikudenchi no subete), Kogyo Chosakai Publishing Co., Ltd., 2010, pp. 59-61—concise explanation included a full English translation will be provided upon Examiner's request.

International Search Report issued in International Application No. PCT/JP2013/075864, dated Jan. 7, 2014, 4 pages.

International Preliminary Report on Patentability, Issued in International Application No. PCT/JP2013/075864, dated Apr. 22, 2015, 6 pages.

Xu, et al., "Investigation on the charging process of Li2O2-based air electrodes in Li-O2 batteries with organic carbonate electrolytes", Journal of Power Sources, vol. 196, 2011, pp. 3894-3899.

\* cited by examiner

CELL

TECHNICAL FIELD

The present invention relates to a cell. More specifically, the present invention relates to a cell suited for various applications such as electronics, automobiles, and the like applications where cells are used.

BACKGROUND ART

Recently, increasing interest in environmental issues has brought a change of energy source from petroleum and coal to electricity in many industrial fields, and not only the fields of electronics such as mobile phones and laptop computers but also various other fields such as the auto industry and the aircraft industry have begun to use electric accumulators such as cells and capacitors. In keeping with this trend, materials for these electric accumulators have been the subject of intense studies.

Lithium ion cells are most popular among other electric accumulators. They are used as batteries in mobile phones and laptop computers, for example. Unfortunately, the charging and discharging capacity of lithium ion cells is not large enough, and this disadvantage has created a demand for novel cells with a larger charging and discharging capacity. Recently, lithium-air cells, which have a larger theoretical capacity than lithium ion cells, have received attention. There is a study on lithium-air cells which proposes the use of an organic electrolyte (see Non Patent Literature 1).

CITATION LIST

Non Patent Literature

Non Patent Literature 1: "All about novel models of accumulator batteries" (Kakushingata Chikudenchi no sub-ete) written and edited by Zempachi Ogumi, Kogyo Chosakai Publishing Co., Ltd., 2010, 59-61

SUMMARY OF INVENTION

Technical Problem

Although high theoretical energy densities can be attained by lithium-air cells, actual cells have a much lower energy density. A principal reason for this is that pores of a porous cathode (air electrode) are blocked with a product ($Li_2O_2$ or $Li_2O$) of a discharge reaction at the cathode to prevent oxygen supply. Pore blocking with a reaction product also prevents sufficient charge as a result of preventing oxygen produced during charge from being discharged to the atmosphere. Another problem of lithium-air cells and other metal-air cells is the reliability and handleability. This is attributed to their unsealable structure designed as a mechanism with an air electrode into which and from which atmospheric oxygen is transported.

The present invention has been made under the foregoing circumstances, and an object of the present invention is to provide a cell that has a high theoretical voltage and theoretical capacity, and can be discharged and recharged multiple times.

Solution to Problem

The present inventors have studied various strategies to achieve cells that have a high theoretical voltage and theoretical capacity, and can be discharged and recharged multiple times, and found that in cells with a specific alkali metal compound as a cathode active material and an alkali metal as an anode active material, the cathode undergoes a reaction in which the alkali metal changes its form from $A_2O$ to $A_2O_2$ (wherein A is an alkali metal atom) or vice versa when the cells are charged or discharged. The cells have a remarkably large theoretical capacity than lithium ion cells. Further, since oxygen molecules are not involved in charging/discharging, the cells can be designed as sealed structures, and thus are free from the above-mentioned problem attributed to blocking of air (oxygen) supply, unlike lithium-air cells. Additionally, the cells provide cost effective, environmentally-friendly benefits because they can be produced using materials other than rare metals. The above-mentioned effects can be achieved as long as the anode active material contains at least one selected from the group consisting of an alkali metal, tin, titanium, boron, nitrogen, silicon, and carbon. Thus, the present inventors have also found that the novel cells have these features, and completed the present invention.

Specifically, the present invention relates to a cell including: a cathode; an anode; and an electrolyte, wherein the cathode contains a cathode active material containing an alkali metal compound represented by the formula (1):

$$A_xO_y \qquad (1)$$

(wherein A is an alkali metal atom, x is 0.5 to 2.5, and y is 0.5 to 2.5), the anode contains an anode active material containing at least one selected from the group consisting of an alkali metal, tin, titanium, boron, nitrogen, silicon, and carbon, and the cathode, the anode, and the electrolyte are hermetically sealed in the cell.

The following description is offered to demonstrate the present invention in detail.

Combinations of two or more of preferable embodiments of the present invention described below are also preferable embodiments of the present invention.

A cell of the present invention includes: a cathode; an anode; and an electrolyte. The cathode contains a cathode active material containing an alkali metal compound represented by the formula (1):

$$A_xO_y \qquad (1)$$

(wherein A is an alkali metal atom, x is 0.5 to 2.5, and y is 0.5 to 2.5.) The anode contains an anode active material containing at least one selected from the group consisting of an alkali metal, tin, titanium, boron, nitrogen, silicon, and carbon. The cathode, the anode, and the electrolyte are hermetically sealed in the cell.

The cell of the present invention allows batteries including hermetically sealed cells because its particular cathode that contains a particular cathode active material containing a specific alkali metal compound allows charging and discharging in the absence of oxygen molecules. Additionally, the cell is cost-effective and environmentally compatible, and exhibits high cell performance.

The expression "the cathode, the anode, and the electrolyte are hermetically sealed" used herein refers to a structure in which, except for parts of the cathode and anode which are connected to an exterior part during discharge to the exterior and charge to the cell, the remaining parts of the cathode and anode, and the electrolyte are not exposed to the atmosphere.

The reactions at the electrodes and the overall reaction (the combination of these reactions) in the cell of the present invention include those represented below (A is an alkali metal atom). In all the reaction formulas, the forward reaction is a discharge reaction and the reverse reaction is a charge reaction.

$$\text{Reaction at anode: } A \Leftrightarrow A^+ + e^- \quad (I)$$

$$\text{Reaction at cathode: } A_2O_2 + 2A^+ + 2e^- \Leftrightarrow 2A_2O \quad (II)$$

$$\text{Overall reaction: } A + 1/2 A_2O_2 \Leftrightarrow A_2O \quad (III)$$

No cells which make use of the combination of reactions at the cathode and the anode have been known, and the cell of the present invention is based on this novel principle.

For example, in the case where the alkali metal represented by A is lithium, the reactions can be specifically expressed as follows.

$$\text{Reaction at anode: } Li \Leftrightarrow Li^+ + e^-$$

$$\text{Reaction at cathode: } Li_2O_2 + 2Li^+ + 2e^- \Leftrightarrow 2Li_2O$$

$$\text{Overall reaction: } Li + 1/2 Li_2O_2 \Leftrightarrow Li_2O$$

The cathode of the cell of the present invention contains a cathode active material containing an alkali metal compound represented by the following formula (1):

$$A_xO_y \quad (1)$$

(wherein A is an alkali metal atom, x is 0.5 to 2.5, and y is 0.5 to 2.5.)

Examples of alkali metal atoms for A in the formula (1) include Li, Na, K, Rb, Cs, and Fr. In terms of theoretical capacity, Li, Na, and K are preferred. More preferred are Li and Na, and still more preferred is Li.

In the formula (1), x is preferably 1 or 2, and y is preferably 1 or 2.

The alkali metal compound is more preferably an alkali metal oxide ($A_2O$; namely x=2 and y=1), an alkali metal peroxide ($A_2O_2$; namely x=2 and y=2), or an alkali metal superoxide ($AO_2$; namely x=1 and y=2), and still more preferably an alkali metal oxide or an alkali metal peroxide.

These alkali metal compounds may be used alone or in combination.

The cathode active material used in the cell of the present invention may further contain additional compounds other than the alkali metal compound, as long as it contains the alkali metal compound.

The cathode preferably includes a current collector and an active material layer, and the active material layer preferably contains the alkali metal compound represented by the formula (1) in an amount of 0.1% by mass or more relative to the mass of the active material layer.

The amount of the alkali metal compound represented by the formula (1) is more preferably 1% by mass or more, still more preferably 3% by mass or more, and particularly preferably 5% by mass or more in terms of theoretical capacity. The upper limit thereof is not particularly limited, but is preferably 99.99% by mass or less, and more preferably 99.9% by mass or less in terms of electrical conductivity.

In the case where the cathode (or the anode) includes a current collector and an active material layer, the "mass" of the active material layer herein refers to the mass of the overall cathode (or anode) except for the current collector.

Upon full charge, the cathode active material preferably contains an alkali metal peroxide represented by the following formula (2) in an amount of 1% by mass or more relative to the mass (100% by mass) of the active material layer of the cathode:

$$A_2O_2 \quad (2)$$

(wherein A is an alkali metal atom.) The presence of the alkali metal peroxide in such an amount means that the reaction of the reaction formula (II) is the principal reaction at the cathode of the cell of the present invention (the reaction accounts for 50% or more of all reactions at the cathode). In this case, the cell of the present invention more sufficiently exerts the above-mentioned advantages.

The amount of the alkali metal peroxide represented by the formula (2) relative to the mass of the active material layer of the cathode is more preferably 1 to 99.999% by mass, and still more preferably 20 to 99.9% by mass.

The same alkali metal atoms listed for A in the formula (1) can be mentioned as examples of alkali metal atoms for A in the formula (2).

Additionally, when the cell of the present invention is fully charged, the anode preferably contains an alkali metal at a ratio, determined on a molar basis relative to an alkali metal peroxide represented by the following formula (2) in the cathode, of not more than 100.

$$A_2O_2 \quad (2)$$

(In the formula, A is an alkali metal atom.)

In the cell of the present invention, the anode and the cathode undergo the reverse reactions of the reaction formulas (I) and (II) during charge. Upon full charge, the anode active material is completely converted from the alkali metal ion to the alkali metal, and the cathode active material is converted to $A_2O_2$ represented by the formula (2). As described above, the cathode active material of the cell of the present invention may contain additional compounds other than the alkali metal compound. However, in order to satisfy the preferable condition that the principal reaction among all reactions at the cathode (the reaction which accounts for 50% or more of all reactions at the cathode) is the reaction represented by the reaction formula (II), $A_2O_2$ preferably constitutes a predetermined proportion of the cathode upon full charge. Specifically, upon full charge, the molar ratio ($A/A_2O_2$) of the alkali metal in the anode to the alkali metal peroxide represented by the formula (2) is preferably not more than 100. When the ratio ($A/A_2O_2$) satisfies this condition, the above properties of the cell of present invention are more improved. The phrase "alkali metal in the anode" herein refers to all alkali metals involved in charging and discharging. Namely, the expression refers to all alkali metals in the anode upon full charge, excluding alkali metals which remain in the anode upon full discharge.

The cathode which contains a cathode active material containing an alkali metal compound, and the anode which contains an anode active material containing at least one of an alkali metal, tin, titanium, boron, nitrogen, silicon, and carbon are preferably used as a cathode and an anode for primary and secondary cells.

Thus, an alkali metal compound is used as a cathode active material, and at least one selected from the group consisting of an alkali metal, tin, titanium, boron, nitrogen, silicon, and carbon is used as an anode active material. Because this feature eliminates the use of rare metals, the cell of the present invention can be produced at low costs and is advantageous as an element strategy.

The use of the alkali metal compound as a cathode and the alkali metal as an anode provides a cell with high electromotive force. In the case where the alkali metal is, for example, Li, the theoretical voltage is 2.87 V, and the theoretical energy density is 2566 Wh/kg. Thus, a cell that is excellent in both the theoretical voltage and energy density is provided. In particular, the energy density is remarkably higher than that of lithium ion cells, which are of the most popular type of cells.

In the cell of the present invention, the cathode material for the active material layer of the cathode is preferably a cathode mix essentially containing the cathode active material containing an alkali metal compound and further containing a catalyst for an electrode, a conductive auxiliary agent, and an organic compound. The cathode mix may further contain other components, if necessary.

The reaction from $A_2O$ to $A_2O_2$ (reverse reaction) represented by the cathode reaction formula (II) in the cell of the present invention is a reaction that has been unknown so far. In order to smoothly charge and discharge the cell of the present invention, the overpotential of the reaction is preferably lower than that of the reverse reaction of the reactions $(O_2+4Li^++4e^- \Leftrightarrow 2Li_2O)$ at the cathode of lithium-air cells. The use of a catalyst for an electrode in the active material layer of the cathode reduces the overpotential of the reaction from $A_2O$ to $A_2O_2$ of the cathode reaction formula (II) (specifically, for example, the reaction from $Li_2O$ to $Li_2O_2$).

In the cell of the present invention, even when a gas generating reaction $(A_2O \rightarrow 2A^+ + 2e^- + 0.5O_2)$ occurs as a side-reaction of the reaction from $A_2O$ to $A_2O_2$ (reverse reaction) of the cathode reaction formula (II), generated gas can be easily reduced to $A_2O$ or $A_2O_2$ during discharge in the hermetically sealed cell by the reaction in accordance with the discharge reaction at the cathode of lithium-air cells.

Examples of the catalyst for an electrode include, but are not limited to, compounds containing an element of groups 1 to 17 of the periodic table and simple substances composed of such elements.

Examples of elements of groups 1 to 17 of the periodic table include Li, Na, K, Rb, Cs, Ca, Sr, Ba, Y, La, Ce, Pr, Nd, Ti, V, Cr, Mn, Fe, Co, Ni, Cu, Zn, Ga, Zr, Nb, Mo, Ag, In, Sn, Sb, Hf, Ta, W, Pb, Bi, Si, P, S, Ru, Rh, Pd, W, Re, Os, Ir, Pt, Au, O, S, F, Cl, and C. More preferred are elements of groups 5 to 11 of the periodic table. Still more preferred among the elements of groups 5 to 11 of the periodic table are V, Cr, Mn, Fe, Co, Ni, Cu, Nb, Mo, Ru, Rh, Pd, Ag, Ta, W, Re, Os, Ir, Pt, Au, and C. Further preferred are Ag, Au, Cu, Fe, Mn, Co, Ni, and C.

The catalyst for an electrode can exert its catalytic ability even when it is in contact with particles of $A_2O$ or $A_2O_2$ of the cathode reaction formula (II) or in the form of a solid solution in the crystal structure of $A_2O$ or $A_2O_2$.

The catalyst for an electrode may be a single oxide consisting of an oxide of a single element species represented by the following formula (3).

$$M_aO_b \quad (3)$$

(In the formula, M is a metal atom other than alkali metal atoms; a is a value of 1 to 3; and b is a value of 1 to 4.)

Preferred examples of the metal atom other than alkali metal atoms include Ca, Sr, Ba, Y, La, Ce, Pr, Nd, Ti, V, Cr, Mn, Fe, Co, Ni, Cu, Zn, Ga, Zr, Nb, Mo, Ag, In, Sn, Sb, Hf, Ta, W, Pb, Bi, Si, P, and S. More preferred are V, Cr, Mn, Fe, Co, Ni, Cu, Nb, Mo, Ag, Ta, and W. Still more preferred are Mn, Co, and Ni.

In the formula (3), a is preferably 1, 2, or 3, and b is preferably 1, 2, 3, or 4.

The single oxide is more preferably MO (namely, a=1 and b=1), $MO_2$ (namely, a=1 and b=2), $M_2O_3$ (namely, a=2 and b=3), or $M_3O_4$ (namely, a=3 and b=4).

Any catalysts for an electrode may be used alone or in combination.

The catalyst for an electrode may be a complex oxide containing two or more element species represented by the following formula (4).

$$QRO_n \quad (4)$$

(In the formula, Q is at least one selected from the group consisting of elements of groups 1 to 3 of the periodic table, R is at least one selected from the group consisting of elements of groups 4 to 15 of the periodic table, and n is a value of 1 to 3.)

Examples of elements of groups 1 to 3 of the periodic table for Q in the formula (4) include Li, Na, K, Rb, Cs, Ca, Sr, Ba, Y, La, Ce, Pr, and Nd. Elements of groups 1 and 2 are preferred among others. More preferred among the elements of groups 1 and 2 are Li and Sr.

Examples of elements of groups 4 to 16 of the periodic table for R in the formula (4) include Ti, V, Cr, Mn, Fe, Co, Ni, Cu, Zn, Ga, Zr, Nb, Mo, Ag, In, Sn, Sb, Hf, Ta, W, Pb, Bi, Si, P, and S. In particular, Fe and Co are preferred.

In the formula, n is a value of 1 to 3, and preferably a value of 2 to 3. More preferably, n is 2 or 2.5.

Any catalysts for an electrode may be used alone or in combination.

The amount of the catalyst for an electrode is preferably 0.1 to 99.9% by mass, more preferably 5 to 99.9% by mass, and still more preferably 10 to 99% by mass relative to the mass (100% by mass) of the active material layer of the cathode.

The catalyst for an electrode may be present on a later-described conductive auxiliary agent. The expression "the catalyst for an electrode is present on a conductive auxiliary agent" means that the conductive auxiliary agent is in the vicinity of or in contact with the catalyst for an electrode, or bound to the catalyst for an electrode, and that the catalyst for an electrode may be present not only on the surface of the conductive auxiliary agent, but also in the conductive auxiliary agent. In this case, the amount of the catalyst for an electrode (the total amount of compound(s) containing an element of any of groups 1 to 17 or such element (s), single oxide(s) represented by the formula (3) and complex oxide (s) represented by the formula (4)) is 0.01 to 300% by mass relative to 100% by mass of the conductive auxiliary agent. The amount is more preferably 0.1 to 150% by mass, still more preferably not less than 10% by mass, and particularly preferably not less than 40% by mass.

As processes for the production of a cathode using the cathode material, the following processes can be mentioned: Process 1 for preparing an alkali metal compound; Process 2 for preparing a cathode mix; and Process 3 for forming a cathode".

In place of an alkali metal compound obtainable by "Process 1 for preparing an alkali metal compound", a commercially available compound may be used. In this case, Process 1 can be omitted.

Preferably, Process 1 for preparing an alkali metal compound includes reacting an alkali metal with atmospheric oxygen or causing an alkali metal to react under an air atmosphere by heating, thereby providing an alkali metal compound. This step allows safe preparation of an alkali metal compound under comparatively mild conditions.

The reaction temperature is preferably 0° C. to 180° C. The period of reaction may be set according to factors such as the amount of alkali metal and the reaction temperature, but is preferably 0.5 to 20 hours.

In order to prepare a target alkali metal compound at a lower temperature in a short time, the alkali metal may be micronized into fine powder with an average particle size of 0.01 to 2 μm before the step of reacting an alkali metal in the air.

The micronization may be accomplished by any method, and a mortar, bead mill, ball mill, cutter mill, disc mill, stamp mil, hummer mill, jet mill, or the like can be used.

The step of micronizing an alkali metal into fine powder with an average particle size of 0.01 to 2 μm may be carried out at the same time as the step of reacting an alkali metal in the air. Namely, the alkali metal may be reacted in the air at the same time as micronizing the alkali metal.

The process for preparing an alkali metal compound may include a step of purifying the obtained alkali metal compound after the step of reacting an alkali metal in the air. Examples of the purification step include washing with water, treatment with an acid, washing with acetone, and washing with methanol.

In Process 2 for preparing a cathode mix, in the case where optional components such as a catalyst for an electrode, a conductive auxiliary agent, and an organic compound are used with the essential alkali metal compound, a cathode mix can be prepared by mixed these materials.

In the case where the cathode material (cathode mix) according to the present invention is prepared in the form of particles, the particles preferably have an average particle size of not more than 1000 μm.

The average particle size can be measured with a transmission electron microscope (TEM), a scanning electron microscope (SEM), a particle size distribution analyzer, or the like. Examples of the form of particles include fine powder, powder, particulates, granules, scales, and polyhedrons. Particles having such an average particle size can be produced by a method which includes grinding particles with, for example, a ball mill, dispersing the resulting coarse particles in a dispersant to give a predetermined particle size, and then dry-hardening the particles; a method which includes sieving the coarse particles to classify the particle sizes; a method which includes optimizing the conditions for producing particles, thereby producing (nano) particles having a predetermined particle size; and the like methods. For a group of many particles having diverse particle sizes, a typical particle size in this group of particles is defined as the average particle size of the group. The particle size is the length of particles measured in conformity with a general rule. For example, (i) in the case of microscopy, two or more lengths of one particle, such as the major axis diameter, the minor axis diameter, and the unidirectional particle diameter, are measured and the average value thereof is defined as the particle size. Preferably, at least 100 particles are measured. (ii) In the case of image analysis, light-shielding, or Coulter principle, the directly measured value (e.g. projected area, volume) as the size of a particle is converted into a systematic shape (e.g. circle, sphere, cube) of the particle based on a geometric formula, and the diameter of the systematic shape is defined as the particle size (equivalent size). (iii) In the case of sedimentation or laser diffraction scattering, the measured value is calculated into a particle size (effective size) based on the physical law (e.g. Mie theory) deduced by supposition of a specific particle shape and specific physical conditions. (iv) In the case of dynamic light scattering, the rate of diffusion (diffusion coefficient) of particles in a liquid owing to Brownian motion is measured to calculate the particle size.

Process 3 for forming a cathode is preferably implemented as follows.

First, the cathode mix is optionally combined with water and/or an organic solvent, and the catalyst for an electrode, a later-described conductive auxiliary agent, and/or the organic compound, and kneaded into a paste. Next, the obtained paste mixture is applied to a current collector such as a metal foil (e.g. an aluminum foil) or a metal mesh (e.g. an aluminum mesh, a nickel mesh) in such a manner to form a coat with a thickness as uniform as possible. After coat formation, the coat is preferably dried at 0° C. to 250° C. The drying temperature is more preferably 15° C. to 200° C. The drying may be performed in vacuo. After drying, the coat may be pressed at a pressure of 0.0001 to 20 t using a roll press or the like. The pressing pressure is more preferably 0.001 to 15 t, still more preferably not less than 0.01 t, and particularly preferably not less than 0.1 t.

The thickness of the cathode is preferably, for example, 1 nm to 2000 μm, more preferably 10 nm to 1500 μm, and still more preferably 100 nm to 1000 μm.

In Processes 1 to 3, a mixer, blender, kneader, bead mill, ball mill, mechanical mill, or the like can be used to mix or knead materials. Upon mixing, water or an organic solvent such as methanol, ethanol, propanol, isopropanol, tetrahydrofuran, or N-methylpyrrolidone may be added. In order to prepare a mixture of particles with desired particle sizes, an operation such as the above-mentioned sieving method may be performed before and/or after mixing or kneading.

Next, the active material layer of the anode of the cell of the present invention contains an anode active material containing at least one selected from the group consisting of an alkali metal, tin, titanium, boron, nitrogen, silicon, and carbon.

Examples of the alkali metal include Li, Na, K, Rb, Cs, and Fr. In terms of theoretical capacity and element strategy, Li and Na are preferable, and Li is more preferable.

Examples of the carbon include graphite, amorphous carbon, carbon nanofoam, activated carbon, graphene, nanographene, graphene nanoribbon, fullerenes, carbon black, fibrous carbon, carbon nanotube, carbon nanohorn, Ketjen black, acetylene black, carbon fibers, and vapor grown carbon fibers. Preferred among these are graphite, graphene, fibrous carbon, carbon nanotube, and acetylene black. More preferred are graphite, graphene, fibrous carbon, carbon nanotube, acetylene black, carbon fibers, and vapor grown carbon fibers.

The anode active material used in the cell of the present invention may further contain other compounds, as long as it contains at least one selected from the group consisting of an alkali metal, tin, titanium, boron, nitrogen, silicon, and carbon.

The total amount of the anode active material containing at least one selected from the group consisting of an alkali metal, tin, titanium, boron, nitrogen, silicon, and carbon is preferably 1.0% by mass or more relative to the mass (100% by mass) of the active material of the anode in terms of theoretical capacity. The amount is more preferably 2.0 to 100% by mass, still more preferably 30 to 100% by mass, and particularly preferably 90% by mass or more.

In the cell of the present invention, the active material layer of the anode may be made solely of the anode active material, or may be made of an anode mix containing the anode active material, a conductive auxiliary agent, and an organic compound. Typically, the anode includes the active material layer and a current collector, such as a metal foil (e.g. aluminum foil) or a metal mesh (e.g. aluminum mesh, nickel mesh), which is bound to the active material layer of the anode.

The conductive auxiliary agent and the organic compound are described later.

The electrolyte in the cell of the present invention is not particularly limited, but preferably includes an alkali metal ion in a dissolved state in a medium. Namely, the cell of the present invention preferably includes an electrolyte solution containing an alkali metal ion dissolved in a medium.

Examples of the electrolyte include $LiPF_6$, $LiBF_4$, $LiClO_4$, $LiN(SO_2F)_2$, $LiN(SO_2CF_3)_2$, $LiN(SO_2C_2F_5)_2$, $Li(BC_4O_8)$, LiF, $LiB(CN)_4$, $NaPF_6$, $NaBF_4$, $NaClO_4$, $NaN(SO_2F)_2$, $NaN(SO_2CF_3)_2$, $NaN(SO_2C_2F_5)_2$, $Na(BC_4O_8)$, NaF, $NaB(CN)_4$, potassium hydroxide, sodium hydroxide, lithium carbonate, lithium hydroxide, potassium fluoride, and potassium borate. Preferred are $LiPF_6$, $LiBF_4$, $LiClO_4$, $LiN(SO_2F)_2$, $LiN(SO_2CF_3)_2$, $LiN(SO_2C_2F_5)_2$, $Li(BC_4O_8)$, LiF, and $LiB(CN)_4$.

The electrolyte solution may be any of common electrolyte solutions for cells, and thus is not particularly limited. Examples of organic solvent-based electrolyte solutions include ethylene carbonate, propylene carbonate, dimethyl carbonate, diethyl carbonate, ethyl methyl carbonate, γ-butyrolactone, diethyl ether, 1,2-dimethoxyethane, 1,2-diethoxyethane, dimethoxymethane, diethoxymethane, tetrahydrofuran, 2-methyltetrahydrofuran, acetonitrile, benzonitrile, dimethyl sulfoxide, ethylene glycol, ethylene glycol dialkyl ethers, diethylene glycol, diethylene glycol dialkyl ethers, triethylene glycol, triethylene glycol dialkyl ethers, polyethylene glycol, polyethylene glycol dialkyl ethers, polyethylene glycol monoalkyl ether, sulfolane, fluorocarbonates, fluoroethers, ionic liquids, gel compound-containing electrolyte solutions, and polymer-containing electrolyte solutions. Examples of aqueous electrolyte solutions include alkaline aqueous solutions such as aqueous solutions of potassium hydroxide, sodium hydroxide, or lithium hydroxide; and acidic aqueous solutions such as sulfuric acid aqueous solutions. Only one kind of electrolyte solution may be used, or two or more kinds of electrolyte solutions may be used in combination. In the case of using two or more kinds, the solutions may be mixed, or may be separated from each other with a partition.

The electrolyte concentration in the electrolyte solution is preferably 0.01 to 15 mol/L. The use of an electrolyte solution having a concentration within such a range ensures good cell performance. The concentration is more preferably 0.1 to 12 mol/L.

The electrolyte solution may contain additives. Examples of additives include materials that can form a protective coat on the cathode or the anode, and materials that, in the case where propylenecarbonate is used as an electrolyte solution, prevent insertion of propylenecarbonate into graphite. Specifically, mention may be made of vinylene carbonate, fluoroethylene carbonate, chloroethylene carbonate, bromoethylene carbonate, ethylene sulfite, propylene sulfite, crown ethers, boron-containing anion receptors, and aluminum-containing anion receptors. These additives may be used alone or in combination.

The following demonstrates a conductive auxiliary agent, an organic compound, and a separator that can be used for the production of the cell of the present invention.

The conductive auxiliary agent is preferably a substance having a conductivity within the range of those of electrical materials. Specifically, the conductive auxiliary agent preferably contains a metal, conductive ceramics, or a carbon material. Examples of the metal include nickel powder, aluminum powder, zinc powder, gold powder, and mesoporous gold. Examples of the carbon material (conductive carbon) include graphite, amorphous carbon, carbon nanofoam, activated carbon, graphene, nanographene, graphene nanoribbon, fullerene, carbon black, fibrous carbon, carbon nanotube, carbon nanohorn, Ketjen black, acetylene black, carbon fibers, and vapor grown carbon fiber. Preferred among these are graphene, fibrous carbon, carbon nanotube, acetylene black, carbon fibers, and vapor grown carbon fiber. The conductive auxiliary agent is more preferably graphene, fibrous carbon, carbon nanotube, acetylene black, zinc metal, gold powder, and mesoporous gold.

The conductive auxiliary agent acts to improve the conductivity of the electrode (s). Any one, or two or more kinds thereof may be used. The conductivity may be improved by coating the alkali metal compound with carbon. The conductive auxiliary agent may have catalytic activity to reduce the overpotential of the reaction at the cathode represented by the reaction formula (II).

The amount of the conductive auxiliary agent is preferably 0.001 to 90% by mass relative to the mass (100% by mass) of the active material layer of the cathode (or the anode). When the amount of the conductive auxiliary agent is within this range, the cathode (or the anode) exhibits better cell performance. The amount is more preferably 0.01 to 70% by mass, still more preferably 0.05 to 55% by mass, and particularly preferably 0.05 to 50% by mass.

As examples of the organic compound, salts of organic compounds can be mentioned besides organic compounds. These may be used alone or in combination. Specific examples include poly(meth)acrylic acid-containing polymers, poly(meth)acrylic acid salt-containing polymers, polyacrylonitrile-containing polymers, polyacrylamide-containing polymers, polyvinyl chloride-containing polymers, polyvinyl alcohol-containing polymers, polyethylene oxide-containing polymers, polypropylene oxide-containing polymers, polybutene oxide-containing polymers, polyethylene-containing polymers, polypropylene-containing polymers, polybutene-containing polymers, polyhexene-containing polymers, polyoctene-containing polymers, polybutadiene-containing polymers, polyisoprene-containing polymers, analgen, benzene, trihydroxybenzene, toluene, piperonyl aldehyde, Carbowax, carbazole, cellulose, cellulose acetate, hydroxyalkyl celluloses, carboxymethyl cellulose, dextrin, polyacetylene-containing polymers, polyethyleneimine-containing polymers, polyamide-containing polymers, polystyrene-containing polymers, polytetrafluoroethylene-containing polymers, polyvinylidene fluoride-containing polymers, polypentafluoroethylene-containing polymers, polymaleic acid (anhydride)-containing polymers, polymaleate-containing polymers, polyitaconic acid (anhydride)-containing polymers, polyitaconate-containing polymers, ion exchange polymers for cation or anion-exchange membranes or the like, cyclized polymers, sulfonic acid salts, sulfonic acid salt-containing polymers, quaternary ammonium salts, quaternary ammonium salt-containing polymers, quaternary phosphonium salts, and polymeric quaternary phosphonium salt/ammonium.

In the case where the organic compound or organic compound salt is a polymer, the polymer can be prepared by radical polymerization, radical (alternating) copolymerization, anionic polymerization, anionic (alternating) copolymerization, cationic (alternating) polymerization, cationic (alternating) copolymerization, or electrolytic polymerization of monomer(s) to be incorporated into the polymer as units.

The organic compound or organic compound salt can function as a binder for binding particles or particles and the current collector or as a dispersant for effectively dispersing particles.

The organic compound or organic compound salt is preferably a poly(meth)acrylic acid salt-containing polymer, polyvinyl alcohol-containing polymer, polyethylene oxide-containing polymer, polypropylene oxide-containing polymer, polybutene oxide-containing polymer, cellulose, cellulose acetate, hydroxyalkyl cellulose, carboxymethyl cellulose, polytetrafluoroethylene-containing polymer, polyvinylidene fluoride-containing polymer, polypentafluoroethylene-containing polymer, polymaleate-containing polymer, polyitaconate-containing polymer, ion exchange membrane polymer, sulfonic acid salt-containing polymer, quaternary ammonium salt-containing polymer, or quaternary phosphonium salt polymer.

The amount of the organic compound or organic compound salt, more preferably the amount of the polymer, is preferably 0.01 to 50% by mass relative to the mass (100% by mass) of the active material layer of the cathode (or the anode). When the amount of the organic compound or organic compound salt, more preferably the amount of the polymer, is in the range, the cathode (or the anode) exhibits much better cell performance. The amount is more preferably 0.01 to 45% by mass, and still more preferably 0.1 to 40% by mass.

In the case where the cathode mix or the anode mix contains additional component(s) other than the electrode active material, catalyst for an electrode, conductive auxiliary agent, and organic compound, the amount of the additional components is preferably 0.01 to 10% by mass relative to the mass (100% by mass) of the active material layer of the cathode (or the anode). The amount is more preferably 0.05 to 7% by mass, and still more preferably 0.1 to 5% by mass.

The separator is a member that separates the cathode and the anode, holds the electrolyte solution to ensure ion conduction between the cathode and the anode. The separator is not particularly limited. Examples thereof include high-molecular-weight materials with micropores such as polyethylene, polypropylene, polytetrafluoroethylene, polyvinylidene fluoride, cellulose, cellulose acetate, hydroxyalkyl celluloses, carboxymethyl cellulose, polyvinyl alcohol, cellophane, polystyrene, polyacrylonitrile, polyacrylamide, polyvinyl chloride, polyamide, vinylon, and poly(meth)acrylic acid; gel compounds; ion exchange membrane polymers; cyclized polymers; poly(meth)acrylic acid (salt)-containing polymers; sulfonic acid (salt)-containing polymers; quaternary ammonium salt-containing polymers; quaternary phosphonium salt-containing polymers; and solid electrolytes such as ion conductive polymers and ion conductive glass.

The cell of the present invention includes the cathode, the anode, and the electrolyte, and these are hermetically sealed in the cell.

The cell of the present invention may be in any form without limitation, and may be in the form of a primary cell or a secondary cell (rechargeable cell) that can be discharged and recharged, or in a form including a mechanical charging system or a form with a third electrode in addition to the cathode and the anode. The cell may be assembled in the charged state or in the discharged state.

Advantageous Effects of Invention

The cell of the present invention has the above-mentioned structure, and makes use of a novel principle different from those of conventional cells. Specifically, the cell of the present invention has a high theoretical voltage and theoretical capacity, has high cell performance to be able to discharge and recharge multiple times, and has cost and environmentally-friendly advantages.

DESCRIPTION OF EMBODIMENTS

The following examples are offered to demonstrate the present invention in more detail, but should not be construed as limiting the present invention. All parts are by mass unless otherwise specified, and all percentages are by mass unless otherwise specified.

PREPARATION 1

An amount of 28 mg of lithium oxide ($Li_2O$, produced by Strem Chemicals Inc.) as a cathode active material, 80 mg of a catalyst for an electrode (60% Ag/C, produced by Alfa Aesar), and 15 mg of polytetrafluoroethylene (PTFE) were kneaded into a cathode mix. A 14 mg portion of the cathode mix was pressed onto 80 mg of a nickel mesh, whereby a cathode was prepared.

PREPARATION 2

An amount of 85 mg of a catalyst for an electrode (60% Ag/C, produced by Alfa Aesar) and 15 mg of PTFE were kneaded into a cathode mix. A 14 mg portion of the cathode mix was pressed onto 80 mg of a nickel mesh, whereby a cathode was prepared.

EXAMPLE 1

A three-electrode cell was prepared in which the working electrode was the cathode prepared in Preparation 1, the counter electrode and the reference electrode were lithium metal, and the electrolyte solution was a 1 M $LiClO_4$/propylenecarbonate (PC) electrolyte solution. The three-electrode cell was measured by cyclic voltammetry (CV) in a glove box. In the measurement, the electrode potential was changed from the open circuit voltage (OCV) 3.38 V→4 V→1.2 V→OCV 3.38 V at a scan rate of 0.2 mV/s.

Figure 1:
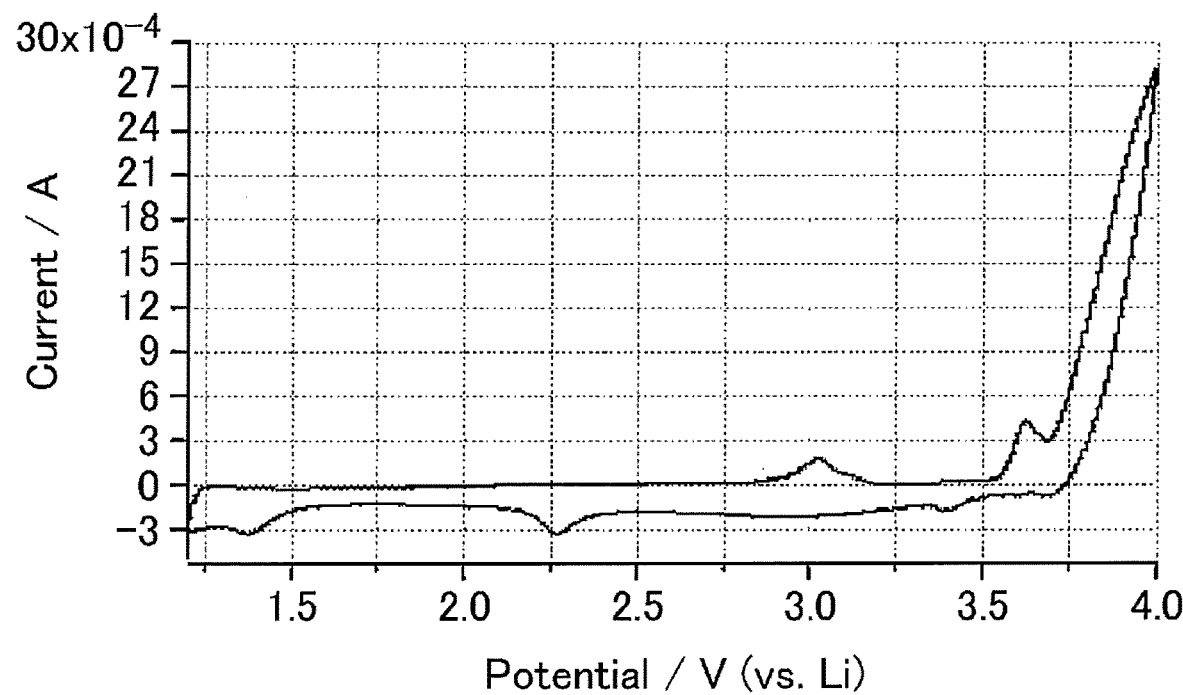
FIG. 1 is a graph showing the results of cyclic voltammetry using a cathode prepared in Preparation 1.

FIG. 1 shows the results. In FIG. 1, the horizontal axis represents the potential, and the vertical axis represents the current.

The results shown in FIG. 1 demonstrate that the use of the cathode prepared in Preparation 1 resulted in oxidation peaks at approximately 3.05 V and approximately 3.7 V, and a reduction peak at approximately 2.25 V. Considering that the theoretical potential of the reaction $2Li_2O \rightarrow Li_2O_2 + 2Li^+ + 2e^-$ is 2.87 V, the oxidation and reduction peaks observed in this experiment were concluded as oxidation reduction peaks corresponding to the forward and reverse reactions of the formula.

COMPARATIVE EXAMPLE 1

Following the same procedure as in Example 1 and using the cathode prepared in Preparation 2 as a working electrode, cyclic voltammetry (CV) was performed.

Figure 2:
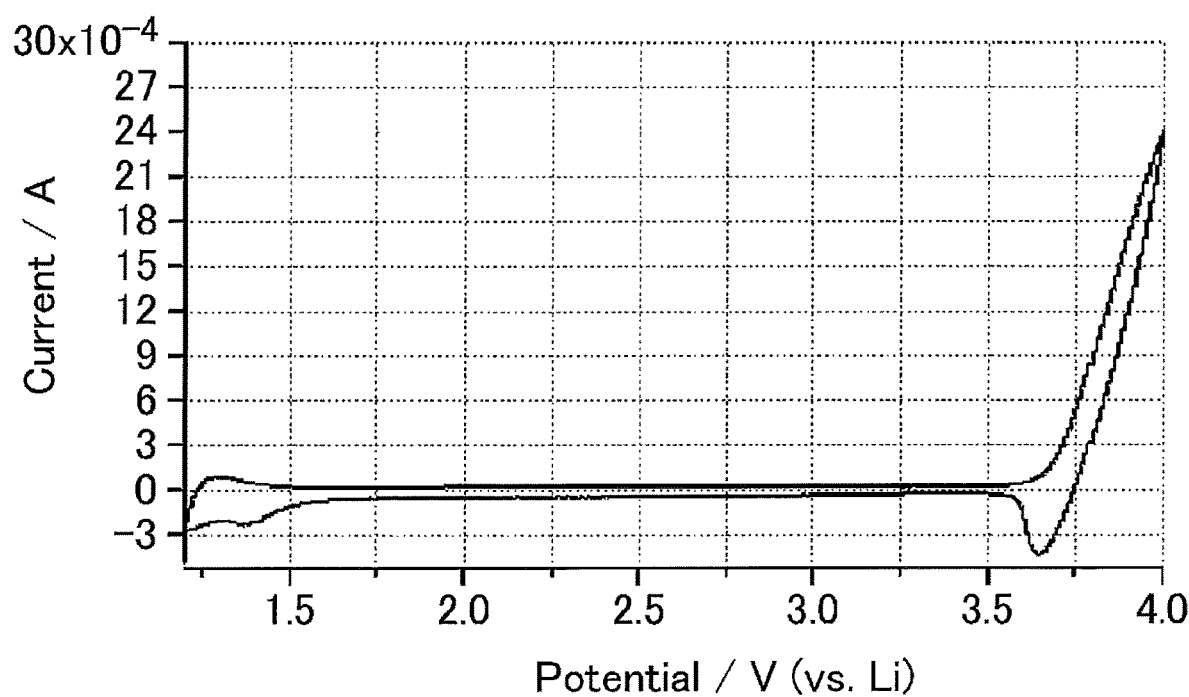
FIG. 2 is a graph showing the results of cyclic voltammetry using a cathode prepared in Preparation 2.

FIG. 2 shows the results. The results shown in FIG. 2 demonstrate that the use of the cathode prepared in Preparation 2 which is free from $Li_2O$ resulted in no oxidation and reduction peak.

PREPARATION 3

An amount of 44 mg of lithium oxide ($Li_2O$, produced by Strem Chemicals Inc.) as a cathode active material, 84 mg of artificial graphite KS6L (produced by TIMCAL Graphite & Carbon's), and 7 mg of polytetrafluoroethylene (PTFE) were kneaded into a cathode mix. A 6 mg portion of the cathode mix was pressed onto 80 mg of a nickel mesh, whereby a cathode was prepared.

PREPARATION 4

Following the same procedure as in Preparation 3 and using lithium peroxide ($Li_2O_2$, produced by Alfa Aesar) as a cathode active material instead of lithium oxide, a cathode mix was prepared. A 6 mg portion of the cathode mix was pressed onto 80 mg of a nickel mesh, whereby a cathode was prepared.

PREPARATION 5

Following the same procedure as in Preparation 3 and using sodium oxide ($Na_2O$, produced by Alfa Aesar) as a cathode active material instead of lithium oxide, a cathode mix was prepared. A 6 mg portion of the cathode mix was pressed onto 80 mg of a nickel mesh, whereby a cathode was prepared.

PREPARATION 6

Following the same procedure as in Preparation 3 and using sodium peroxide ($Na_2O_2$, produced by Wako Pure Chemical Industries, Ltd.) as a cathode active material instead of lithium oxide, a cathode mix was prepared. A 6 mg portion of the cathode mix was pressed onto 80 mg of a nickel mesh, whereby a cathode was prepared.

EXAMPLE 2

Three-electrode cells were prepared in which the cathodes prepared in Preparations 3 to 6 were individually used as a working electrode, the counter electrode and the reference electrode were lithium metal, and the electrolyte solution was a propylenecarbonate (PC) electrolyte solution. The three-electrode cells were subjected to a charge/discharge test in a glove box. Charging and discharging were performed under the following conditions: cut-off potential: 1.4 to 4.2 V; and current load: 0.134 A per mol of the active material. In the experiments using the cathodes prepared in Preparations 3 and 5, the cycle was started with a charge phase, and in the experiments using the cathodes prepared in Preparations 4 and 6, the cycle was started with a discharge phase. Table 1 shows the results.

TABLE 1

| (mAh/g) | Preparation 3 | Preparation 4 | Preparation 5 | Preparation 6 |
|---|---|---|---|---|
| Discharge capacity in first cycle | 79 | 150 | 146 | 115 |
| Discharge capacity in third cycle | 66 | 41 | 13 | 16 |

As seen in Table 1, in all the cases using the cathodes, the cells could be discharged and recharged multiple times. It was also revealed that the cathodes according to the present invention can function regardless of whether they are in a discharged state or a charged state when assembled into a cell.

PREPARATION 7 (PROCESS FOR PREPARING $Li_2O/Fe_2O_3$ CATHODE)

Figure 3:
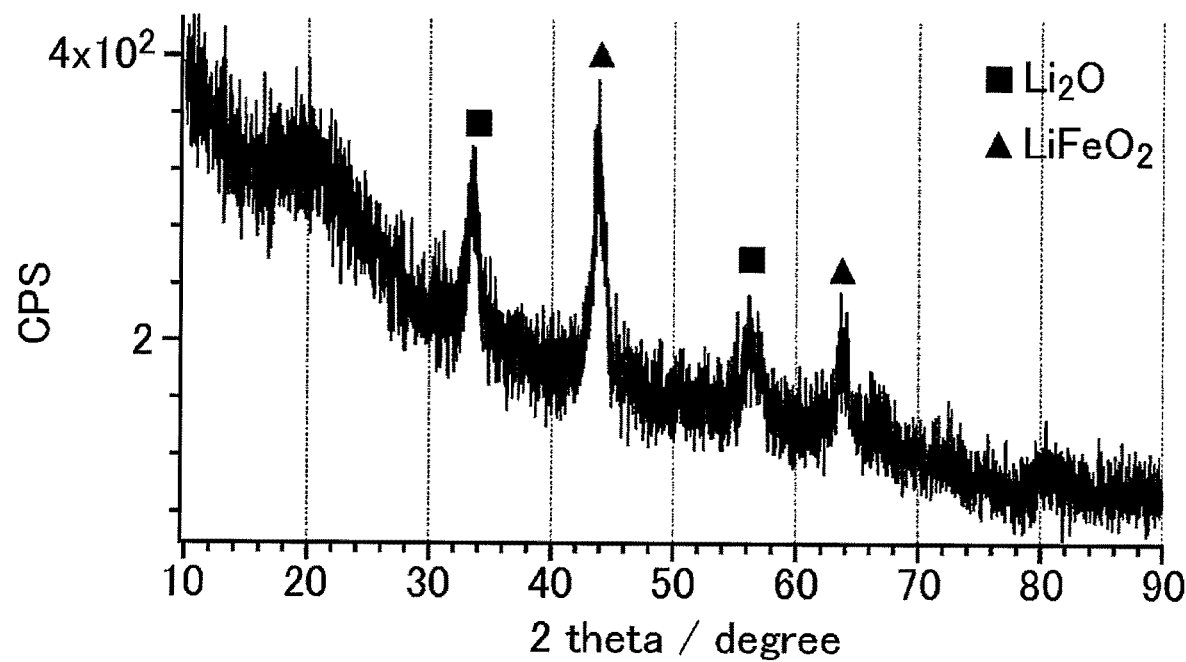
FIG. 3 is a graph showing the results of XRD measurement of solid powder prepared in Preparation 7.

An amount of 1.99 g of lithium oxide (produced by Kojundo Chemical Laboratory Co., Ltd.) as a cathode active material and 2.09 g of α-iron oxide (produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 60 hours). The whole procedure was performed in an argon-substituted glove box with a moisture concentration of not higher than 1 ppm. FIG. 3 shows the results of XRD measurement of the resultant solid powder. The solid powder was found to be a mixture of $Li_2O$ and $LiFeO_2$. A 172 mg portion of the solid powder, 200 mg of acetylene black as a conductive auxiliary agent, and 28 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 8 (PROCESS FOR PREPARING $Li_2O/Co_3O_4$ CATHODE)

Figure 4:
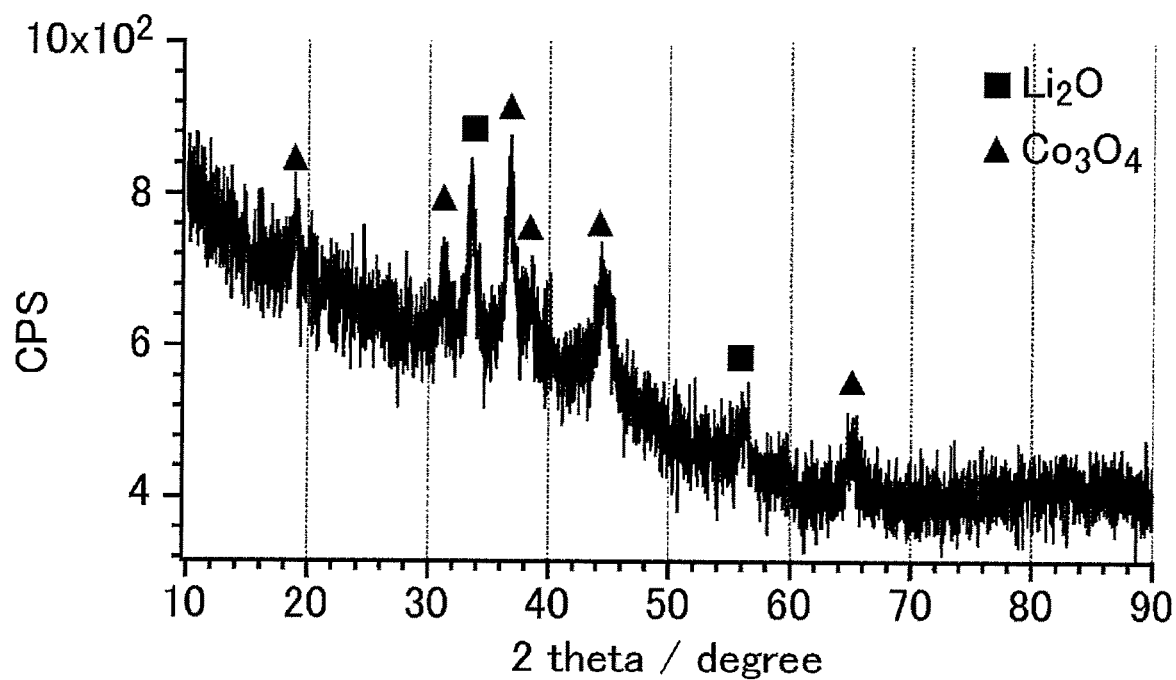
FIG. 4 is a graph showing the results of XRD measurement of solid powder prepared in Preparation 8.

An amount of 1.43 g of lithium oxide (produced by Kojundo Chemical Laboratory Co., Ltd.) as a cathode active material and 1.54 g of cobalt oxide ($Co_3O_4$, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 60 hours). The whole procedure was performed in an argon-substituted glove box with a moisture concentration of not higher than 1 ppm. FIG. 4 shows the results of XRD measurement of the resultant solid powder. The solid powder was found to be a mixture of $Li_2O$ and $Co_3O_4$. A 126 mg portion of the solid powder, 142 mg of acetylene black as a conductive auxiliary agent, and 20 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 9 (PROCESS FOR PREPARING $Li_2O/NiO$ CATHODE)

Figure 5:
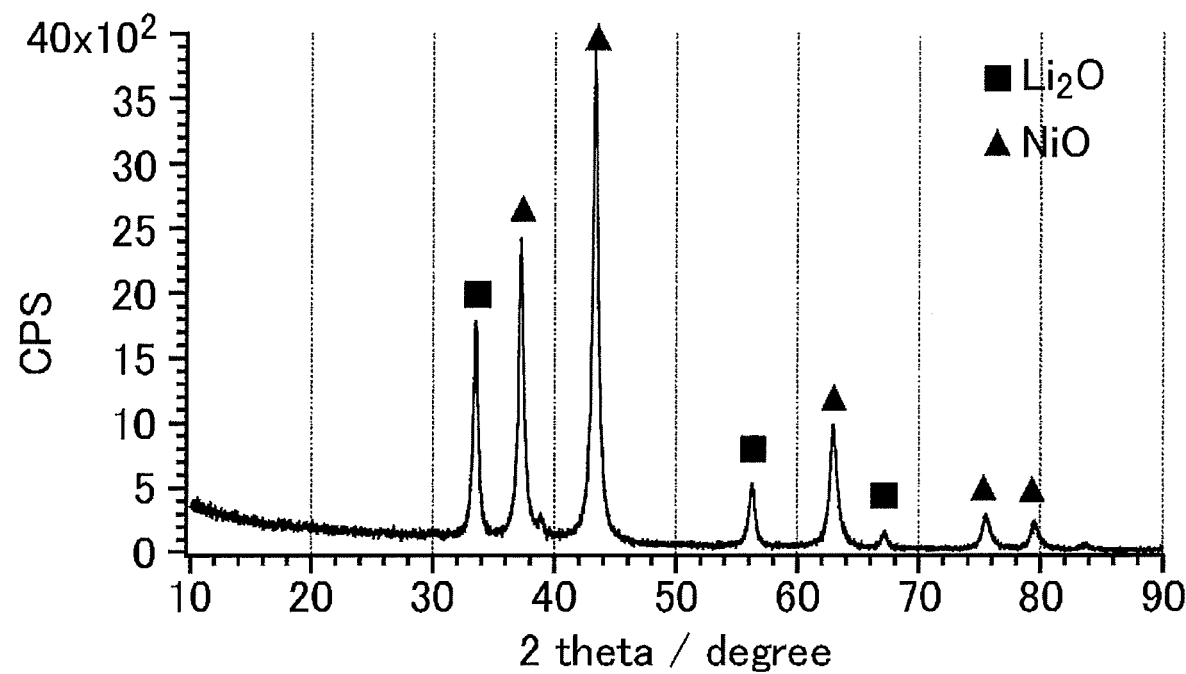
FIG. 5 is a graph showing the results of XRD measurement of solid powder prepared in Preparation 9.

An amount of 2.75 g of lithium oxide (produced by Kojundo Chemical Laboratory Co., Ltd.) as a cathode active material and 2.74 g of nickel oxide (NiO, produced by Kanto Chemical Co., Inc.) as a catalyst for an electrode were combined in a planetary ball mill pot, and mixed using a planetary ball mill (under conditions in which 25 zirconia balls (10 mmϕ) were operated at a rate of rotation of 600 rpm for 60 hours). The whole procedure was performed in an argon-substituted glove box with a moisture concentration of not higher than 1 ppm. FIG. 5 shows the results of XRD measurement of the resultant solid powder. The solid powder was found to be a mixture of $Li_2O$ and NiO. A 73 mg portion of the solid powder, 89 mg of acetylene black as a conductive auxiliary agent, and 14 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 10 (PROCESS FOR PREPARING $Li_2O/LiCoO_2$ CATHODE)

Figure 6:
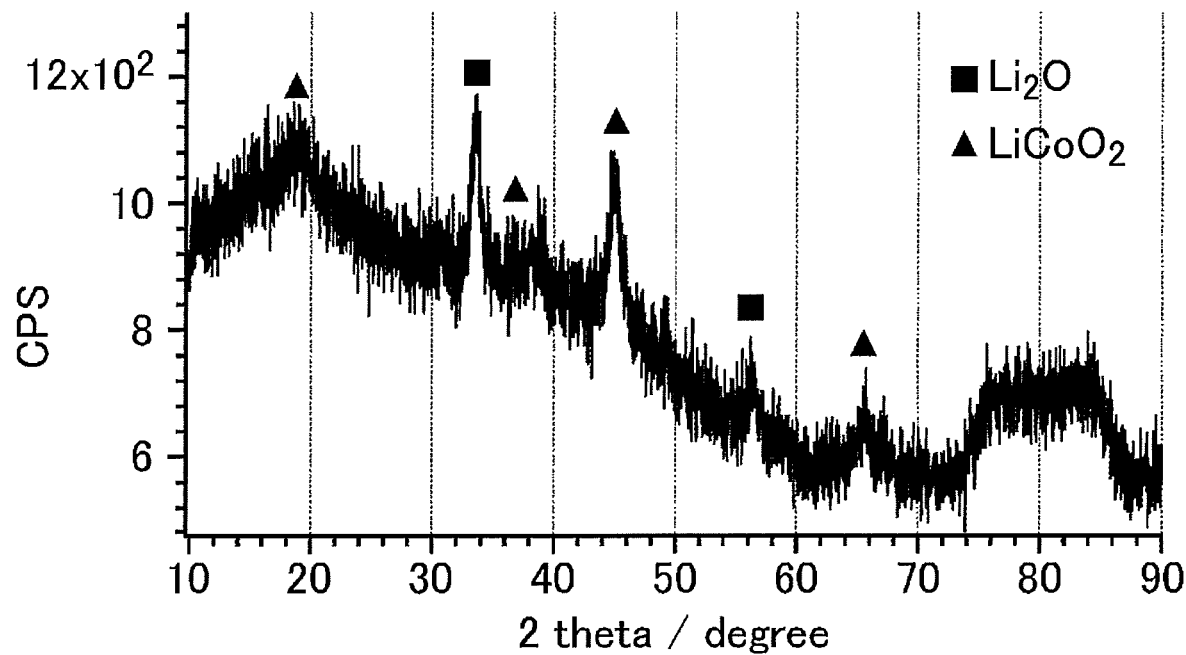
FIG. 6 is a graph showing the results of XRD measurement of solid powder prepared in Preparation 10.

An amount of 2.32 g of lithium oxide (produced by Kojundo Chemical Laboratory Co., Ltd.) as a cathode active material and 3.05 g of lithium cobalt oxide (produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 60 hours). The whole procedure was performed in an argon-substituted glove box with a moisture concentration of not higher than 1 ppm. FIG. 6 shows the results of XRD measurement of the resultant solid powder. The solid powder was found to be a mixture of $Li_2O$ and $LiCoO_2$. A 61 mg portion of the solid powder, 77 mg of acetylene black as a conductive auxiliary agent, and 10 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 11 (PROCESS FOR PREPARING $Li_2O/MnO_2$ CATHODE)

Figure 7:
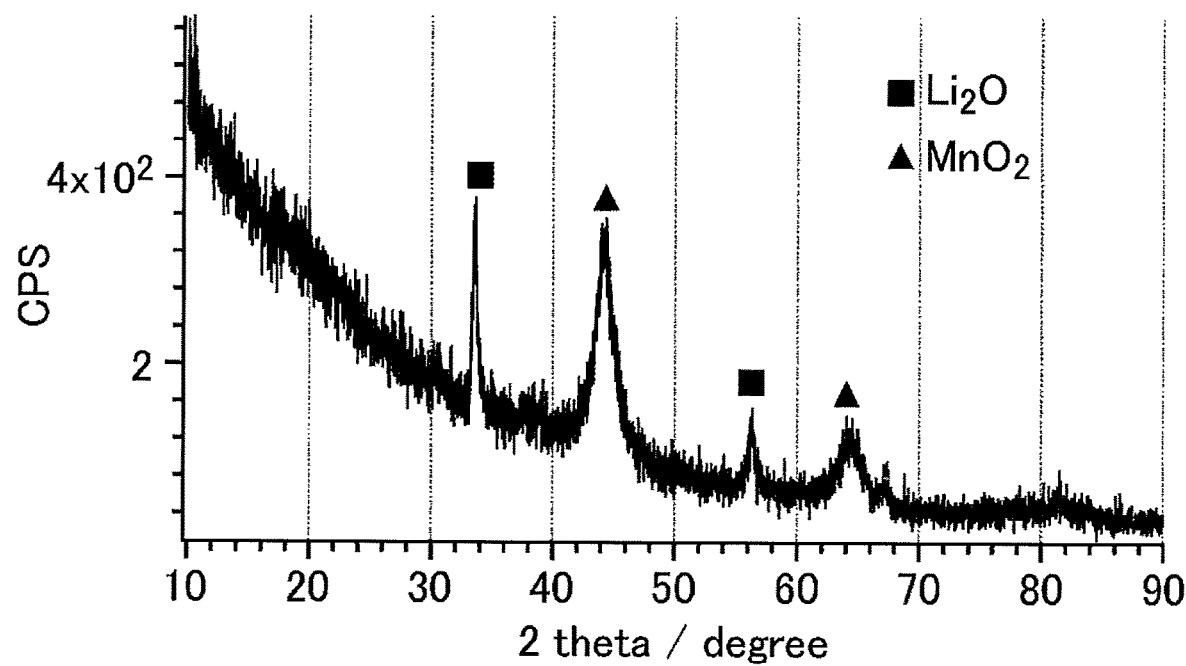
FIG. 7 is a graph showing the results of XRD measurement of solid powder prepared in Preparation 11.

An amount of 1.90 g of lithium oxide (produced by Kojundo Chemical Laboratory Co., Ltd.) as a cathode active material and 2.22 g of manganese dioxide (produced by Wako Pure Chemical Industries, Ltd.) as a catalyst for an electrode were combined in a planetary ball mill pot, and mixed using a planetary ball mill (under conditions in which 25 zirconia balls (10 mmφ were operated at a rate of rotation of 600 rpm for 60 hours). The whole procedure was performed in an argon-substituted glove box with a moisture concentration of not higher than 1 ppm. FIG. 7 shows the results of XRD measurement of the resultant solid powder. The solid powder was found to be a mixture of $Li_2O$ and $MnO_2$. A 113 mg portion of the solid powder, 134 mg of acetylene black as a conductive auxiliary agent, and 21 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 12 (PROCESS FOR PREPARING $Li_2O/SrCoO_{2.5}$ CATHODE)

Figure 8:
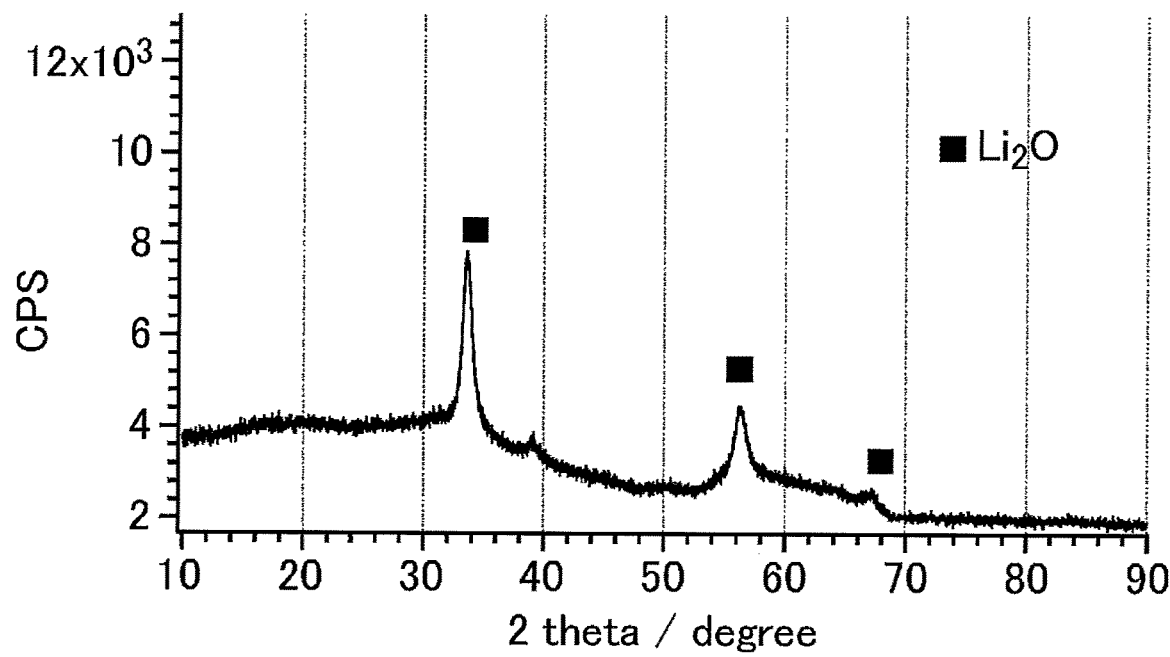
FIG. 8 is a graph showing the results of XRD measurement of solid powder prepared in Preparation 12.

An amount of 4.43 g of strontium carbonate (produced by Wako Pure Chemical Industries, Ltd.) and 2.41 g of cobalt oxide ($Co_3O_4$, produced by Wako Pure Chemical Industries, Ltd.) were mixed in an agate mortar, and fired under an air atmosphere at 900° C. for 12 hours, whereby an oxygen-deficient perovskite compound $SrCoO_{2.5}$ was obtained. An amount of 0.98 g of lithium oxide (produced by Kojundo Chemical Laboratory Co., Ltd.) as a cathode active material and 0.48 g of the $SrCoO_{2.5}$ prepared above as a catalyst for an electrode were combined in a planetary ball mill pot, and mixed using a planetary ball mill (under conditions in which 25 zirconia balls (10 mmφ were operated at a rate of rotation of 600 rpm for 60 hours). The whole procedure was performed in an argon-substituted glove box with a moisture concentration of not higher than 1 ppm. FIG. 8 shows the results of XRD measurement of the resultant solid powder. The solid powder was found to be a mixture of $Li_2O$ and amorphous $SrCoO_{2.5}$. A 35 mg portion of the solid powder, 46 mg of acetylene black as a conductive auxiliary agent, and 7 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 3 (CHARGE/DISCHARGE TEST)

Figure 9:
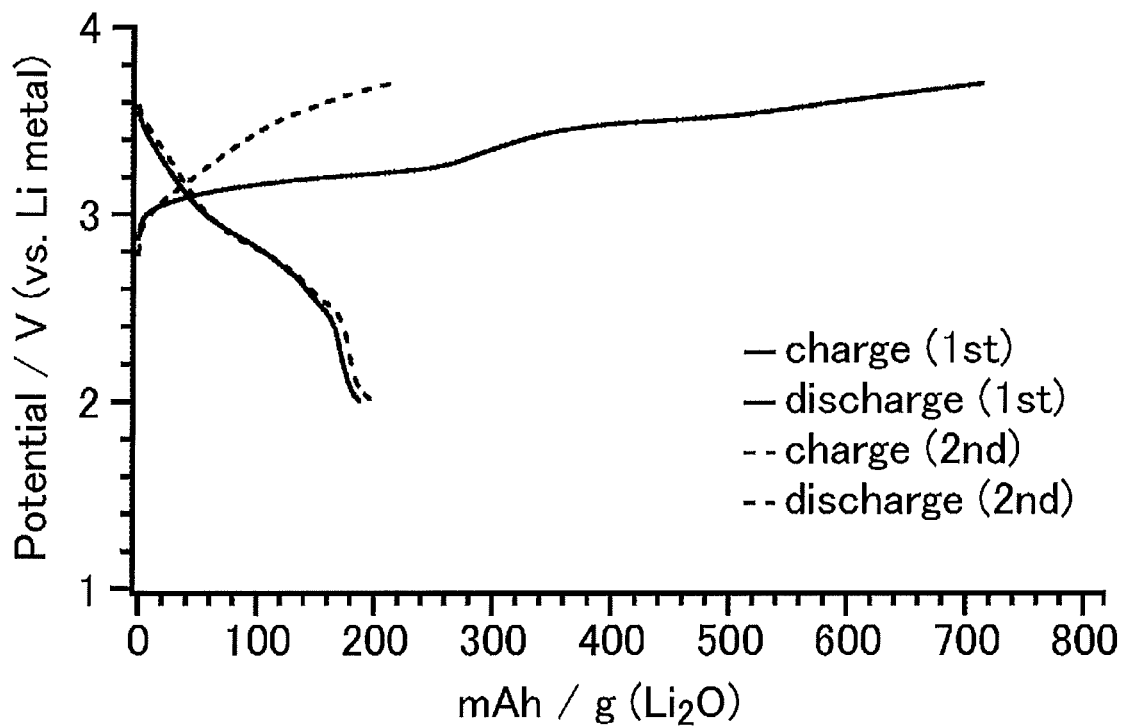
FIG. 9 is a graph showing the results of a charge/discharge test in Example 3.

A charge/discharge test was performed using a three-electrode cell having a conventional structure. The working electrode was the $Li_2O/Fe_2O_3$ cathode mix electrode prepared in Preparation 7, the counter and reference electrodes were lithium metal, and the electrolyte solution was a 1 M LiTFSI DME electrolyte solution (LiTFSI: lithium bis(trifluoromethanesulfonyl)imide, $[LiN(SO_2CF_3)_2]$, DME: 1,2-dimethoxyethane). After charging at a current density of 4.5 mA/g of the cathode active material, discharging was performed at a similar current density. FIG. 9 shows the results of the charge/discharge test. As seen in FIG. 9, the use of lithium oxide as a cathode active material allows for repetition of charging and discharging.

EXAMPLE 4 (CHARGE/DISCHARGE TEST)

Figure 10:
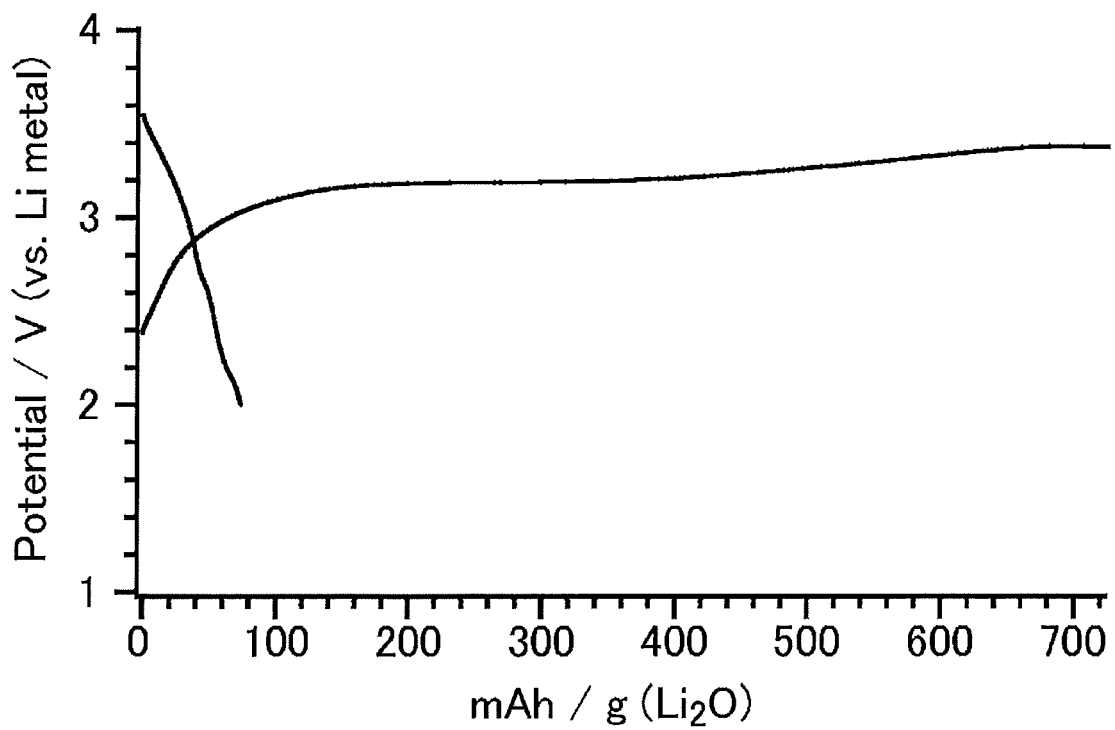
FIG. 10 is a graph showing the results of a charge/discharge test in Example 4.

The charge/discharge test was performed under the same conditions as in Example 3 using the $Li_2O/Co_3O_4$ cathode mix electrode prepared in Preparation 8 as a working electrode. FIG. 10 shows the results of the measurement. As seen in FIG. 10, the use of lithium oxide as a cathode active material allows for charging and discharging.

EXAMPLE 5 (CHARGE/DISCHARGE TEST)

Figure 11:
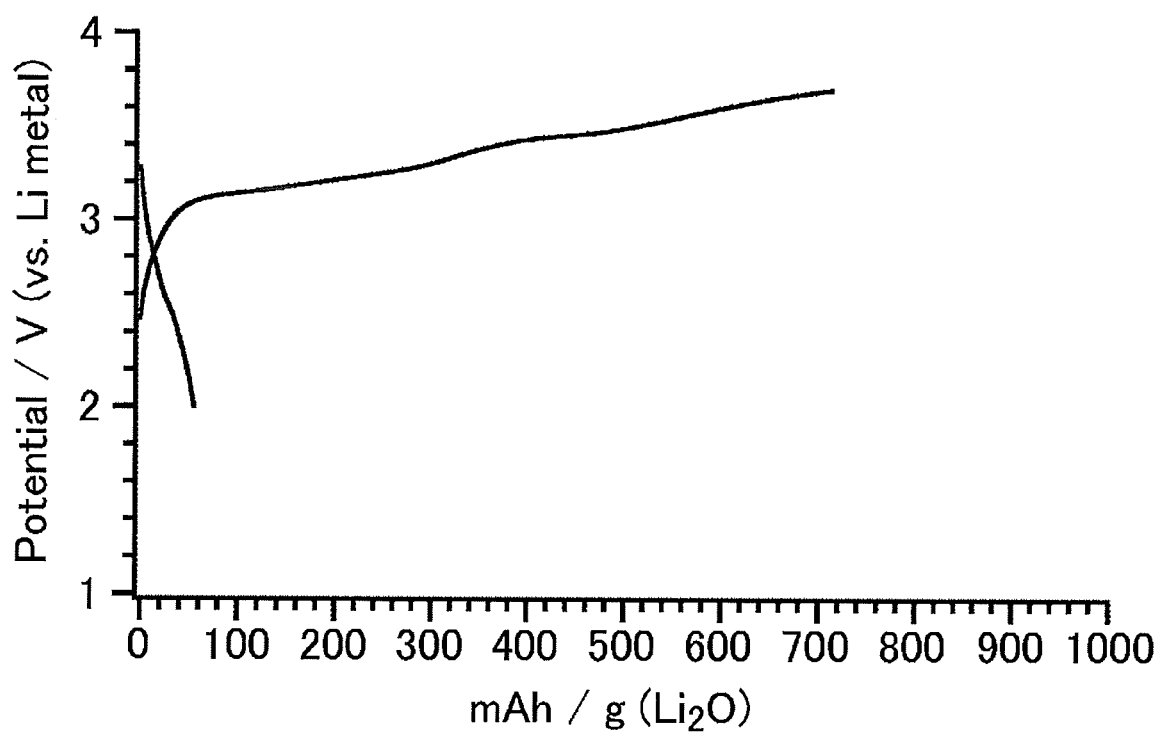
FIG. 11 is a graph showing the results of a charge/discharge test in Example 5.

The charge/discharge test was performed under the same conditions as in Example 3 using the $Li_2O/NiO$ cathode mix electrode prepared in Preparation 9 as a working electrode. FIG. 11 shows the results of the measurement. As seen in FIG. 11, the use of lithium oxide as a cathode active material allows for charging and discharging.

EXAMPLE 6 (CHARGE/DISCHARGE TEST)

Figure 12:
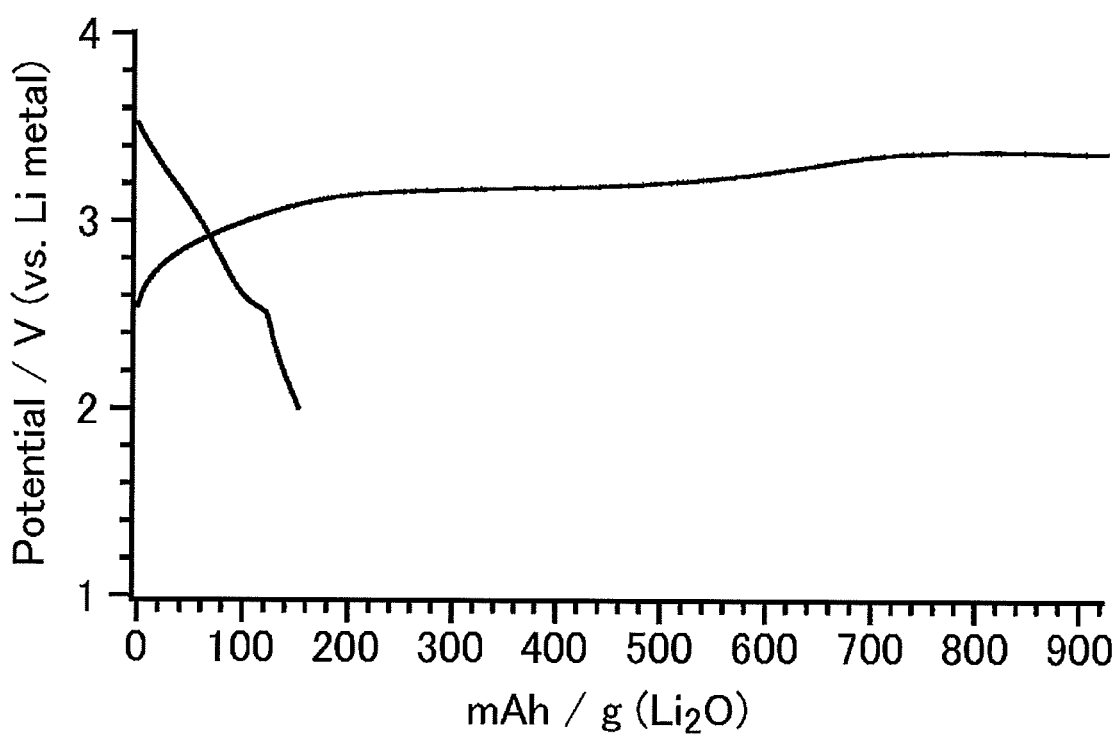
FIG. 12 is a graph showing the results of a charge/discharge test in Example 6.

The charge/discharge test was performed under the same conditions as in Example 3 using the $Li_2O/LiCoO_2$ cathode mix electrode prepared in Preparation 10 as a working electrode. FIG. 12 shows the results of the measurement. As seen in FIG. 12, the use of lithium oxide as a cathode active material allows for charging and discharging.

EXAMPLE 7 (CHARGE/DISCHARGE TEST)

Figure 13:
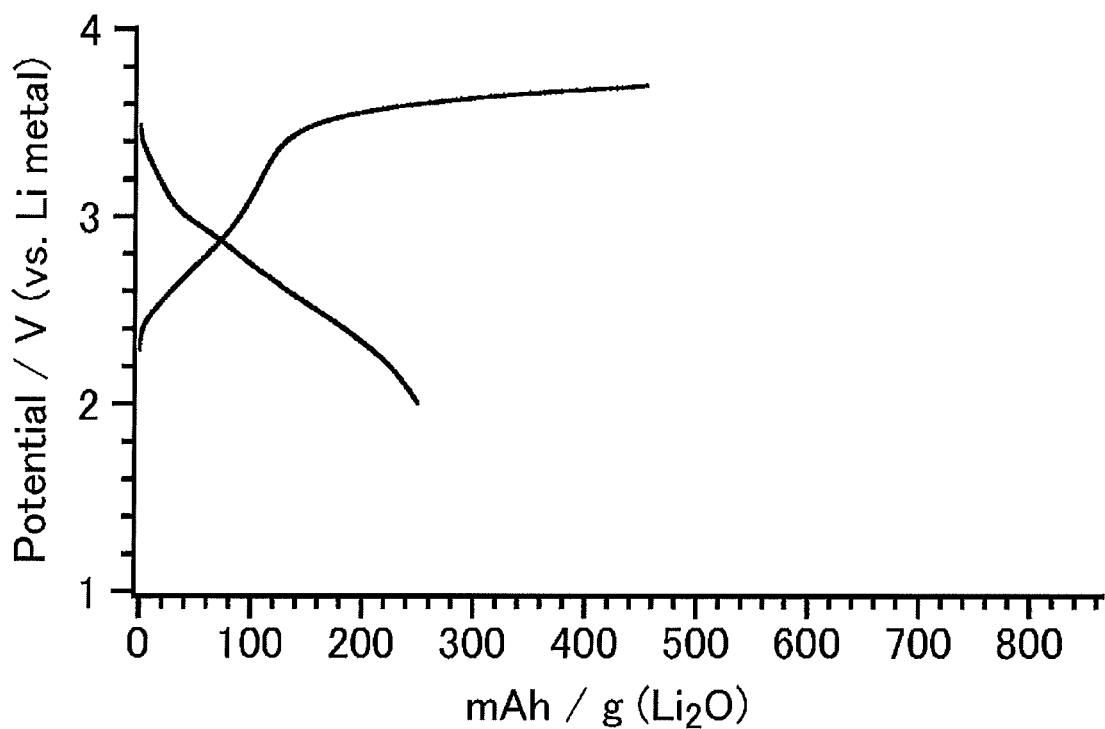
FIG. 13 is a graph showing the results of a charge/discharge test in Example 7.

The charge/discharge test was performed under the same conditions as in Example 3 using the $Li_2O/MnO_2$ cathode mix electrode prepared in Preparation 11 as a working electrode. FIG. 13 shows the results of the measurement. As seen in FIG. 13, the use of lithium oxide as a cathode active material allows for charging and discharging.

EXAMPLE 8 (CHARGE/DISCHARGE TEST)

Figure 14:
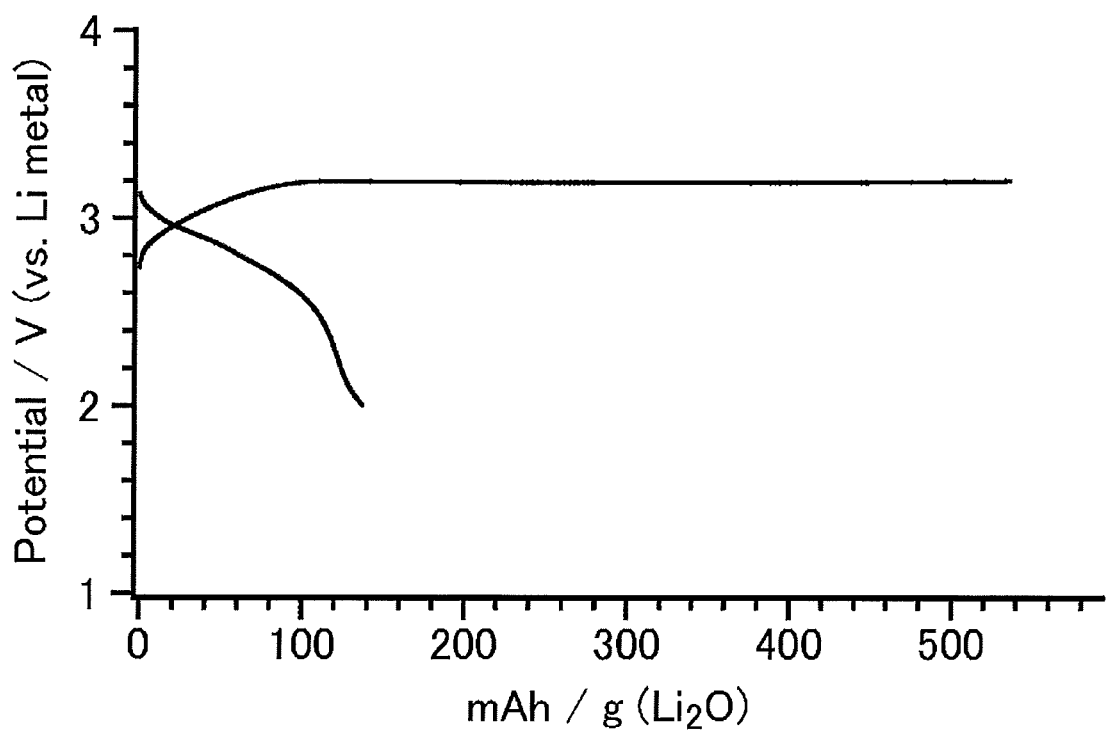
FIG. 14 is a graph showing the results of a charge/discharge test in Example 8.

The charge/discharge test was performed under the same conditions as in Example 3 using the $Li_2O/SrCoO_{2.5}$ cathode mix electrode prepared in Preparation 12 as a working electrode. FIG. 14 shows the results of the measurement. As seen in FIG. 14, the use of lithium oxide as a cathode active material allows for charging and discharging.

EXAMPLE 9 (ANALYSIS OF GAS GENERATED DURING CHARGE)

Figure 15:
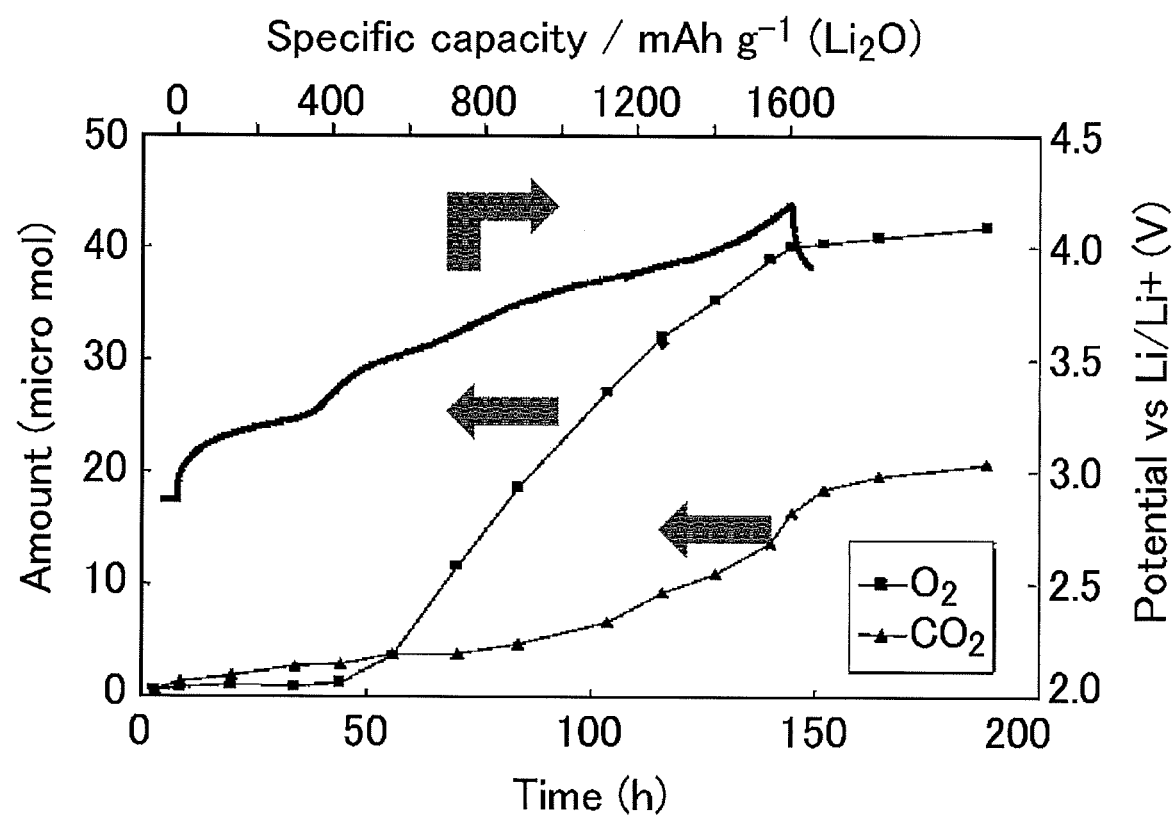
FIG. 15 is a graph showing the results of analysis of gas generated during charge in Example 9.

The charge test was performed under the same conditions as in Example 3, and components in the gas phase in the cell were identified and quantified using a quadrupole mass spectrometer. FIG. 15 shows the results of the measurement. As seen in FIG. 15, no noticeable gas generation was observed in the range of the capacity of oxidation up to 600 mAh/g. This demonstrates that $Li_2O$ was converted into $Li_2O_2$ without generating oxygen. The arrows in FIG. 15 indicate which scale of the right or left vertical axis to use for each line in the graph.

EXAMPLE 10 (XRD ANALYSIS OF CHARGED CATHODE)

Figure 16:
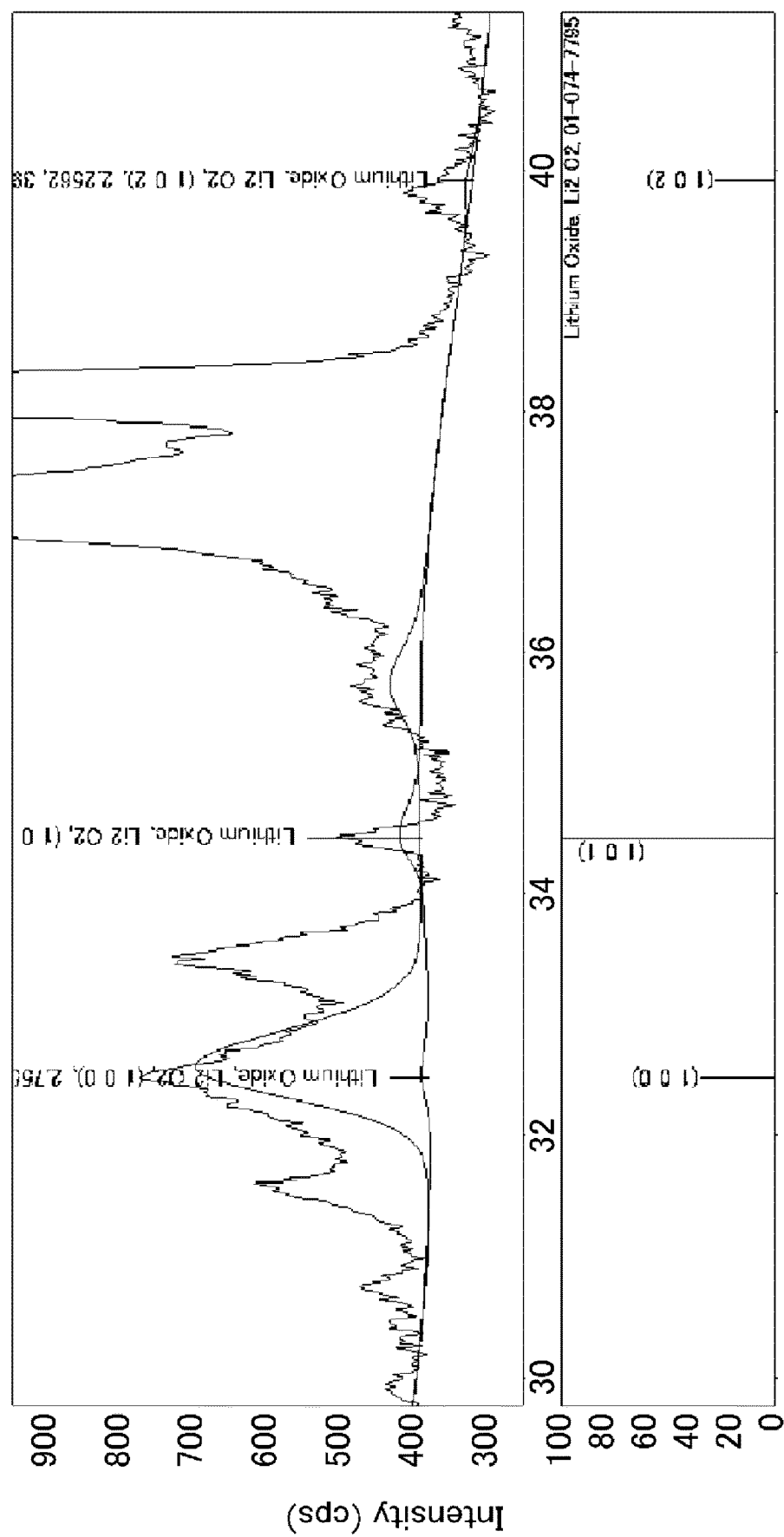
FIG. 16 is a graph showing the result of XRD measurement of a charged cathode in Example 10.

The charge test was performed under the same conditions as in Example 5. After charging to a cut-off voltage of 3.3 V, the cathode was washed with a DME (1,2-dimethoxyethane) solvent and then dried. The charged cathode was then placed on a hermetically sealed sample stage purged with argon, and subjected to XRD measurement. FIG. 16 shows the results. A $Li_2O$ signal diminishes around 33.5° with changing capacity of oxidation, and signals of $Li_2O_2$ were observed at 34.5° and 39.8°. This demonstrates that $Li_2O$ was converted into $Li_2O_2$ during charge.

EXAMPLE 11 (QUANTIFICATION OF $Li_2O_2$ IN CHARGED CATHODE)

The charge test was performed under the same conditions as in Example 4. A cathode was prepared by pressing 8.24 mg of the cathode mix onto 60 mg of an aluminum mesh. After charging to a cut-off voltage of 3.3 V, the cathode was washed with a DME (1,2-dimethoxyethane) solvent and then dried. The oxidized cathode prepared in a glove box under an argon atmosphere and 1 mg of manganese dioxide were dispersed in 1 ml of deoxidized water. $Li_2O_2$, which was converted from $Li_2O$ during charge, dissolved in water to form $H_2O_2$, and then the reaction ($H_2O_2 \rightarrow H_2O + 0.5O_2$) occurred in the presence of manganese dioxide as a catalyst, thereby to generate oxygen gas. The oxygen gas was identified and quantified using a quadrupole mass spectrometer. The results confirm generation of 2.3 μmol of oxygen. This demonstrates that $Li_2O_2$ was generated as a result of the charge reaction from $Li_2O$.

EXAMPLE 12 (CHARGE/DISCHARGE TEST USING TWO-ELECTRODE CELL)

Figure 17:
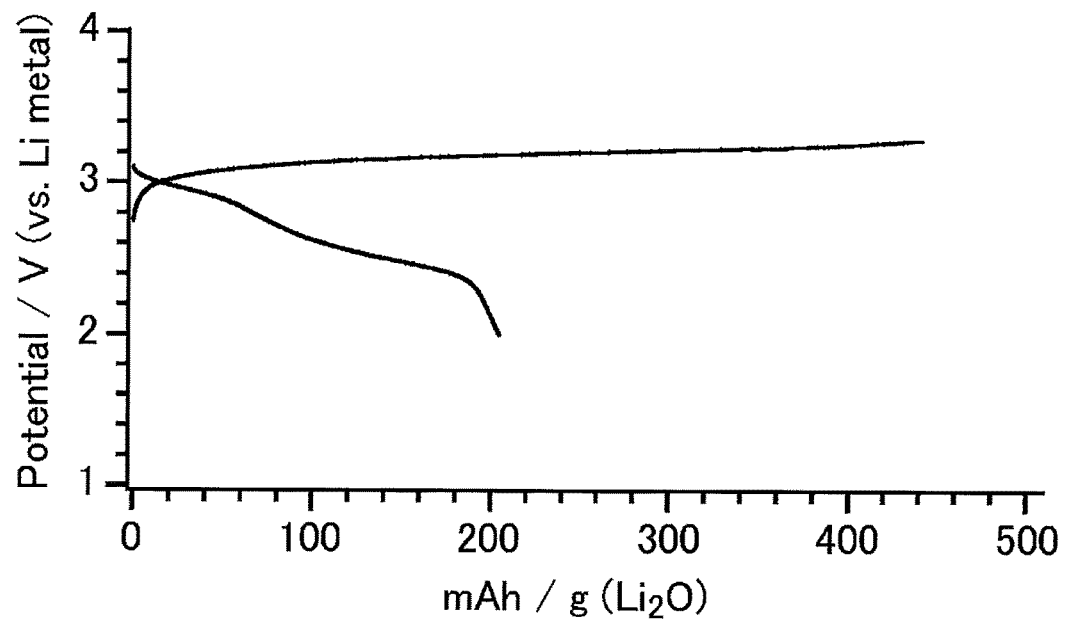
FIG. 17 is a graph showing the results of a charge/discharge test in Example 12.

The charge/discharge test was performed using a commercially available two-electrode cell (HS cell, produced by Hohsen Corp.). The working electrode was the $Li_2O/Fe_2O_3$ cathode mix electrode prepared in Preparation 7, the counter electrode was lithium metal, and the electrolyte solution was a 4.2 M LiTFSI acetonitrile electrolyte solution (LiTFSI: lithium bis(trifluoromethanesulfonyl) imide [$LiN(SO_2CF_3)_2$]). After charging at a current density of 4.5 mA/g of the cathode active material, discharging was performed at a similar current density. FIG. 17 shows the results of the charge/discharge test. As seen in FIG. 17, the use of lithium oxide as a cathode active material allows for charging and discharging.

$LiCoO_2$ used in Preparation 10 and Example 6 is a common compound widely known as a cathode active material. Although the charge/discharge potential of $LiCoO_2$ is 3.8 V (vs. Li metal) the charge potential in the charge/discharge experiment in Example 6 (shown in FIG. 12) was approximately 3.2 V (vs. Li metal). From this fact, it is unlikely that $LiCoO_2$ itself functioned as an active material in charging and discharging, and $LiCoO_2$ is presumed to have functioned as a catalyst for an electrode in Example 6. Likewise, $LiFeO_2$ used in Preparation 7 and Example 3 and $SrCoO_{2.5}$ used in Preparation 12 and Example 8 are presumed to have functioned as a catalyst for an electrode in Example 8. Additionally, each single oxide ($Co_3O_4$, NiO, $MnO_2$) is also presumed to have functioned as a catalyst for an electrode when used alone in the absence of $Li_2O$ because flat ranges indicating charging and discharging were not observed unlike the examples.

PREPARATION 13 (PROCESS FOR PREPARING $Li_2O/Fe_2O_3/Co_3O_4$ CATHODE)

Figure 18:
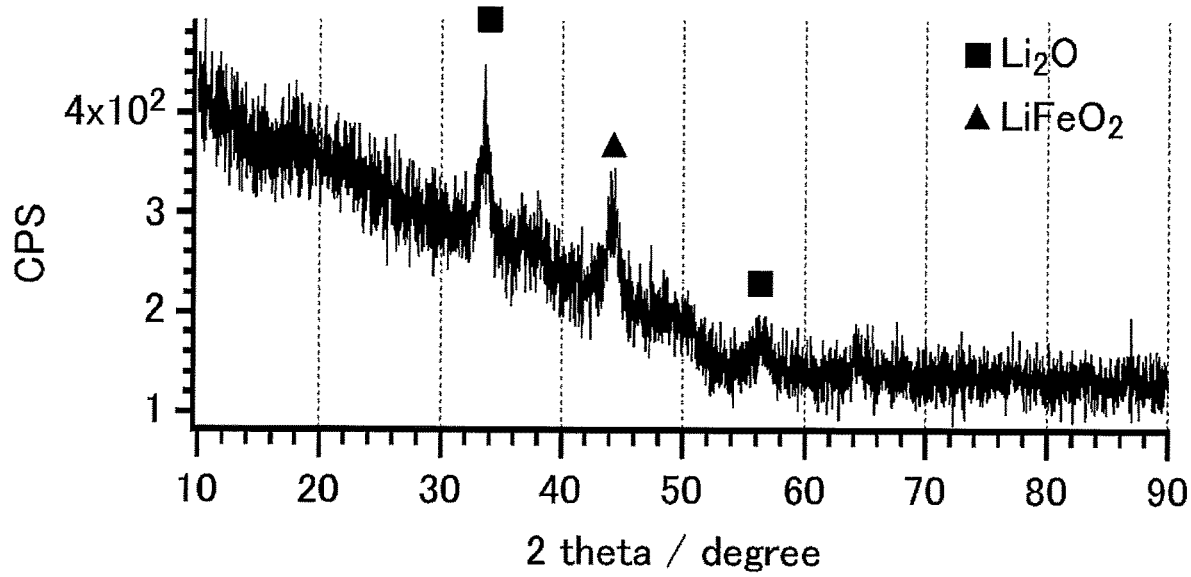
FIG. 18 is a graph showing the results of XRD measurement of solid powder prepared in Preparation 13.

An amount of 2.62 g of lithium oxide (produced by Kojundo Chemical Laboratory Co., Ltd.) as a cathode active material, 1.38 g of α-iron oxide (produced by Wako Pure Chemical Industries, Ltd.) as a catalyst for an electrode, and 1.36 g of cobalt oxide ($Co_3O_4$, produced by Wako Pure Chemical Industries, Ltd.) were combined in a planetary ball mill pot, and mixed using a planetary ball mill (under conditions in which 25 zirconia balls (10 mmφ) were operated at a rate of rotation of 600 rpm for 60 hours). The whole procedure was performed in an argon-substituted glove box with a moisture concentration of not higher than 1 ppm. FIG. 18 shows the results of XRD measurement of the resultant solid powder. The solid powder was found to contain $Li_2O$ and $LiFeO_2$. An 81 mg portion of the solid powder, 100 mg of acetylene black as a conductive auxiliary agent, and 15 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 13 (CHARGE/DISCHARGE TEST USING TWO-ELECTRODE CELL)

Figure 19:
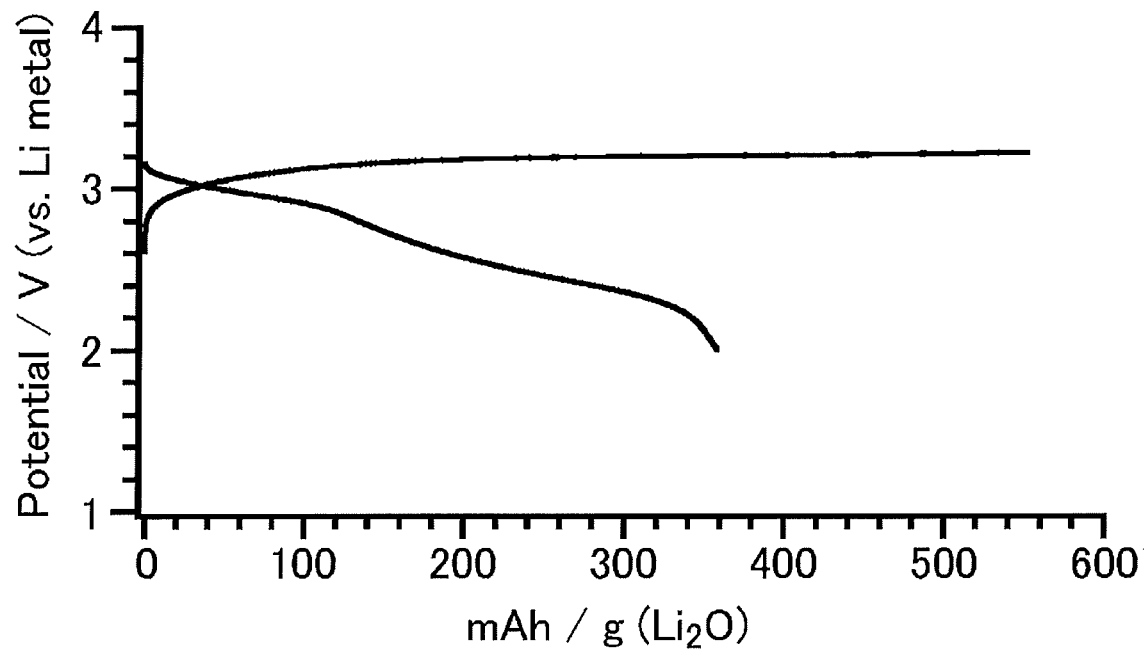
FIG. 19 is a graph showing the results of a charge/discharge test in Example 13.

The charge/discharge test was performed using a commercially available two-electrode cell (HS cell, produced by Hohsen Corp.). The working electrode was the $Li_2O/Fe_2O_3/Co_3O_4$ cathode mix electrode prepared in Preparation 13, the counter electrode was lithium metal, and the electrolyte solution was a 4.2 M LiTFSI acetonitrile electrolyte solution (LiTFSI: lithium bis(trifluoromethanesulfonyl)imide, [$LiN(SO_2CF_3)_2$]). After charging at a current density of 4.5 mA/g of the cathode active material, discharging was performed at a similar current density. FIG. 19 shows the results of the charge/discharge test. As seen in FIG. 19, the use of lithium oxide as a cathode active material allows for charging and discharging.

EXAMPLE 14 (XRD ANALYSIS OF CHARGED CATHODE)

Figure 20:
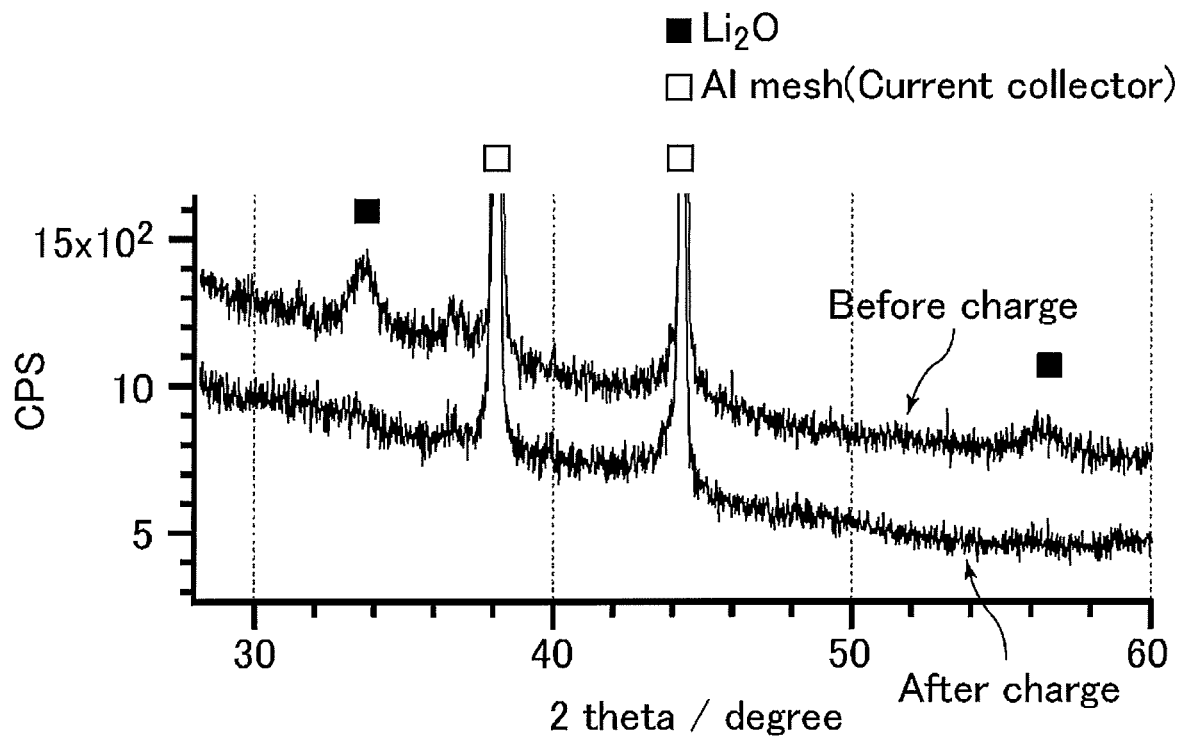
FIG. 20 is a graph showing the result of XRD measurement before and after charging in Example 14.

The charge test was performed under the same conditions as in Example 13. After charging to a cut-off voltage of 3.3V, the cathode was washed with an acetonitrile solvent and then dried. The charged cathode was then placed on a hermetically sealed sample stage purged with argon, and subjected to XRD measurement. FIG. 20 shows the results. A $Li_2O$ signal diminishes around 33.5° with changing capacity of oxidation. This indicates that $Li_2O$ was converted into $Li_2O_2$ during charge.

EXAMPLE 15 (QUANTIFICATION OF $Li_2O_2$ IN CATHODE AFTER CHARGING AND DISCHARGING)

Figure 21:
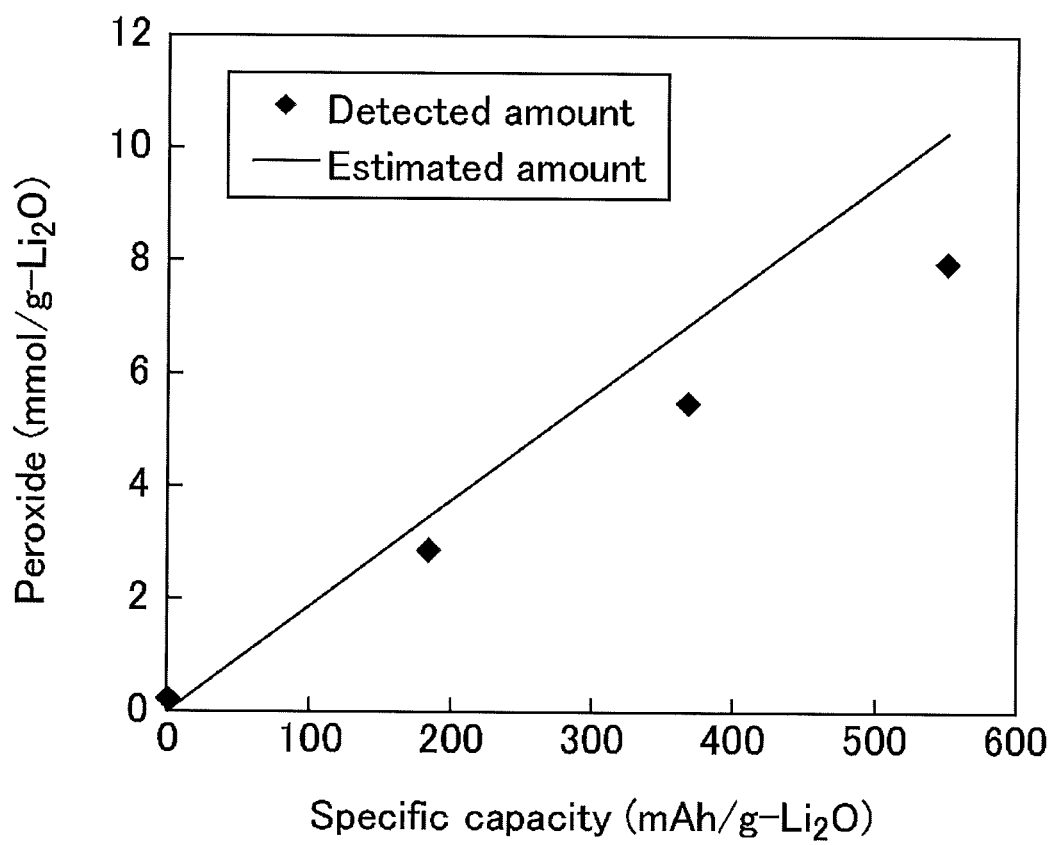
FIG. 21 is a graph showing the results of quantification of a peroxide in Example 15.
Figure 22:
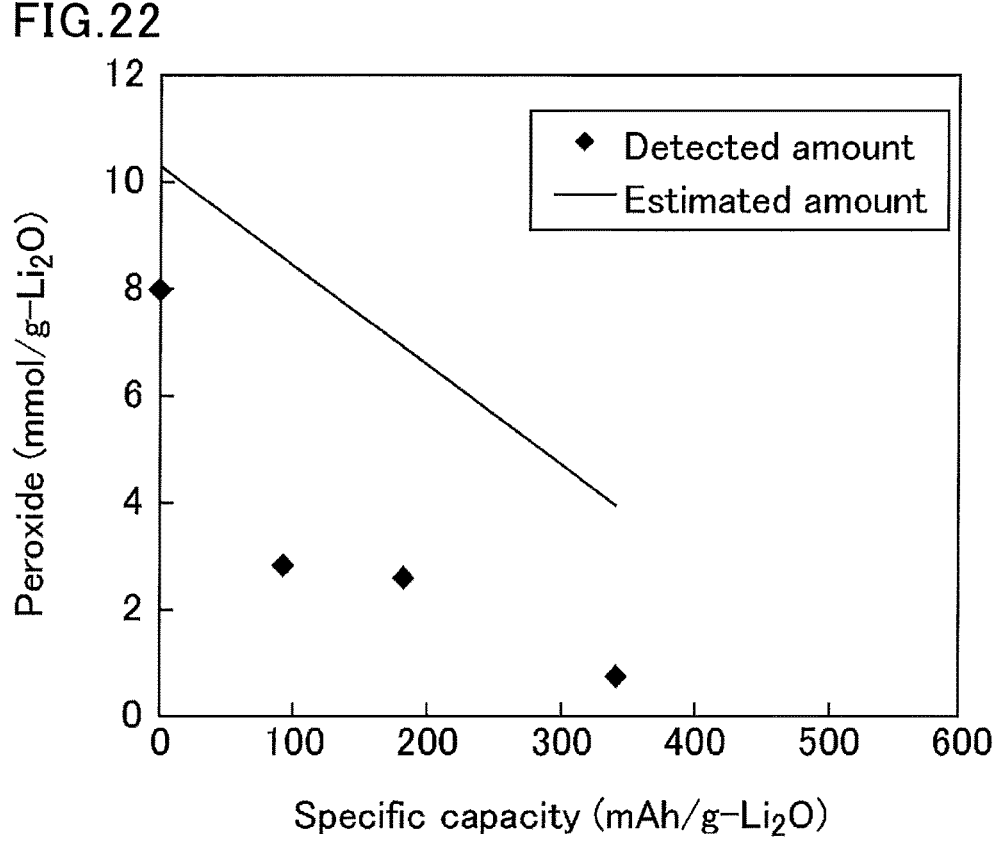
FIG. 22 is a graph showing the results of quantification of a peroxide in Example 15.

The charge/discharge test was performed under the same conditions as in Example 13. Quantification of lithium peroxide in the cathode was performed in the same manner as in Example 11 at different depths of charge/discharge. FIG. 21 shows the results of the detected amount of $Li_2O_2$ plotted against the charge capacity in the first charge phase. The figure also includes a solid line representing the theoretical amount of $Li_2O_2$ estimated against the charge capacity based on the reaction formula (II). As seen in FIG. 21, it was confirmed that, the charge reaction generated $Li_2O_2$ as shown in the reaction formula (II) at a theoretical efficiency based on the charge capacity of approximately 80%. FIG. 22 shows detected amounts of $Li_2O_2$ plotted against the discharge capacity in the first discharge phase after the first charge phase. The figure also includes a solid line representing the theoretical amount of $Li_2O_2$ estimated against the discharge capacity based on the reaction formula (II). As seen in FIG. 22, it was confirmed that $Li_2O_2$ was consumed as shown in the reaction formula (II) at a theoretical efficiency based on the discharge capacity of almost 100%.

PREPARATION 14 (PROCESS FOR PREPARING $Li_2O/Fe_2O_3/Co_3O_4$ CATHODE)

Figure 23:
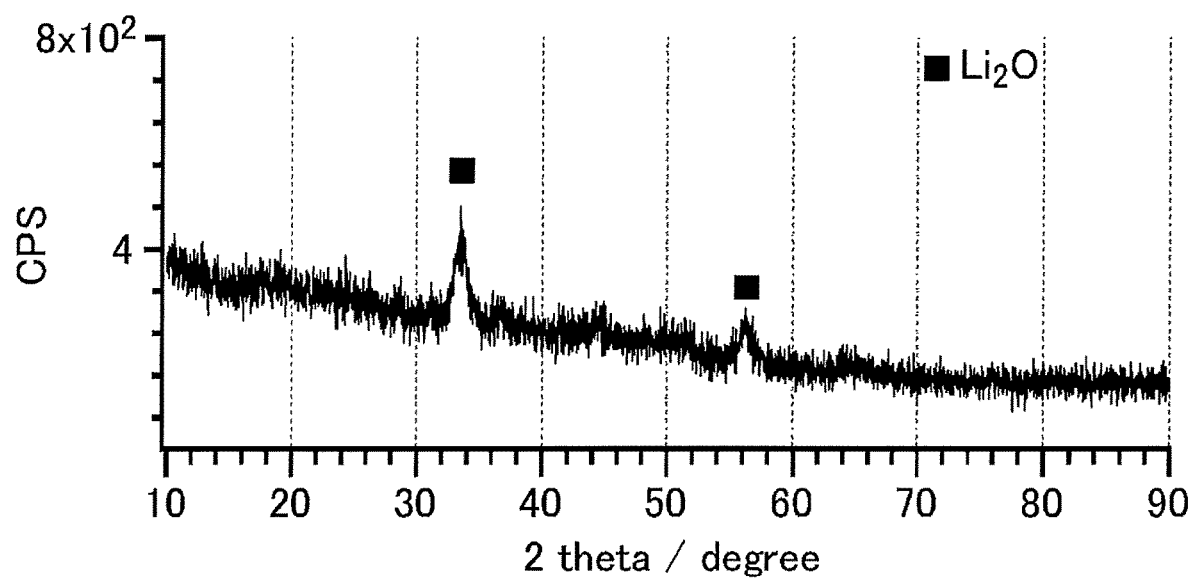
FIG. 23 is a graph showing the results of XRD measurement of solid powder prepared in Preparation 14.

An amount of 2.46 g of lithium oxide (produced by Kojundo Chemical Laboratory Co., Ltd) as a cathode active material, 0.65 g of α-iron oxide (produced by Wako Pure Chemical Industries, Ltd.) as a catalyst for an electrode, and 0.67 g of cobalt oxide ($Co_3O_4$, produced by Wako Pure Chemical Industries, Ltd.) were combined in a planetary ball mill pot, and mixed using a planetary ball mill (under conditions in which 25 zirconia balls (10 mmφ) were operated at a rate of rotation of 600 rpm for 120 hours). The whole procedure was performed in an argon-substituted glove box with a moisture concentration of not higher than 1 ppm. FIG. 23 shows the results of XRD measurement of the resultant solid powder. The solid powder was found to contain $Li_2O$. A 79 mg portion of the solid powder, 83 mg of acetylene black as a conductive auxiliary agent, and 12 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 15 (PROCESS FOR PREPARING $Li_2O/Fe_2O_3/Co_3O_4$ CATHODE)

Figure 24:
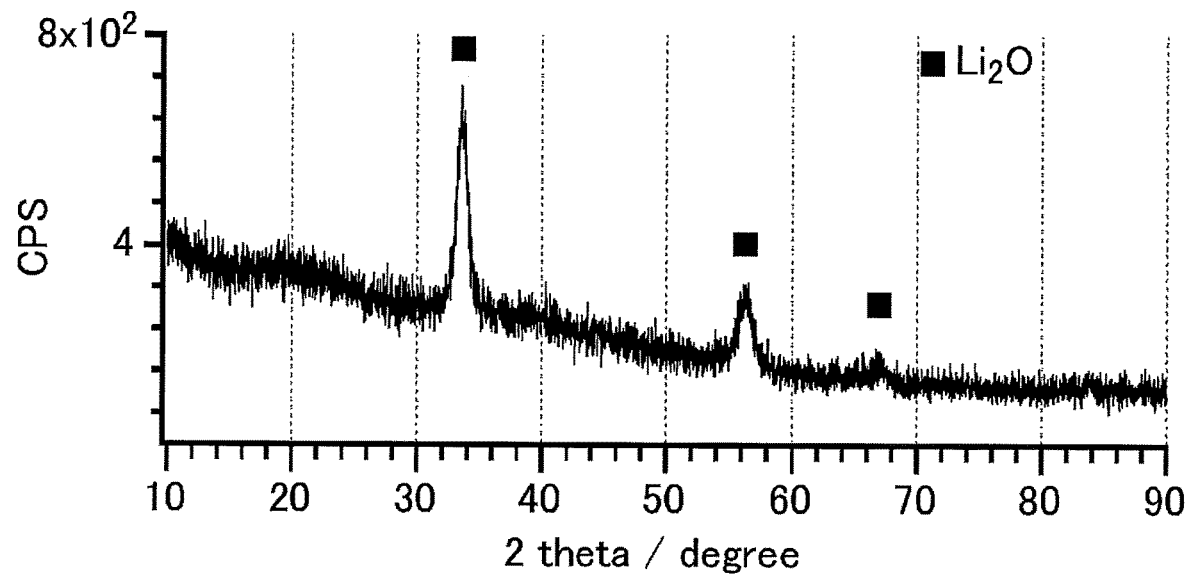
FIG. 24 is a graph showing the results of XRD measurement of solid powder prepared in Preparation 15.

An amount of 2.47 g of lithium oxide (produced by Kojundo Chemical Laboratory Co., Ltd.) as a cathode active material, 0.33 g of α-iron oxide (produced by Wako Pure Chemical Industries, Ltd.) as a catalyst for an electrode, and 0.33 g of cobalt oxide ($Co_3O_4$, produced by Wako Pure Chemical Industries, Ltd.) were combined in a planetary ball mill pot, and mixed using a planetary ball mill (under conditions in which 25 zirconia balls (10 mmφ) were operated at a rate of rotation of 600 rpm for 120 hours). The whole procedure was performed in an argon-substituted glove box with a moisture concentration of not higher than 1 ppm. FIG. 24 shows the results of XRD measurement of the resultant solid powder. The solid powder was found to contain $Li_2O$. A 66 mg portion of the solid powder, 70 mg of acetylene black as a conductive auxiliary agent, and 6 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 16 (CHARGE/DISCHARGE TEST USING TWO-ELECTRODE CELL)

Figure 25:
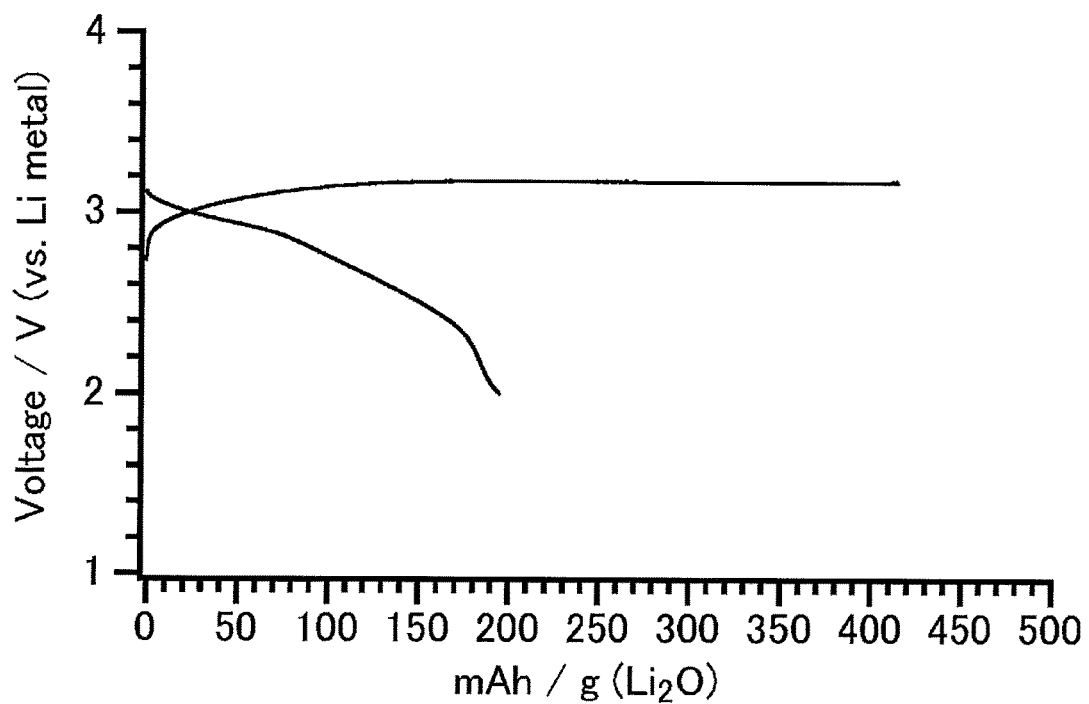
FIG. 25 is a graph showing the results of a charge/discharge test in Example 16.

The charge/discharge test was performed under the same conditions as in Example 13 using the $Li_2O/Fe_2O_3/Co_3O_4$ cathode mix electrode prepared in Preparation 14 as a working electrode. FIG. 25 shows the results of the charge/discharge test. As seen in FIG. 25, the use of lithium oxide as a cathode active material allows for charging and discharging.

EXAMPLE 17 (CHARGE/DISCHARGE TEST USING TWO-ELECTRODE CELL)

Figure 26:
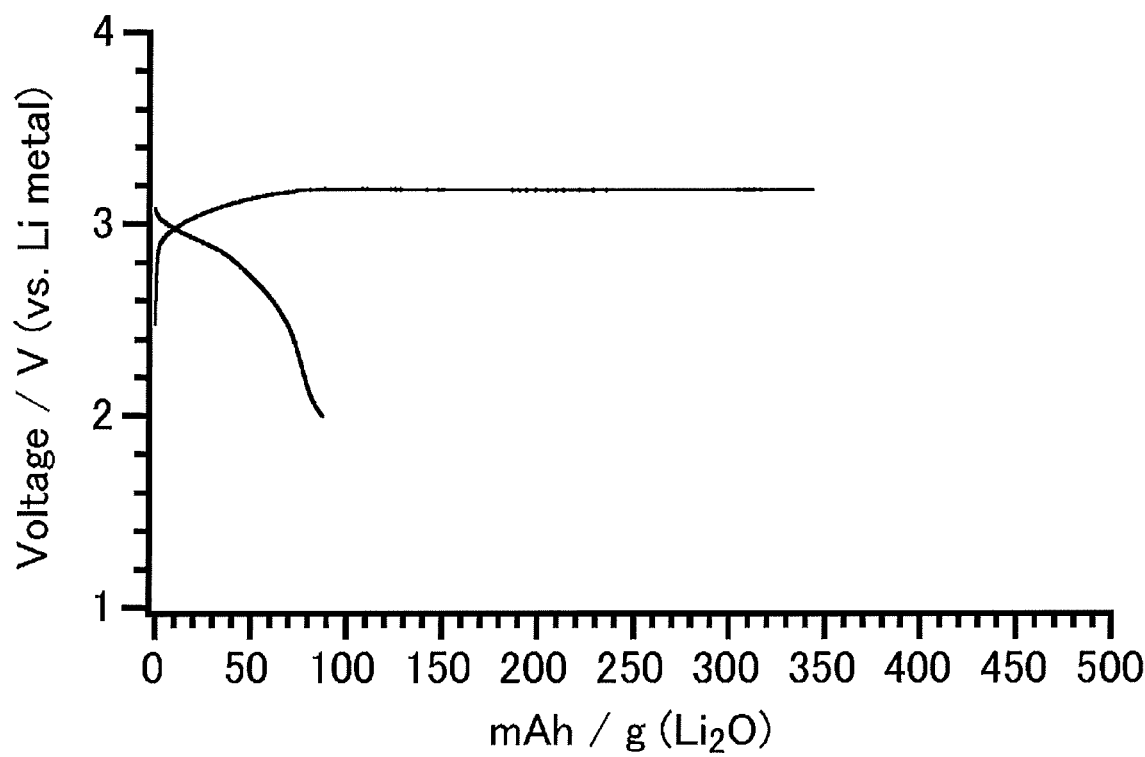
FIG. 26 is a graph showing the results of a charge/discharge test in Example 17.

The charge/discharge test was performed under the same conditions as in Example 13 using the $Li_2O/Fe_2O_3/Co_3O_4$ cathode mix electrode prepared in Preparation 15 as a working electrode. FIG. 26 shows the results of the charge/discharge test. As seen in FIG. 26, the use of lithium oxide as a cathode active material allows for charging and discharging.

EXAMPLE 18 (CHARGE/DISCHARGE TEST USING TWO-ELECTRODE CELL)

Figure 27:
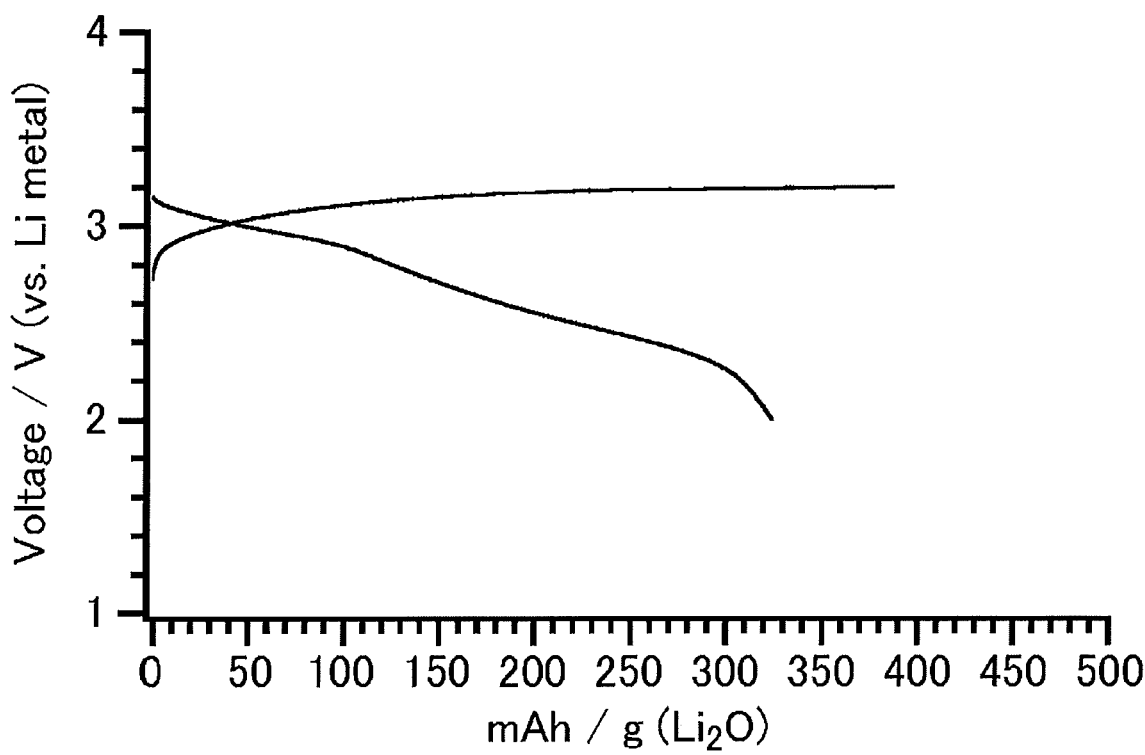
FIG. 27 is a graph showing the results of a charge/discharge test in Example 18.

The charge/discharge test was performed under the same conditions as in Example 13, except that a 4.2 M LiFSI acetonitrile electrolyte solution (LiFSI: lithium bis(fluorosulfonyl)imide [$LiN(SO_2F)_2$]) was used as an electrolyte solution instead of the 4.2 M LiTFSI acetonitrile electrolyte solution (LiTFSI: lithium bis(trifluoromethanesulfonyl)imide, [$LiN(SO_2CF_3)_2$]). FIG. 27 shows the results of the charge/discharge test. As seen in FIG. 27, the use of lithium oxide as a cathode active material under the above conditions also allows for charging and discharging.

EXAMPLE 19 (CHARGE/DISCHARGE TEST USING TWO-ELECTRODE CELL)

Figure 28:
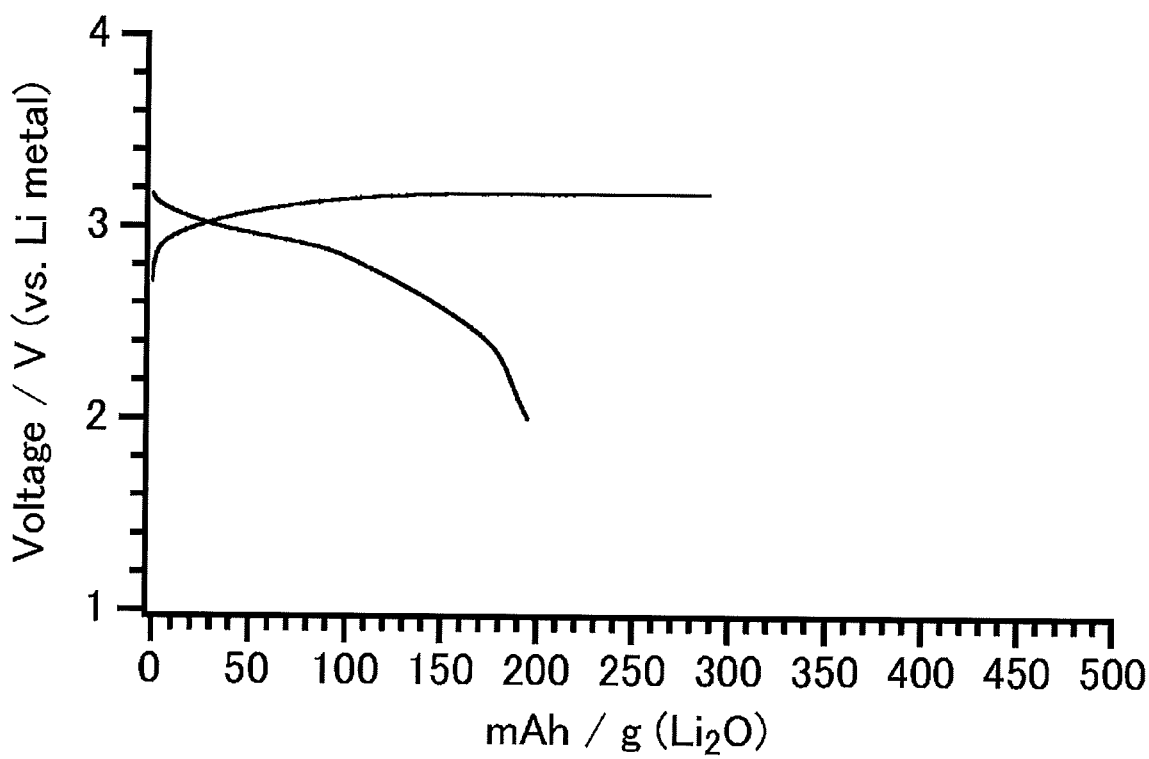
FIG. 28 is a graph showing the results of a charge/discharge test in Example 19.

The charge/discharge test was performed under the same conditions as in Example 16, except that a 4.2 M LiFSI acetonitrile electrolyte solution (LiFSI: lithium bis(fluorosulfonyl)imide [$LiN(SO_2F)_2$]) was used as an electrolyte solution instead of the 4.2 M LiTFSI acetonitrile electrolyte solution (LiTFSI: lithium bis(trifluoromethanesulfonyl)imide, [$LiN(SO_2CF_3)_2$]). FIG. 28 shows the results of the charge/discharge test. As seen in FIG. 28, the use of lithium oxide as a cathode active material under the above conditions also allows for charging and discharging.

EXAMPLE 20 (CHARGE/DISCHARGE TEST USING TWO-ELECTRODE CELL)

Figure 29:
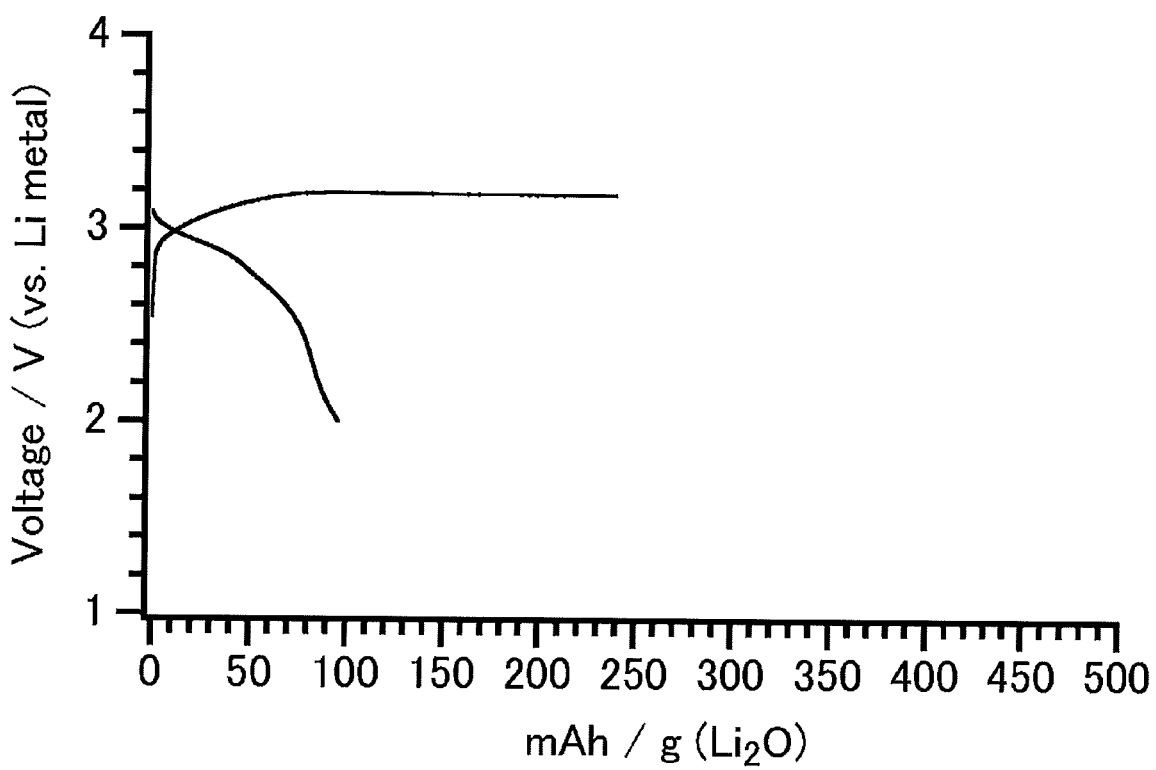
FIG. 29 is a graph showing the results of a charge/discharge test in Example 20.

The charge/discharge test was performed under the same conditions as in Example 17, except that a 4.2 M LiFSI acetonitrile electrolyte solution (LiFSI: lithium bis(fluorosulfonyl)imide [$LiN(SO_2F)_2$]) was used as an electrolyte solution instead of the 4.2 M LiTFSI acetonitrile electrolyte solution (LiTFSI: lithium bis(trifluoromethanesulfonyl)imide, [$LiN(SO_2CF_3)_2$]). FIG. 29 shows the results of the charge/discharge test. As seen in FIG. 29, the use of lithium oxide as a cathode active material under the above conditions also allows for charging and discharging.

EXAMPLE 21 (CHARGE TEST USING TWO-ELECTRODE CELL)

Figure 30:
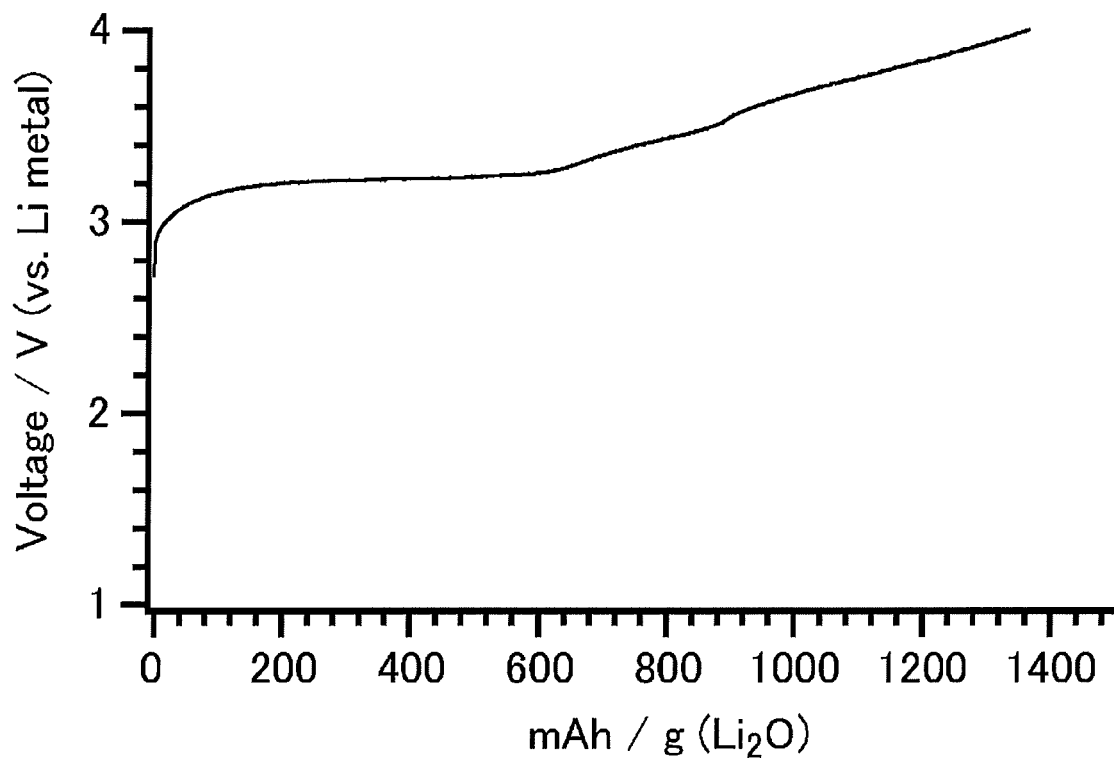
FIG. 30 is a graph showing the results of a charge test in Example 21.

The charge test was performed using a commercially available two-electrode cell (HS cell, produced by Hohsen Corp.). The working electrode was the $Li_2O/Fe_2O_3/Co_3O_4$ cathode mix electrode prepared in Preparation 13, the counter electrode was lithium metal, and the electrolyte solution was a 4.2 M LiTFSI acetonitrile electrolyte solution (LiTFSI: lithium bis(trifluoromethanesulfonyl)imide, [$LiN(SO_2CF_3)_2$]). Charging was performed at a current density of 4.5 mA/g of the cathode active material. FIG. 30 shows the results of the charge test. In FIG. 30, a fast increase of the potential is observed around the theoretical charge capacity (894 mAh/g) of the charge reaction at the cathode ($2Li_2O \rightarrow Li_2O_2 + 2Li^+ + 2e^-$). This demonstrates that the charge reaction at the cathode proceeded at remarkably high efficiency.

EXAMPLE 22 (CHARGE TEST USING TWO-ELECTRODE CELL)

Figure 31:
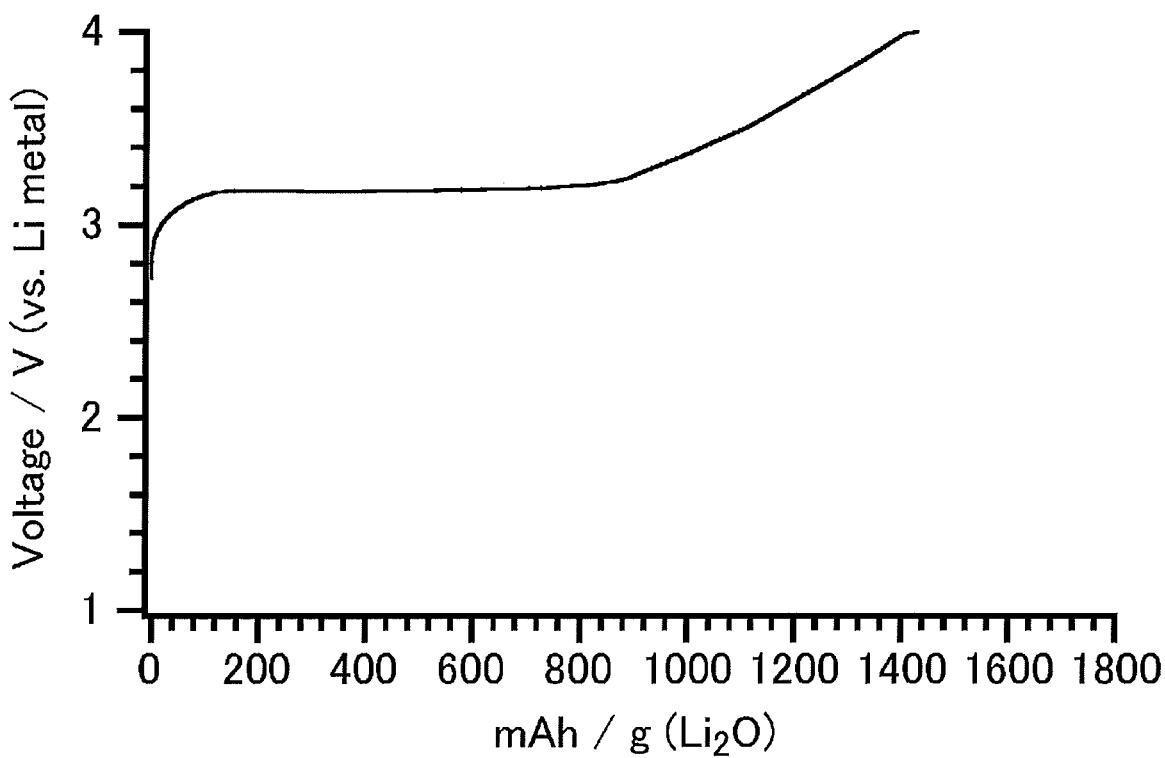
FIG. 31 is a graph showing the results of a charge test in Example 22.

The charge test was performed using a commercially available two-electrode cell (HS cell, produced by Hohsen Corp.). The working electrode was the $Li_2O/Fe_2O_3/Co_3O_4$ cathode mix electrode prepared in Preparation 14, the counter electrode was lithium metal, and the electrolyte solution was a 4.2 M LiTFSI acetonitrile electrolyte solution (LiTFSI: lithium bis(trifluoromethanesulfonyl)imide, [LiN$(SO_2CF_3)_2$]). Charging was performed at a current density of 4.5 mA/g of the cathode active material. FIG. 31 shows the results of the charge test. In FIG. 31, a fast increase of the potential is observed around the theoretical charge capacity (894 mAh/g) of the charge reaction at the cathode ($2Li_2O \rightarrow Li_2O_2 + 2Li^+ + 2e^-$). This demonstrates that the charge reaction at the cathode proceeded at remarkably high efficiency.

EXAMPLE 23 (CHARGE TEST USING TWO-ELECTRODE CELL)

Figure 32:
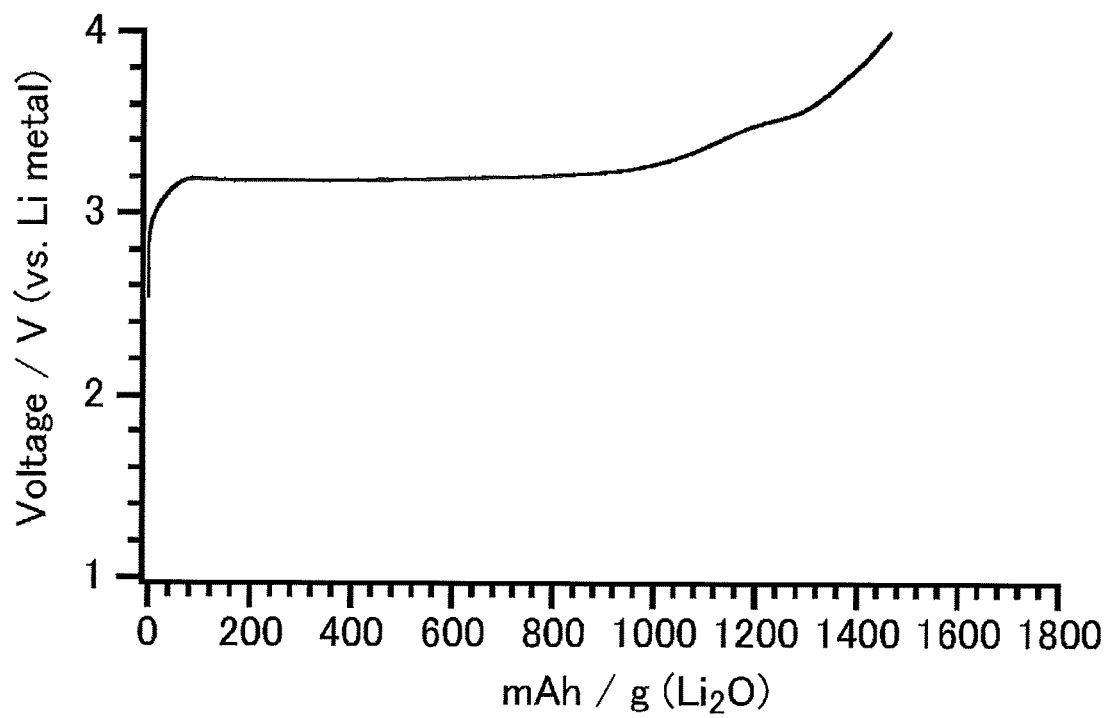
FIG. 32 is a graph showing the results of a charge test in Example 23.

The charge test was performed using a commercially available two-electrode cell (HS cell, produced by Hohsen Corp.). The working electrode was the $Li_2O/Fe_2O_3/Co_3O_4$ cathode mix electrode prepared in Preparation 15, the counter electrode was lithium metal, and the electrolyte solution was a 4.2 M LiTFSI acetonitrile electrolyte solution (LiTFSI: lithium bis(trifluoromethanesulfonyl)imide, [LiN$(SO_2CF_3)_2$]). Charging was performed at a current density of 4.5 mA/g of the cathode active material. FIG. 32 shows the results of the charge test. In FIG. 32, a fast increase of the potential is observed around the theoretical charge capacity (894 mAh/g) of the charge reaction at the cathode ($2Li_2O \rightarrow Li_2O_2 + 2Li^+ + 2e^-$). This demonstrates that the charge reaction at the cathode proceeded at remarkably high efficiency.

PREPARATION 16 (PROCESS FOR PREPARING $Li_2O/Co_3O_4$ CATHODE)

Figure 33:
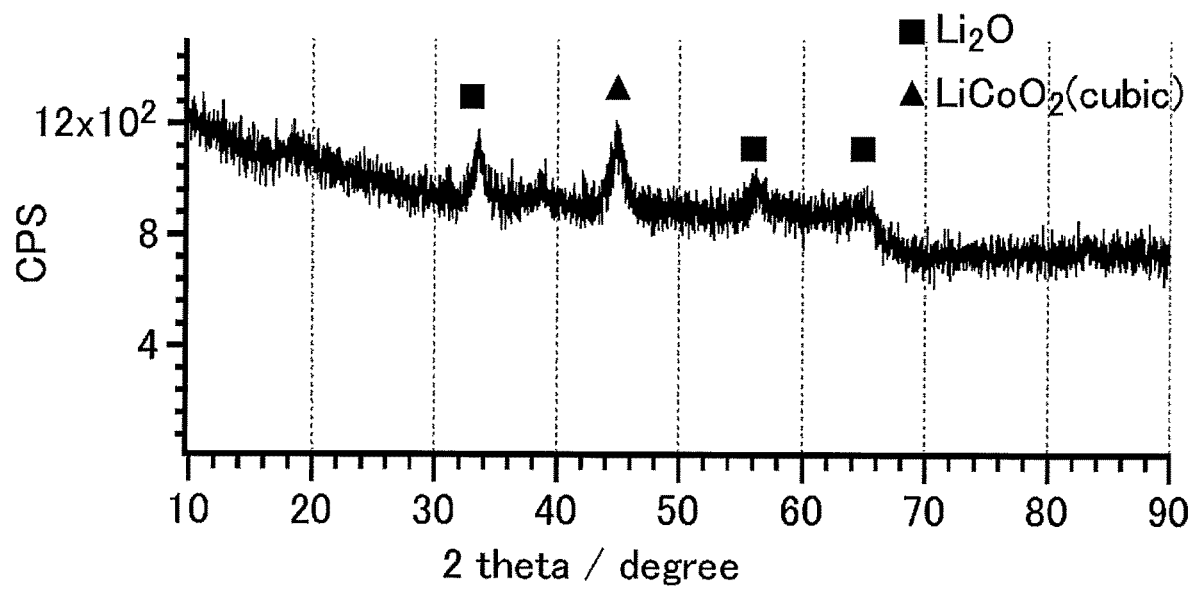
FIG. 33 is a graph showing the results of XRD measurement of solid powder prepared in Preparation 16.

An amount of 2.09 g of lithium oxide (produced by Kojundo Chemical Laboratory Co., Ltd.) as a cathode active material and 2.23 g of cobalt oxide ($Co_3O_4$, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 33 shows the results of XRD measurement of the resultant solid powder. The solid powder was found to contain $Li_2O$ and $LiCoO_2$. A 57 mg portion of the solid powder, 69 mg of acetylene black as a conductive auxiliary agent, and 6 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 17 (PROCESS FOR PREPARING $Li_2O/Co_3O_4$ CATHODE)

Figure 34:
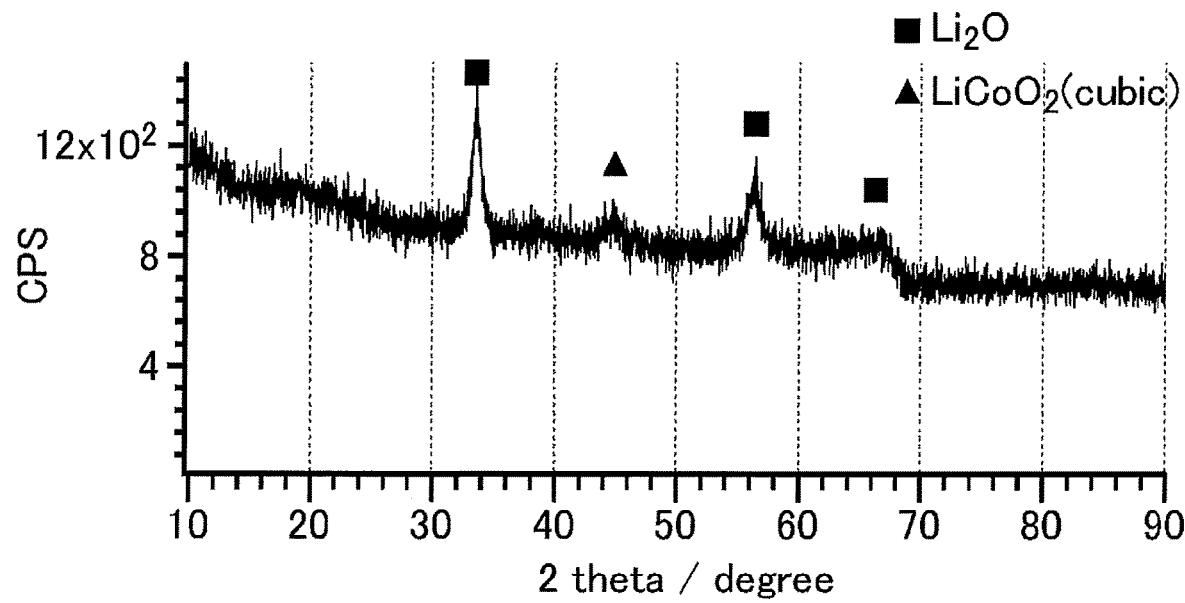
FIG. 34 is a graph showing the results of XRD measurement of solid powder prepared in Preparation 17.

An amount of 2.19 g of lithium oxide (produced by Kojundo Chemical Laboratory Co., Ltd.) as a cathode active material and 1.16 g of cobalt oxide ($CO_3O_4$, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 34 shows the results of XRD measurement of the resultant solid powder. The solid powder was found to contain $Li_2O$ and $LiCoO_2$. A 67 mg portion of the solid powder, 70 mg of acetylene black as a conductive auxiliary agent, and 6 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 24 (CHARGE/DISCHARGE TEST USING TWO-ELECTRODE CELL)

Figure 35:
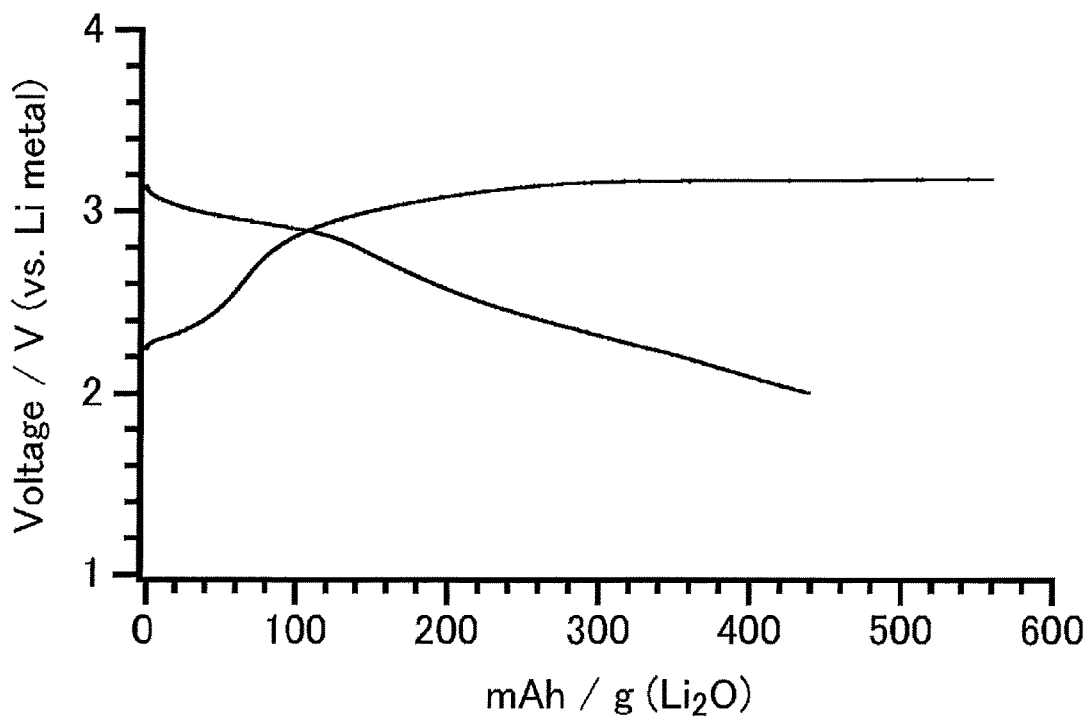
FIG. 35 is a graph showing the results of a charge/discharge test in Example 24.

The charge/discharge test was performed under the same conditions as in Example 13 using the $Li_2O/Co_3O_4$ cathode mix electrode prepared in Preparation 16 as a working electrode. FIG. 35 shows the results of the charge/discharge test. As seen in FIG. 35, the use of lithium oxide as a cathode active material allows for charging and discharging.

EXAMPLE 25 (CHARGE/DISCHARGE TEST USING TWO-ELECTRODE CELL)

Figure 36:
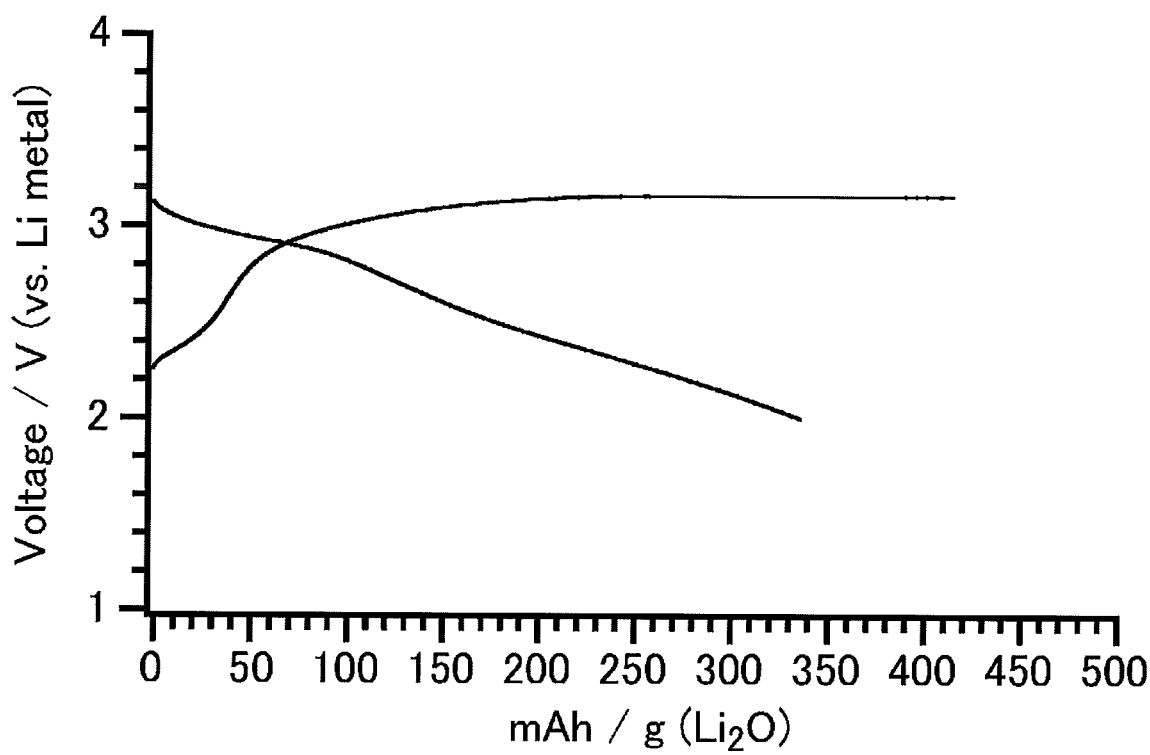
FIG. 36 is a graph showing the results of a charge/discharge test in Example 25.

The charge/discharge test was performed under the same conditions as in Example 13 using the $Li_2O/Co_3O_4$ cathode mix electrode prepared in Preparation 17 as a working electrode. FIG. 36 shows the results of the charge/discharge test. As seen in FIG. 36, the use of lithium oxide as a cathode active material allows for charging and discharging.

EXAMPLE 26 (CHARGE/DISCHARGE TEST USING TWO-ELECTRODE CELL)

Figure 37:
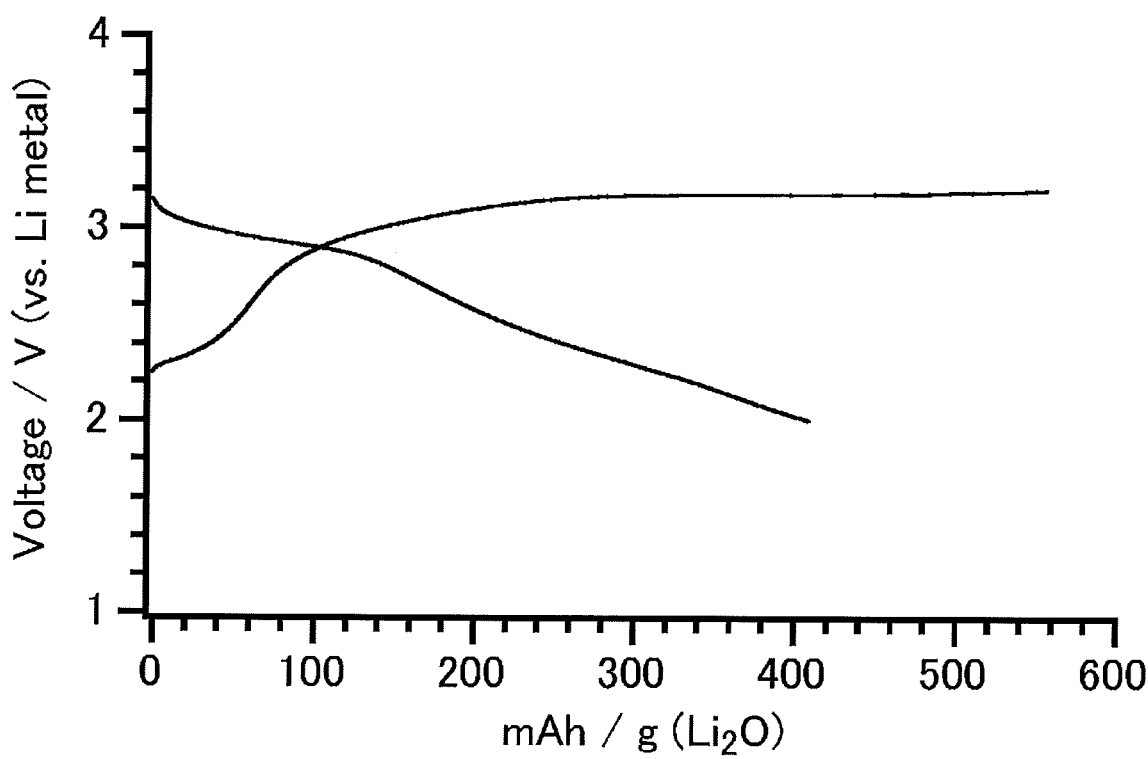
FIG. 37 is a graph showing the results of a charge/discharge test in Example 26.

The charge/discharge test was performed under the same conditions as in Example 24, except that a 4.2 M LiFSI acetonitrile electrolyte solution (LiFSI: lithium bis(fluorosulfonyl)imide [LiN$(SO_2F)_2$]) was used as an electrolyte solution instead of the 4.2 M LiTFSI acetonitrile electrolyte solution (LiTFSI: lithium bis(trifluoromethanesulfonyl)imide, [LiN$(SO_2CF_3)_2$]). FIG. 37 shows the results of the charge/discharge test. As seen in FIG. 37, the use of lithium oxide as a cathode active material under the above conditions also allows for charging and discharging.

EXAMPLE 27 (CHARGE/DISCHARGE TEST USING TWO-ELECTRODE CELL)

Figure 38:
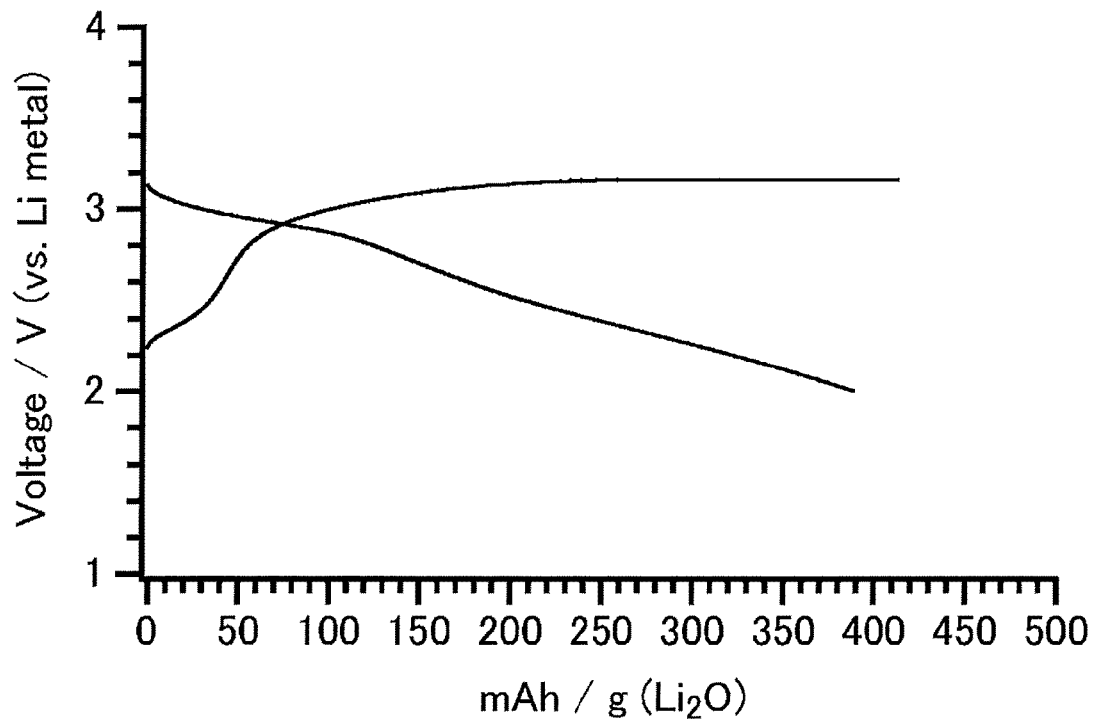
FIG. 38 is a graph showing the results of a charge/discharge test in Example 27.

The charge/discharge test was performed under the same conditions as in Example 25, except that a 4.2 M LiFSI acetonitrile electrolyte solution (LiFSI: lithium bis(fluorosulfonyl)imide [LiN$(SO_2F)_2$]) was used as an electrolyte solution instead of the 4.2 M LiTFSI acetonitrile electrolyte solution (LiTFSI: lithium bis(trifluoromethanesulfonyl)imide, [LiN$(SO_2CF_3)_2$]). FIG. 38 shows the results of the charge/discharge test. As seen in FIG. 38, the use of lithium oxide as a cathode active material under the above conditions also allows for charging and discharging.

PREPARATION 18 (PROCESS FOR PREPARING $Li_2O/Co_3O_4$ CATHODE)

Figure 39:
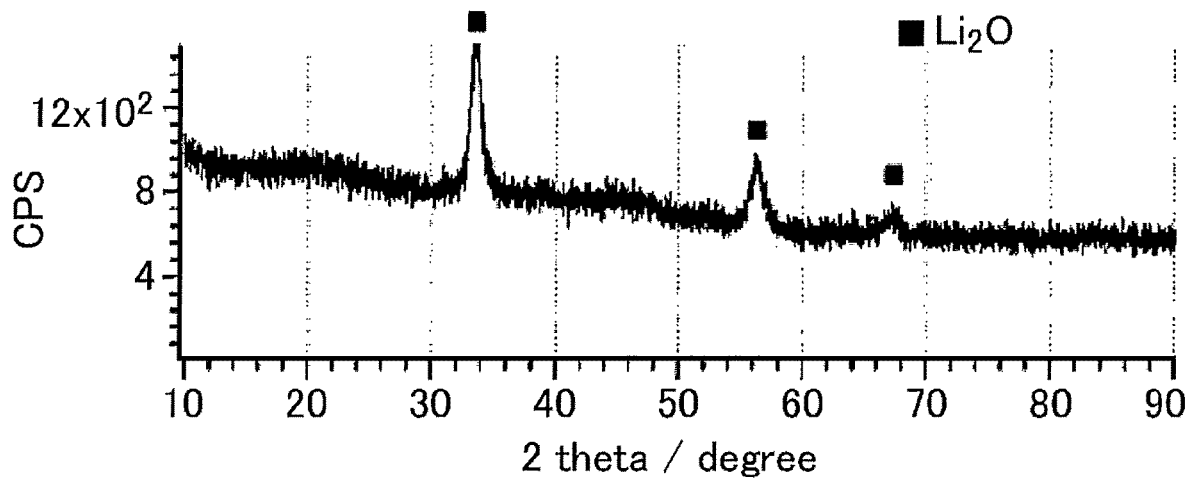
FIG. 39 is a graph showing the results of XRD measurement of solid powder prepared in Preparation 18.

An amount of 2.43 g of lithium oxide (produced by Kojundo Chemical Laboratory Co., Ltd.) as a cathode active material and 0.66 g of cobalt oxide ($Co_3O_4$, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 39 shows the results of XRD measurement of the resultant solid powder. The solid powder was found to contain $Li_2O$. A 51 mg portion of the solid powder, 63 mg of acetylene black as a conductive auxiliary agent, and 4 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 19 (PROCESS FOR PREPARING $Li_2O/Co_3O_4$ CATHODE)

Figure 40:
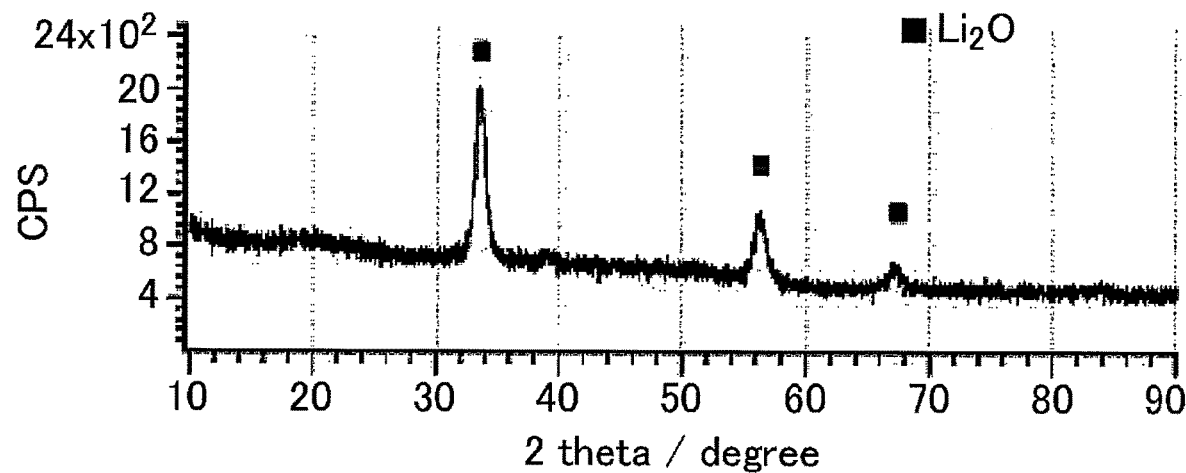
FIG. 40 is a graph showing the results of XRD measurement of solid powder prepared in Preparation 19.

An amount of 2.63 g of lithium oxide (produced by Kojundo Chemical Laboratory Co., Ltd.) as a cathode active material and 0.36 g of cobalt oxide ($CO_3O_4$, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 40 shows the results of XRD measurement of the resultant solid powder. The solid powder was found to contain $Li_2O$. A 57 mg portion of the solid powder, 61 mg of acetylene black as a conductive auxiliary agent, and 5 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 28 (CHARGE/DISCHARGE TEST USING TWO-ELECTRODE CELL)

Figure 41:
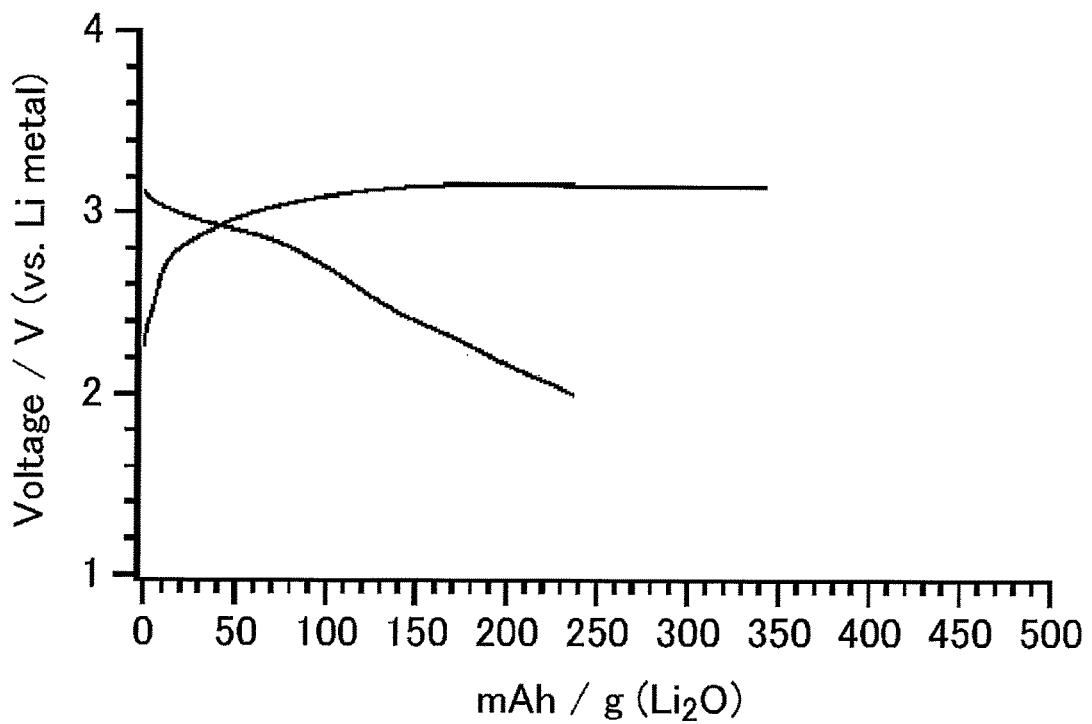
FIG. 41 is a graph showing the results of a charge/discharge test in Example 28.

The charge/discharge test was performed under the same conditions as in Example 13 using the $Li_2O/Co_3O_4$ cathode mix electrode prepared in Preparation 18 as a working electrode. FIG. 41 shows the results of the charge/discharge test. As seen in FIG. 41, the use of lithium oxide as a cathode active material allows for charging and discharging.

EXAMPLE 29 (CHARGE/DISCHARGE TEST USING TWO-ELECTRODE CELL)

Figure 42:
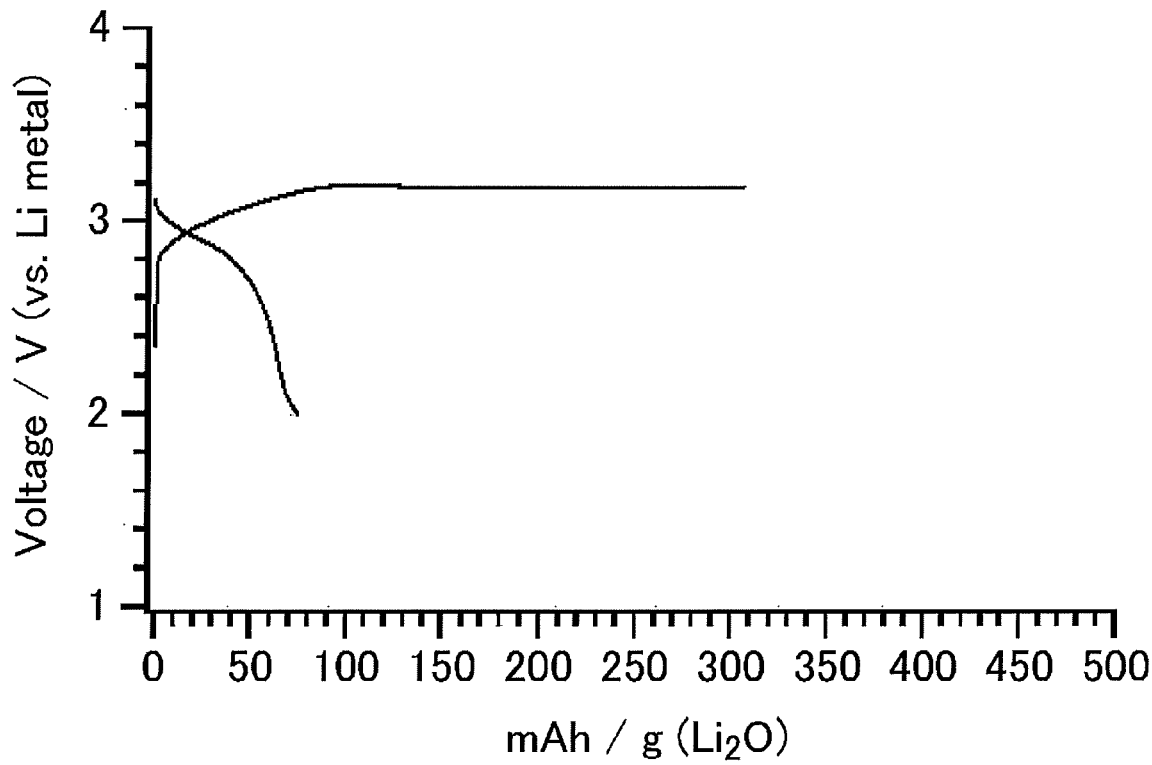
FIG. 42 is a graph showing the results of a charge/discharge test in Example 29.

The charge/discharge test was performed under the same conditions as in Example 13 using the $Li_2O/Co_3O_4$ cathode mix electrode prepared in Preparation 19 as a working electrode. FIG. 42 shows the results of the charge/discharge test. As seen in FIG. 42, the use of lithium oxide as a cathode active material allows for charging and discharging.

EXAMPLE 30 (CHARGE/DISCHARGE TEST USING TWO-ELECTRODE CELL)

Figure 43:
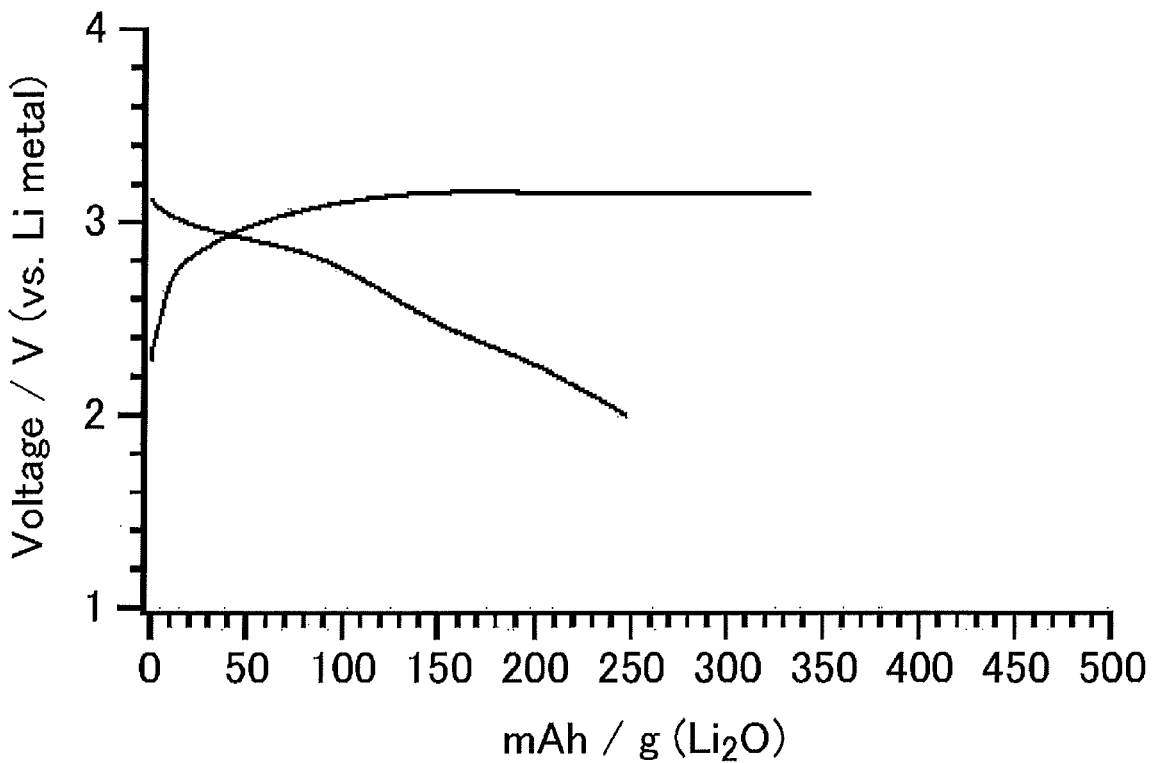
FIG. 43 is a graph showing the results of a charge/discharge test in Example 30.

The charge/discharge test was performed under the same conditions as in Example 28, except that a 4.2 M LiFSI acetonitrile electrolyte solution (LiFSI: lithium bis(fluorosulfonyl)imide [$LiN(SO_2F)_2$]) was used as an electrolyte solution instead of the 4.2 M LiTFSI acetonitrile electrolyte solution (LiTFSI: lithium bis(trifluoromethanesulfonyl)imide, [$LiN(SO_2CF_3)_2$]). FIG. 43 shows the results of the charge/discharge test. As seen in FIG. 43, the use of lithium oxide as a cathode active material under the above conditions also allows for charging and discharging.

EXAMPLE 31 (CHARGE/DISCHARGE TEST USING TWO-ELECTRODE CELL)

Figure 44:
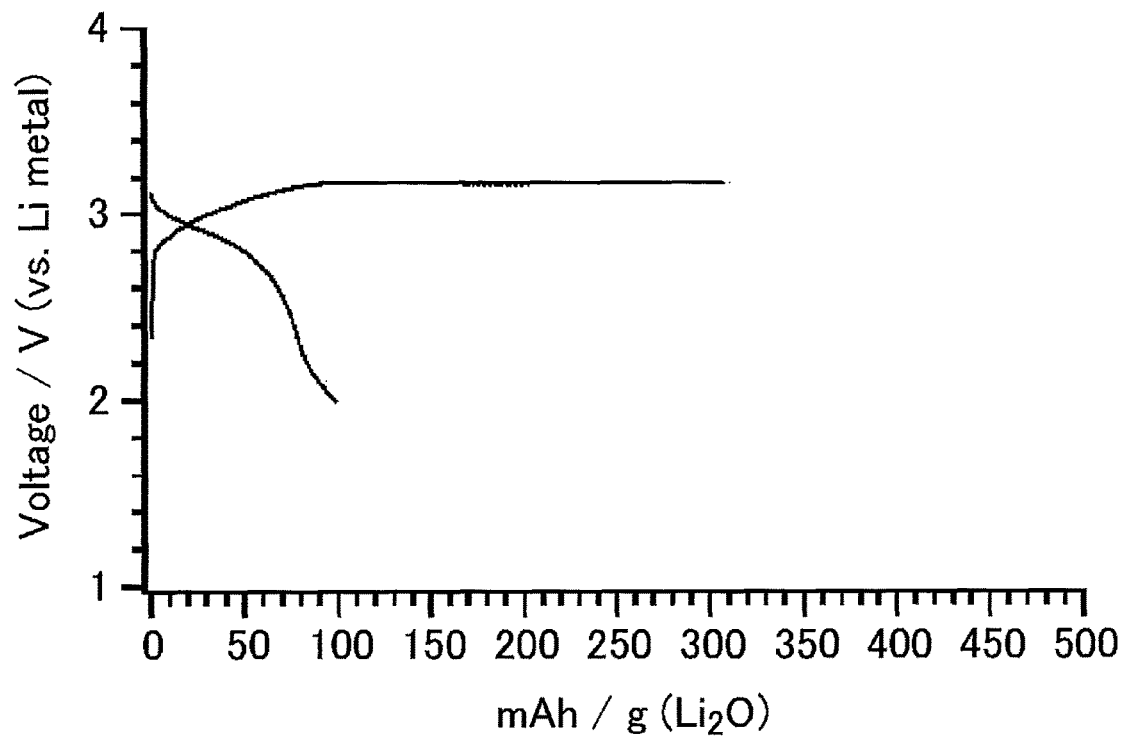
FIG. 44 is a graph showing the results of a charge/discharge test in Example 31.

The charge/discharge test was performed under the same conditions as in Example 29, except that a 4.2 M LiFSI acetonitrile electrolyte solution (LiFSI: lithium bis(fluorosulfonyl)imide [$LiN(SO_2F)_2$]) was used as an electrolyte solution instead of the 4.2 M LiTFSI acetonitrile electrolyte solution (LiTFSI: lithium bis(trifluoromethanesulfonyl)imide, [$LiN(SO_2CF_3)_2$]). FIG. 44 shows the results of the charge/discharge test. As seen in FIG. 44, the use of lithium oxide as a cathode active material under the above conditions also allows for charging and discharging.

EXAMPLE 32 (XRD ANALYSIS OF CHARGED CATHODE)

Figure 45:
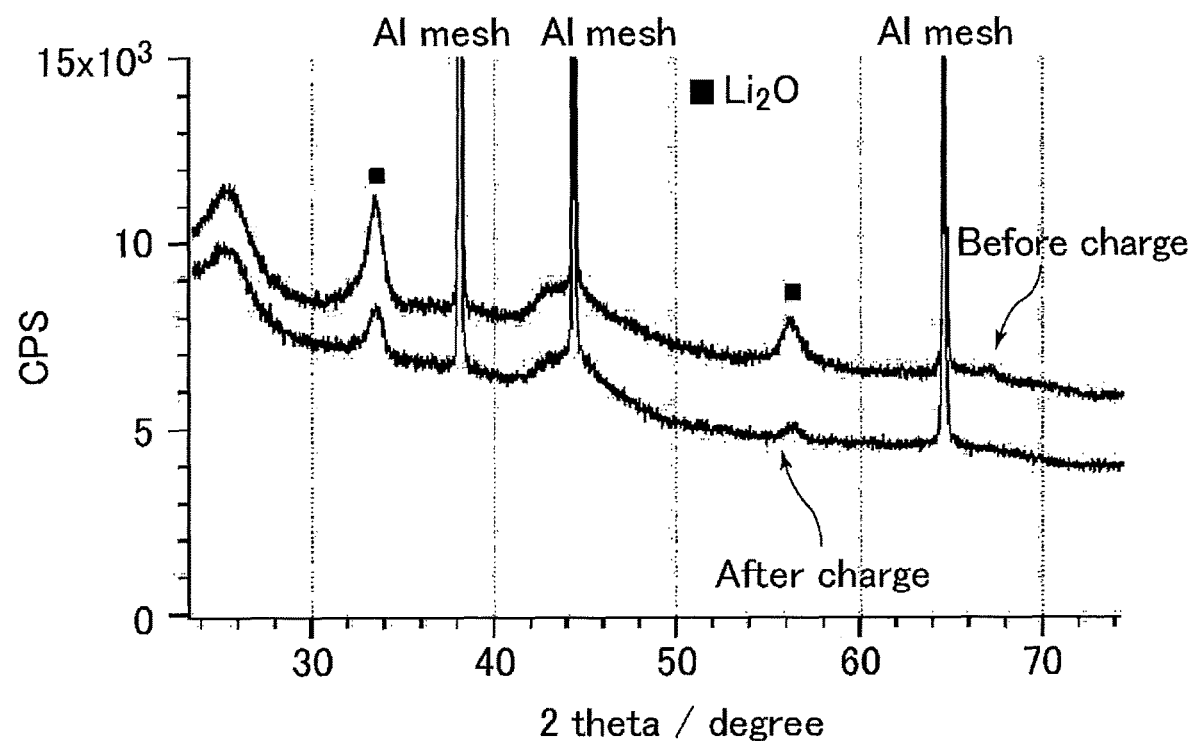
FIG. 45 is a graph showing the results of XRD measurement before and after charging and discharging in Example 32.

The charge test was performed under the same conditions as in Example 27. After charging at 400 mAh/g, the cathode was washed with an acetonitrile solvent and then dried. The charged cathode was placed on a hermetically sealed sample stage purged with argon, and subjected to XRD measurement. FIG. 45 shows the results. A $Li_2O$ signal diminishes around 33.5° with changing capacity of oxidation. This indicates that $Li_2O$ was converted into $Li_2O_2$ during charge.

EXAMPLE 33 (QUANTIFICATION OF $Li_2O_2$ IN CATHODE AFTER CHARGING AND DISCHARGING)

The charge/discharge test was performed under the same conditions as in Example 27. Quantification of lithium peroxide in the cathode was performed in the same manner as in Example 11 after each charge or discharge phase. The amount of lithium peroxide in the mix after the first charge phase was 4.17 mmol/g of lithium oxide in the mix at the beginning. The amount of lithium peroxide in the mix after the first discharge phase following the first charge phase was 0.17 mmol/g of lithium oxide in the mix at the beginning. Thus, it was confirmed that lithium peroxide was almost completely consumed through discharge. The amount of lithium peroxide after the second charge phase was 3.89 mmol/g. This demonstrates that reversible oxidation into lithium peroxide occurred again during recharge.

PREPARATION 20 (PROCESS FOR PREPARING $Li_2O/CoO$ CATHODE)

Figure 46:
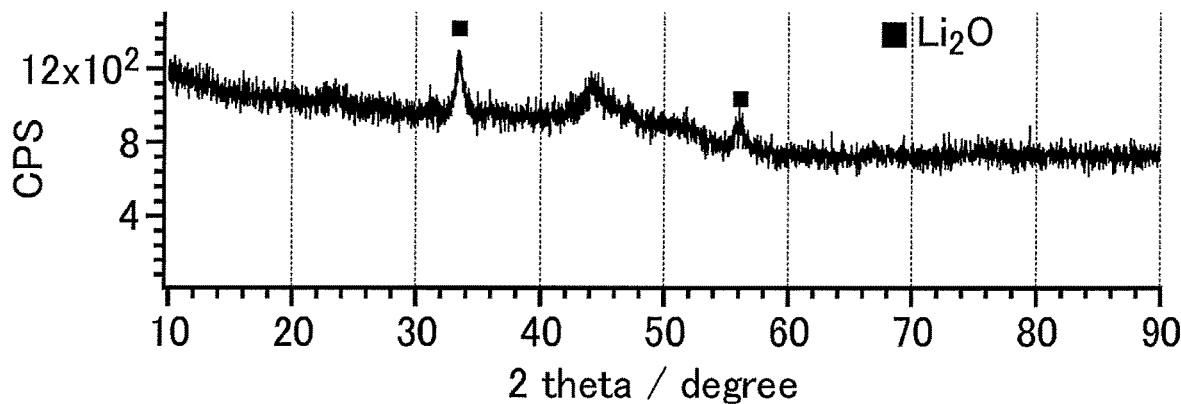
FIG. 46 is a graph showing the results of XRD measurement of solid powder prepared in Preparation 20.

An amount of 2.30 g of lithium oxide (produced by Kojundo Chemical Laboratory Co., Ltd.) as a cathode active material and 2.31 g of cobalt oxide (CoO, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 46 shows the results of XRD measurement of the resultant solid powder. The solid powder was found to contain $Li_2O$. A 75 mg portion of the solid powder, 85 mg of acetylene black as a conductive auxiliary agent, and 6 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 21 (PROCESS FOR PREPARING Li$_2$O/CoO CATHODE)

Figure 47:
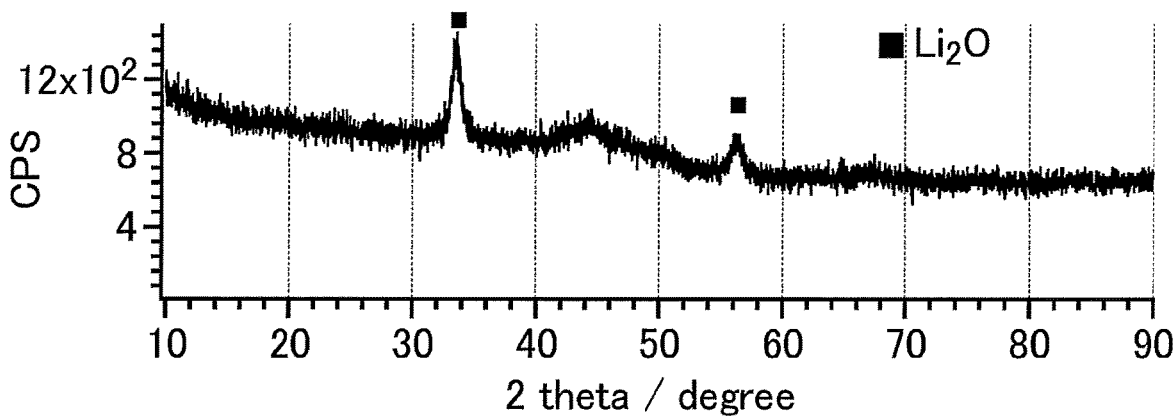
FIG. 47 is a graph showing the results of XRD measurement of solid powder prepared in Preparation 21.

An amount of 2.30 g of lithium oxide (produced by Kojundo Chemical Laboratory Co., Ltd.) as a cathode active material and 1.15 g of cobalt oxide (CoO, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 47 shows the results of XRD measurement of the resultant solid powder. The solid powder was found to contain Li$_2$O. A 59 mg portion of the solid powder, 66 mg of acetylene black as a conductive auxiliary agent, and 4 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 22 (PROCESS FOR PREPARING Li$_2$O/CoO CATHODE)

Figure 48:
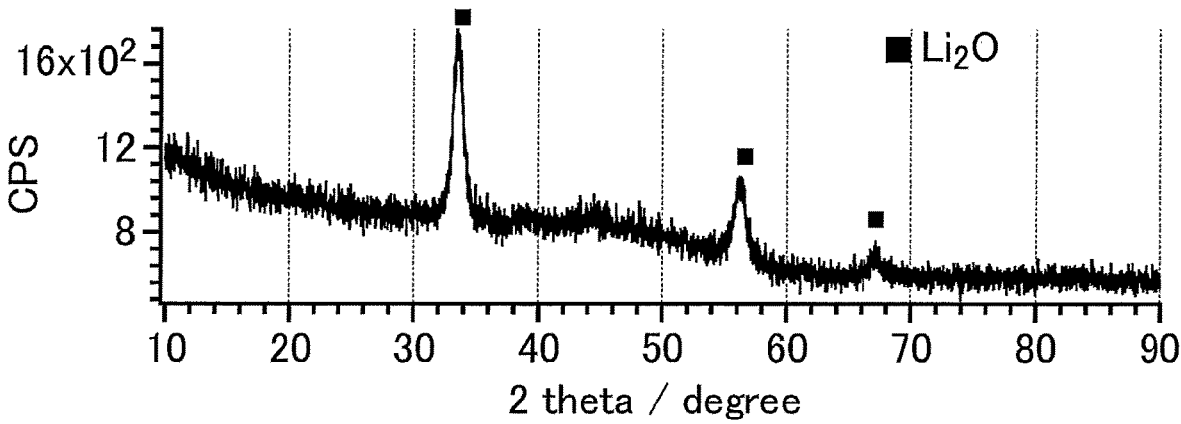
FIG. 48 is a graph showing the results of XRD measurement of solid powder prepared in Preparation 22.

An amount of 2.95 g of lithium oxide (produced by Kojundo Chemical Laboratory Co., Ltd) as a cathode active material and 0.75 g of cobalt oxide (CoO, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 48 shows the results of XRD measurement of the resultant solid powder. The solid powder was found to contain Li$_2$O. An 89 mg portion of the solid powder, 107 mg of acetylene black as a conductive auxiliary agent, and 8 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

PREPARATION 23 (PROCESS FOR PREPARING Li$_2$O/CoO CATHODE)

Figure 49:
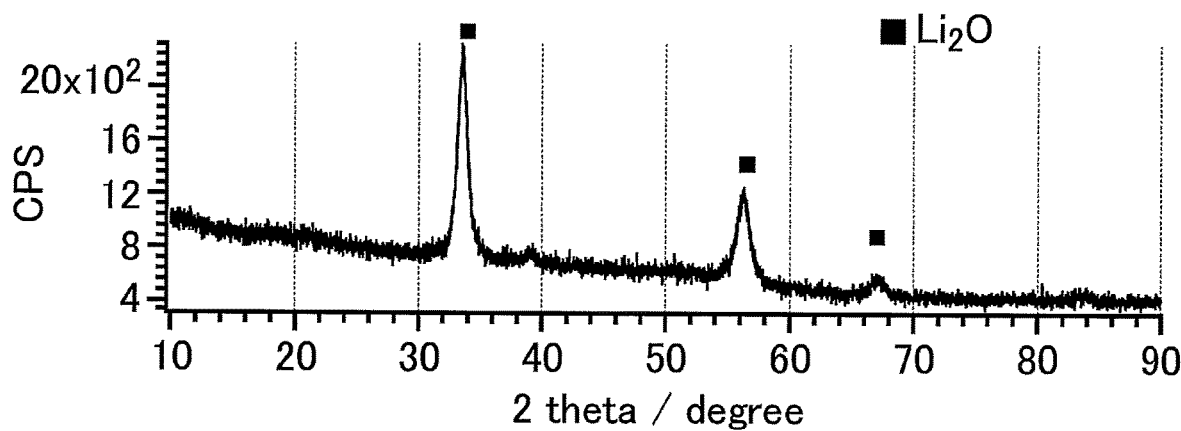
FIG. 49 is a graph showing the results of XRD measurement of solid powder prepared in Preparation 23.

An 3.09 g of lithium oxide (produced by Kojundo Chemical Laboratory Co., Ltd.) as a cathode active material and 0.39 g of cobalt oxide (CoO, produced by Wako Pure Chemical Industries, Ltd.) as a catalyst for an electrode were combined in a planetary ball mill pot, and mixed using a planetary ball mill (under conditions in which 25 zirconia balls (10 mmϕ) were operated at a rate of rotation of 600 rpm for 180 hours). The whole procedure was performed in an argon-substituted glove box with a moisture concentration of not higher than 1 ppm. FIG. 49 shows the results of XRD measurement of the resultant solid powder. The solid powder was found to contain Li$_2$O. An 87 mg portion of the solid powder, 94 mg of acetylene black as a conductive auxiliary agent, and 7 mg of polytetrafluoroethylene powder as a binder were mixed in an agate mortar, and processed into a clay-like mixture, whereby a cathode mix was prepared. The cathode mix was pressed onto 60 mg of an aluminum mesh, whereby a cathode was prepared.

EXAMPLE 34 (CHARGE/DISCHARGE TEST USING TWO-ELECTRODE CELL)

Figure 50:
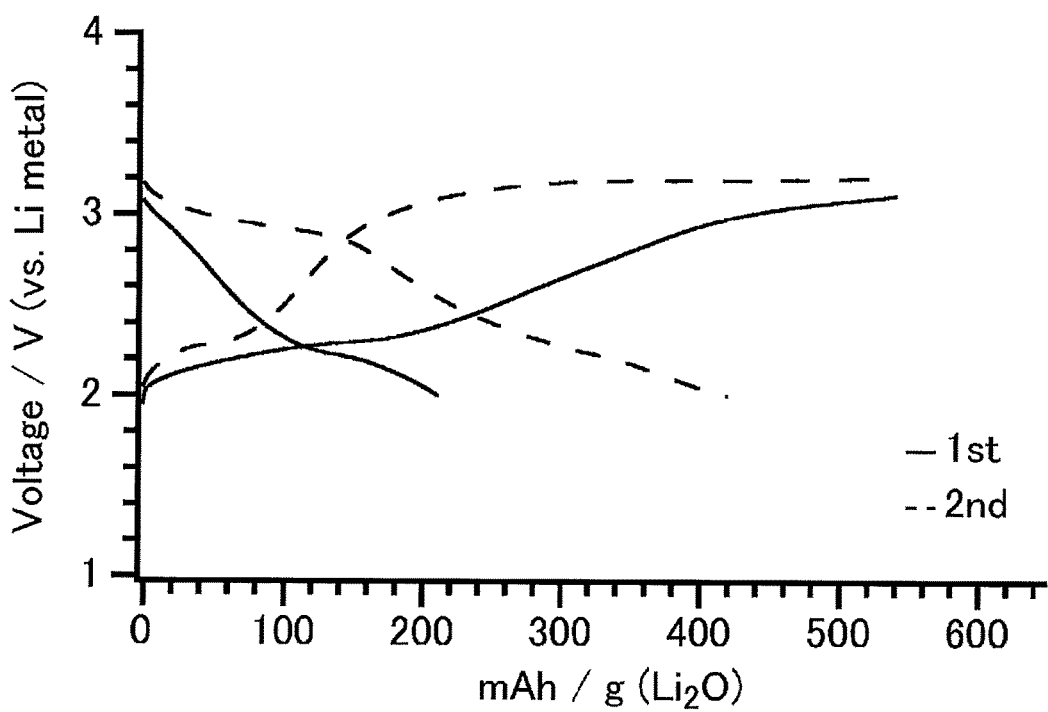
FIG. 50 is a graph showing the results of a charge/discharge test in Example 34.

The charge/discharge test was performed under the same conditions as in Example 28, except that a 4.2 M LiFSI acetonitrile electrolyte solution (LiFSI: lithium bis(fluorosulfonyl) imide [LiN(SO$_2$F)$_2$]) was used as an electrolyte solution instead of the 4.2 M LiTFSI acetonitrile electrolyte solution (LiTFSI: lithium bis(trifluoromethanesulfonyl)imide, [LiN(SO$_2$CF$_3$)$_2$]). FIG. 50 shows the results of the charge/discharge test. As seen in FIG. 50, the use of lithium oxide as a cathode active material under the above conditions also allows for charging and discharging.

EXAMPLE 35 (CHARGE/DISCHARGE TEST USING TWO-ELECTRODE CELL)

Figure 51:
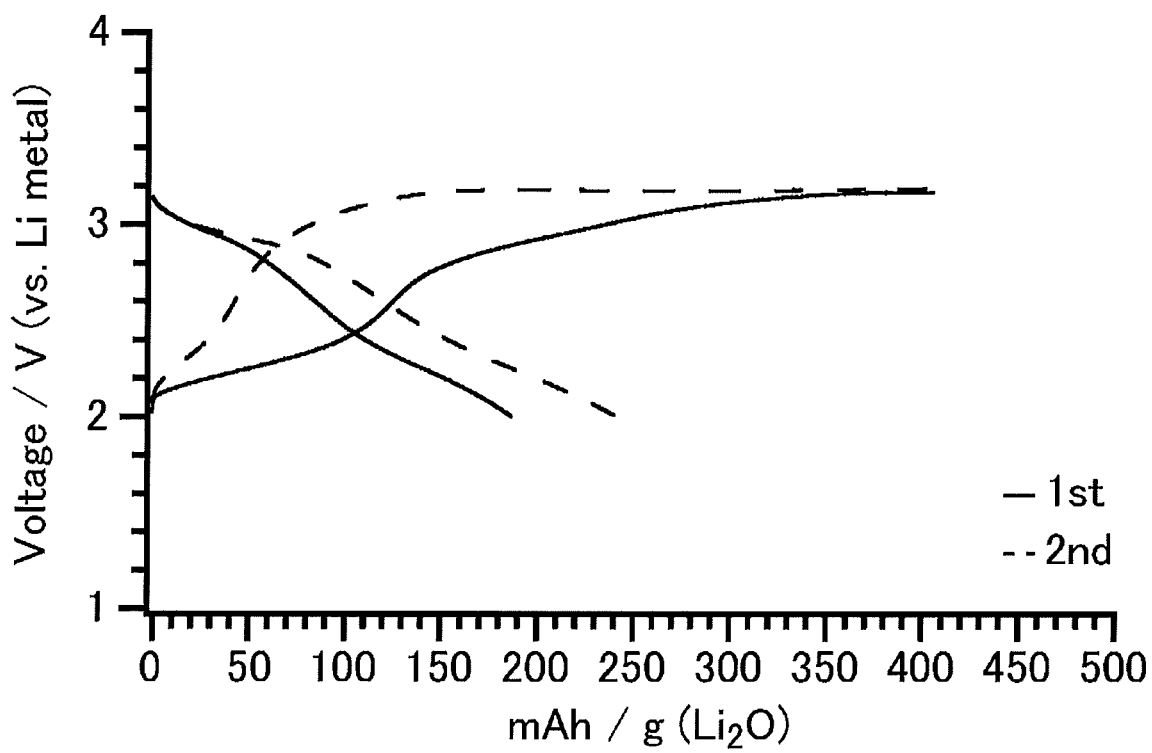
FIG. 51 is a graph showing the results of a charge/discharge test in Example 35.

The charge/discharge test was performed under the same conditions as in Example 29, except that a 4.2 M LiFSI acetonitrile electrolyte solution (LiFSI: lithium bis(fluorosulfonyl) imide [LiN(SO$_2$F)$_2$]) was used as an electrolyte solution instead of the 4.2 M LiTFSI acetonitrile electrolyte solution (LiTFSI: lithium bis(trifluoromethanesulfonyl)imide, [LiN(SO$_2$CF$_3$)$_2$]). FIG. 51 shows the results of the charge/discharge test. As seen in FIG. 51, the use of lithium oxide as a cathode active material under the above conditions also allows for charging and discharging.

EXAMPLE 36 (CHARGE/DISCHARGE TEST USING TWO-ELECTRODE CELL)

Figure 52:
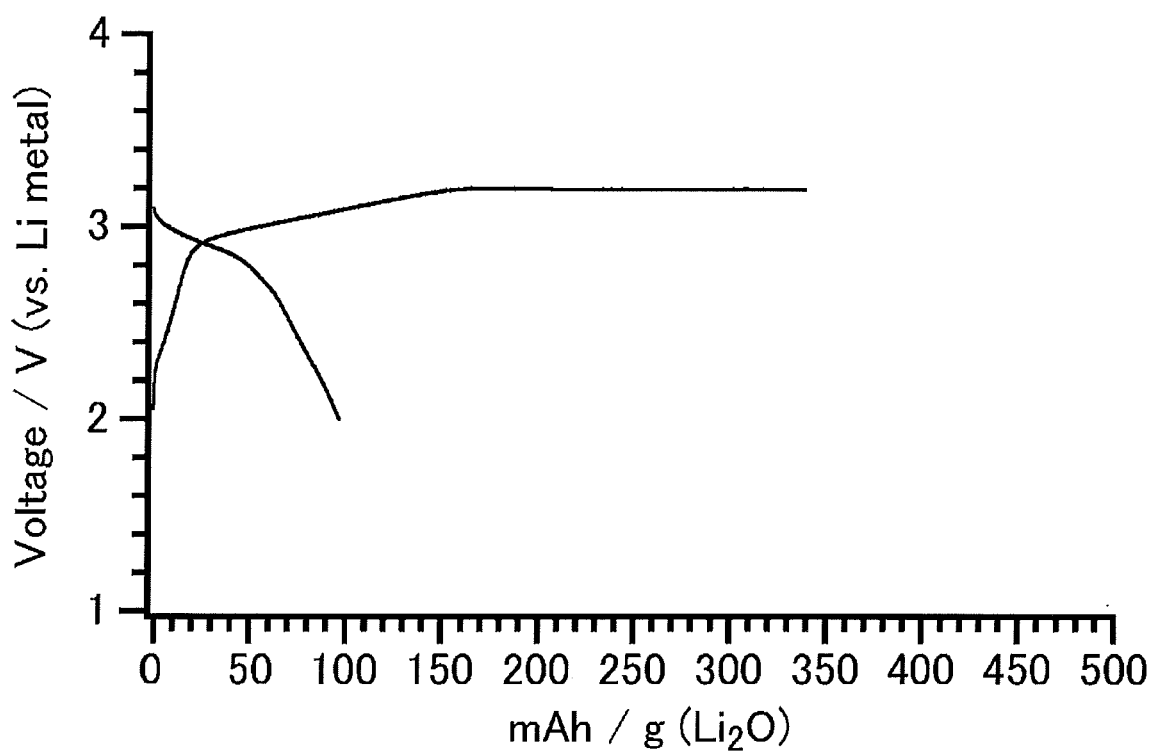
FIG. 52 is a graph showing the results of a charge/discharge test in Example 36.

The charge/discharge test was performed under the same conditions as in Example 28, except that a 4.2 M LiFSI acetonitrile electrolyte solution (LiFSI: lithium bis(fluorosulfonyl)imide [LiN(SO$_2$F)$_2$]) was used as an electrolyte solution instead of the 4.2 M LiTFSI acetonitrile electrolyte solution (LiTFSI: lithium bis(trifluoromethanesulfonyl)imide, [LiN(SO$_2$CF$_3$)$_2$]), and that the current density during the charge and discharge phases was 22.5 mA/g of the active material. FIG. 52 shows the results of the charge/discharge test. As seen in FIG. 52, the use of lithium oxide as a cathode active material under the above conditions also allows for charging and discharging.

EXAMPLE 37 (CHARGE/DISCHARGE TEST USING TWO-ELECTRODE CELL)

Figure 53:
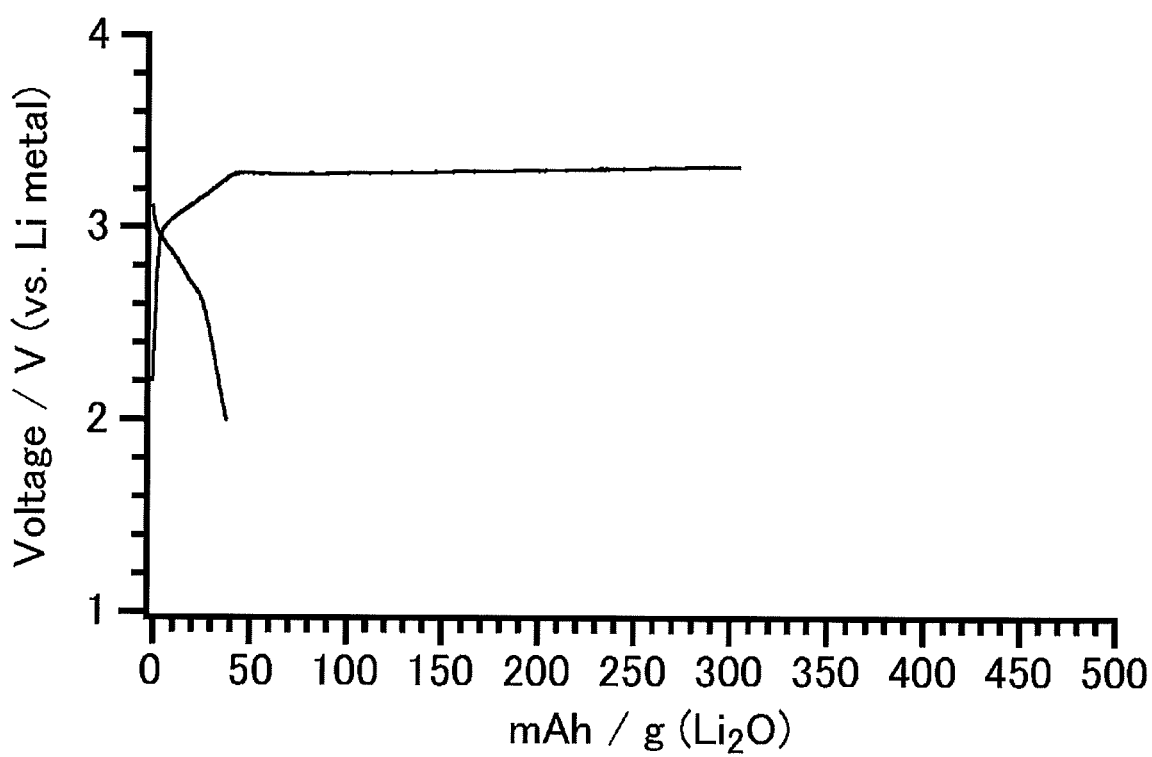
FIG. 53 is a graph showing the results of a charge/discharge test in Example 37.

The charge/discharge test was performed under the same conditions as in Example 29, except that a 4.2 M LiFSI acetonitrile electrolyte solution (LiFSI: lithium bis(fluorosulfonyl)imide [LiN(SO$_2$F)$_2$]) was used as an electrolyte solution instead of the 4.2 M LiTFSI acetonitrile electrolyte solution (LiTFSI: lithium bis(trifluoromethanesulfonyl)imide, [LiN(SO$_2$CF$_3$)$_2$]), and that the current density during the charge and discharge phases was 22.5 mA/g of the active material. FIG. 53 shows the results of the charge/discharge test. As seen in FIG. 53, the use of lithium oxide as a cathode active material under the above conditions also allows for charging and discharging.

The results of the examples reveal that the cells including a cathode according to the present invention have a high theoretical voltage and theoretical capacity, and can be discharged and recharged multiple times. The examples also suggest that in cells including such a cathode, the same mechanism functions to provide a high theoretical volume and theoretical capacity, and allow repetition of charging and discharging.

Accordingly, the results of the examples demonstrate that all of the various embodiments of the present invention disclosed herein can be applied in the entire technical range of the present invention, and provide advantageous effects.

The invention claimed is:

1. A secondary cell comprising:
a positive electrode;
a negative electrode; and
an electrolyte,
wherein the positive electrode comprises:
   a positive electrode active material comprising an alkali metal compound represented by following formula (1):

$$A_xO_y \qquad (1)$$

wherein A is an alkali metal atom, x is in a range from 0.5 to 2.5, and y is in a range from 0.5 to 2.5; and
   a catalyst for the positive electrode,
      wherein the catalyst for the positive electrode comprises at least one element selected from the group consisting of Ag, Au, Cu, Fe, Co, and Ni, and
      the catalyst for the positive electrode is in a form of a solid solution in a crystal structure of the alkali metal compound represented by the formula (1),
reactions at the positive electrode include one represented by a following formula:

$$A_2O_2 + 2A^+ + 2e^- \Leftrightarrow 2A_2O$$

wherein A is the alkali metal atom,
the negative electrode comprises a negative electrode active material comprising at least one material selected from the group consisting of an alkali metal, tin, titanium, boron, nitrogen, silicon, and carbon, and
the positive electrode, the negative electrode, and the electrolyte are hermetically sealed in the secondary cell.

2. The secondary cell according to claim 1,
wherein the positive electrode comprises a current collector and an active material layer, and
the active material layer comprises the alkali metal compound represented by the formula (1) in an amount of 5% by mass or more relative to mass of the active material layer.

3. The secondary cell according to claim 1,
wherein when the secondary cell is fully charged, the negative electrode comprises the alkali metal at a ratio, determined on a molar basis relative to an alkali metal peroxide represented by following formula (2) in the positive electrode, of not more than 100:

$$A_2O_2 \qquad (2)$$

wherein A is the alkali metal atom.

4. The secondary cell according to claim 1,
wherein A is Li.

5. The secondary cell according to claim 1,
wherein the negative electrode active material in the negative electrode comprises at least one material selected from the group consisting of an alkali metal and carbon.

6. The secondary cell according to claim 1,
wherein the alkali metal in the negative electrode active material is Li, and
the carbon in the negative electrode active material is graphite.

7. The secondary cell according to claim 1,
wherein reactions at the negative electrode and overall reactions, which are combinations of reactions at the positive electrode and reactions at the negative electrode, include reactions represented by following formulas:

the reactions at the negative electrode: $A \Leftrightarrow A^+ + e^-$ the overall reactions: $A + 1/2 A_2O_2 \Leftrightarrow A_2O$ wherein A is the alkali metal atom.

8. The secondary cell according to claim 1,
wherein the alkali metal compound is represented by $A_2O$, or $A_2O_2$, or a combination thereof.

9. The secondary cell according to claim 1,
wherein A is Li or Na.

10. A composition for forming a positive electrode comprising:
a positive electrode active material; and
a catalyst for a positive electrode,
wherein the positive electrode active material comprises:
   an alkali metal compound represented by the following formula (1):

$$A_xO_y \qquad (1)$$

wherein A is an alkali metal atom, x is in a range from 0.5 to 2.5, and y is in a range from 0.5 to 2.5, and
   wherein the catalyst for the positive electrode comprises at least one element selected from the group consisting of Ag, Au, Cu, Fe, Co, and Ni and
   the catalyst for the positive electrode is in a form of a solid solution in a crystal structure of the alkali metal compound represented by the formula (1).

11. A method for producing the coposition according to claim 10, comprising:
producing the positive electrode material by mixing the alkali metal compound and the catalyst for the positive electrode using a planetary ball mill.

12. The composition according to claim 10,
wherein the alkali metal compound is represented by $A_2O$, or $A_2O_2$, or a combination thereof.

13. The composition according to claim 10,
wherein A is Li or Na.

14. The composition according to claim 10,
wherein A is Li.

* * * * *